US012696085B2

(12) United States Patent
Liu et al.

(10) Patent No.: US 12,696,085 B2
(45) Date of Patent: Jul. 28, 2026

(54) NETWORK RELAY SECURITY

(71) Applicant: ZTE Corporation, Shenzhen (CN)

(72) Inventors: Yuze Liu, Shenzhen (CN); Shilin You, Shenzhen (CN); Zhen Xing, Shenzhen (CN); Zhaoji Lin, Shenzhen (CN); Jigang Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 265 days.

(21) Appl. No.: 18/458,729

(22) Filed: Aug. 30, 2023

(65) Prior Publication Data

US 2023/0413047 A1      Dec. 21, 2023

Related U.S. Application Data

(63) Continuation of application No. PCT/CN2022/085697, filed on Apr. 8, 2022.

(51) Int. Cl.
H04W 12/06       (2021.01)
H04W 12/0431    (2021.01)
H04W 84/04       (2009.01)

(52) U.S. Cl.
CPC ....... H04W 12/06 (2013.01); H04W 12/0431 (2021.01); H04W 84/047 (2013.01)

(58) Field of Classification Search
CPC ..... H04W 88/04; H04W 12/06; H04W 40/22; H04W 12/0431; H04W 84/047;

(Continued)

(56) References Cited

U.S. PATENT DOCUMENTS

| | | | | |
|---|---|---|---|---|
| 9,894,591 | B2 * | 2/2018 | Chung | ................. H04W 40/22 |
| 2019/0335332 | A1 * | 10/2019 | Ying | ..................... H04W 40/22 |

(Continued)

FOREIGN PATENT DOCUMENTS

| | | |
|---|---|---|
| CN | 113518398 A | 10/2021 |
| CN | 114079995 A | 2/2022 |

(Continued)

OTHER PUBLICATIONS

3GPP TSG-SA3 Meeting #102e S3-210296 Source: CATT Title: pCR to TR33.847—New solution on UE-to-Network Relay based on primary (Year: 2021).*

(Continued)

*Primary Examiner* — Nizar N Sivji
(74) *Attorney, Agent, or Firm* — Perkins Coie LLP

(57)            ABSTRACT

Techniques are described to perform network relay security. An example wireless communication method includes receiving, by a network device, a request message that includes an identifier associated with a first communication device; determining, by the network device in response to the receiving, that the first communication device is authenticated based on a local policy of the network device; and sending, by the network device in response to the determining, a message to a second communication device to relay to the first communication device, where the message indicates that the identifier is rejected by the network device for communication with the first communication device, or where the message indicates that the first communication device is triggered to send another identifier.

12 Claims, 38 Drawing Sheets

(58) Field of Classification Search

CPC ..... H04W 12/72; H04W 12/75; H04W 8/205; H04W 92/18; H04W 12/69; H04L 63/0876; H04L 63/14

See application file for complete search history.

(56) References Cited

U.S. PATENT DOCUMENTS

| | | | | |
|---|---|---|---|---|
| 2019/0349951 A1 | 11/2019 | Ahmad | | |
| 2022/0124549 A1* | 4/2022 | Yang | ................. | H04W 28/0215 |
| 2023/0020344 A1* | 1/2023 | Wang | .................... | H04W 76/12 |
| 2023/0199550 A1* | 6/2023 | Xing | ................. | H04W 28/0257 |
| | | | | 370/329 |
| 2023/0319556 A1* | 10/2023 | Wu | ........................ | H04W 12/72 |
| 2024/0073685 A1* | 2/2024 | Zhang | ................... | H04L 9/0844 |
| 2024/0073777 A1* | 2/2024 | Gulati | ................... | H04W 88/04 |
| 2024/0163666 A1* | 5/2024 | Lee | ........................ | H04W 12/06 |
| 2024/0196206 A1* | 6/2024 | Fu | ......................... | G06F 21/602 |
| 2024/0259797 A1* | 8/2024 | Fu | ......................... | H04W 12/08 |
| 2024/0305983 A1* | 9/2024 | Wu | ..................... | H04W 12/047 |
| 2024/0323683 A1* | 9/2024 | Liu | ........................ | H04W 12/06 |
| 2025/0106018 A1* | 3/2025 | Wifvesson | .......... | H04W 12/041 |

FOREIGN PATENT DOCUMENTS

| | | | | | | |
|---|---|---|---|---|---|---|
| EP | 4224901 A1 | * | 8/2023 | | .............. | H04W 8/20 |
| WO | 2021088990 A1 | | 5/2021 | | | |
| WO | 2021/219102 A1 | | 11/2021 | | | |
| WO | WO-2024092844 A1 | * | 5/2024 | | ........... | H04W 76/10 |
| WO | WO-2024105542 A1 | * | 5/2024 | | ........... | H04W 12/06 |

OTHER PUBLICATIONS

3rd Generation Partnership Project, "Technical Specification Group Services and System Aspects; Study on security aspects of enhancement for proximity based services in the 5G System (5GS)," 3GPP TR 33.847 V0.5.0, Mar. 2021 (120 pages).

CATT, "pCR to TR33.847—New solution on UE-to-Network Relay based on primary authentication," 3GPP TSG-SA3 Meeting #102e, S3-210296, e-meeting, Jan. 18-29, 2021 (2 pages).

Extended European Search Report for European Patent Application No. 22926331.4, mailed Apr. 10, 2024 (9 pages).

3rd Generation Partnership Project, "Technical Specification Group Services and System Aspects; Security aspects of Proximity based Services (ProSe) in the 5G System (5GS)," 3GPP Ts 33.503 V17.0.0, Jun. 2022 (50 pages).

CATT et al., "TS 23.304: Procedure on Layer-3 UE-to-Network Relay without N3IWF," S2-2104107 (revision of S2-210xxxx), SA WG2 Meeting #145E e-meeting, Elbonia, May 17-28, 2021 (5 pages).

CATT et al., "TS 23.304: Procedure on Layer-3 UE-to-Network Relay without N3IWF," S2-2104949 (revision of S2-2104107r12), SA WG2 Meeting #145E e-meeting, Elbonia, May 17-28, 2021 (6 pages).

Interdigital et al., "Way forward for L3 U2N Relay Authorization and security conclusions," S3-212484 (Revision of S3-21xxxx), 3GPP TSG-SA3 Meeting #104-e, e-meeting, Aug. 16-27, 2021 (4 pages).

Samsung et al., "Proposal for U2NW relay authentication, authorization and key management," S3-214218 (Revision of S3-20xxxx), 3GPP TSG-SA3 Meeting #105-e, e-meeting, Nov. 8-19, 2021 (6 pages).

3rd Generation Partnership Project, "Technical Specification Group Services and System Aspects; Study on security aspects of enhancement for proximity based services in the 5G System (5GS)," 3GPP TR 33.847 V0.9.0, Nov. 2021 (163 pages).

Samsung et al., "Proposal for U2NW relay authentication, authorization and key management," S3-214495 (Revision of S3-214218), 3GPP TSG-SA3 Meeting #105-e, e-meeting, Nov. 8-19, 2021 (6 pages).

Huawei et al., "Clarification on procedures for PC5 establishment in UE-to-Network relay scenario," S3-220185 (Revision of S3-22xxxx), 3GPP TSG-SA3 Meeting #106e, e-meeting, Feb. 14-25, 2022 (9 pages).

Philips International B.V., "Integrity protection for UE-to-NW relays," S3-220441, 3GPP TSG-SA3 Meeting #106e, e-meeting, Feb. 14-18, 2022 (11 pages).

Huawei et al., "Resolving the EN on the needs and usage of 5GPRUK ID," S3-220845, 3GPP TSG-SA3 Meeting #107-e, e-meeting, May 16-20, 2022 (5 pages).

Huawei et al., "Format of 5GPRUK ID," S3-220846, 3GPP TSG-SA3 Meeting #107-e, e-meeting, May 16-20, 2022 (5 pages).

Communication under Rule 71(3) EPC for European Patent Application No. 22926331.4, mailed Aug. 27, 2025 (115 pages).

First Examination Report for Indian Patent Application No. 202317057153, mailed Mar. 25, 2026 (7 pages).

ETSI MCC, "Report of 3GPP TSG RAN WG2 meeting #114-e, Online," 3GPP TSG-RAN WG2 meeting #115-e, R2-2106901, May 19-27, 2021 (295 pages).

International Search Report for International Patent Application No. PCT/CN2022/085697, mailed Dec. 22, 2022 (9 pages).

* cited by examiner

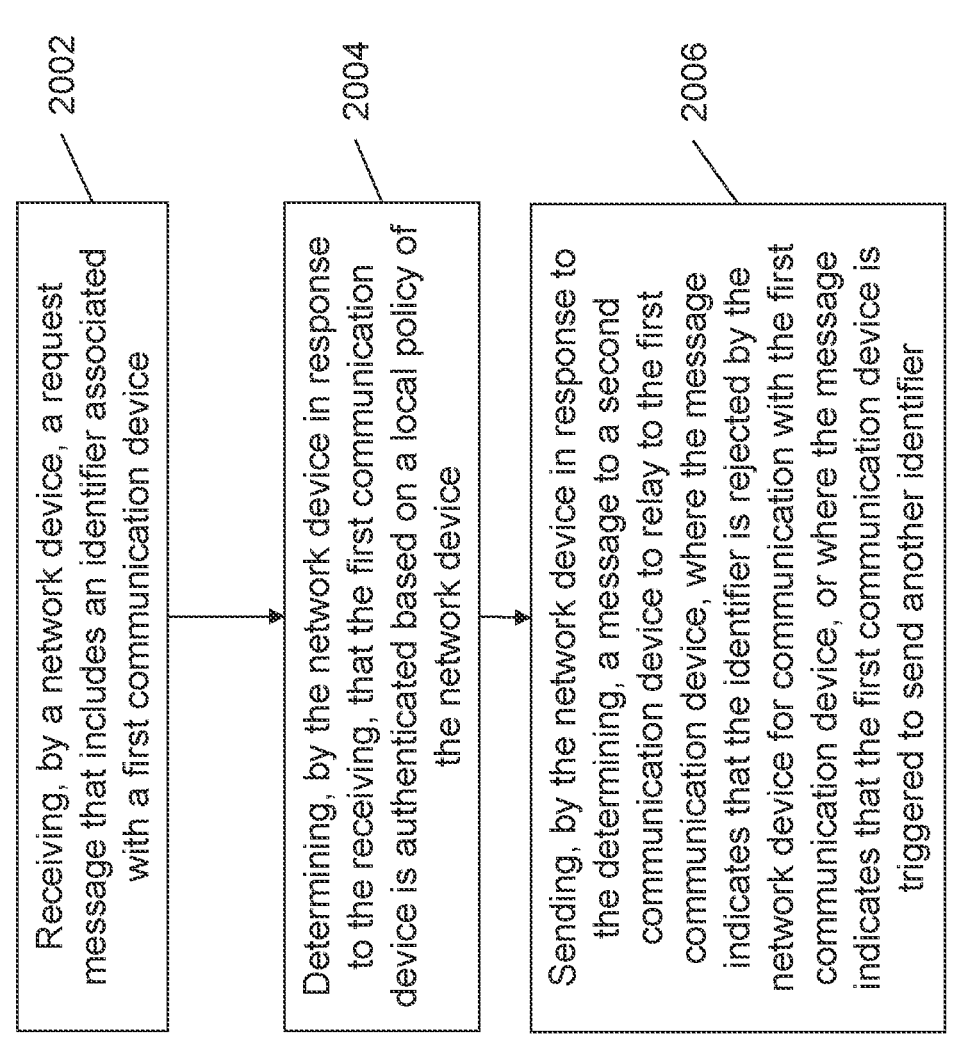

2002

Receiving, by a network device, a request message that includes an identifier associated with a first communication device

2004

Determining, by the network device in response to the receiving, that the first communication device is authenticated based on a local policy of the network device

2006

Sending, by the network device in response to the determining, a message to a second communication device to relay to the first communication device, where the message indicates that the identifier is rejected by the network device for communication with the first communication device, or where the message indicates that the first communication device is triggered to send another identifier

FIG. 20

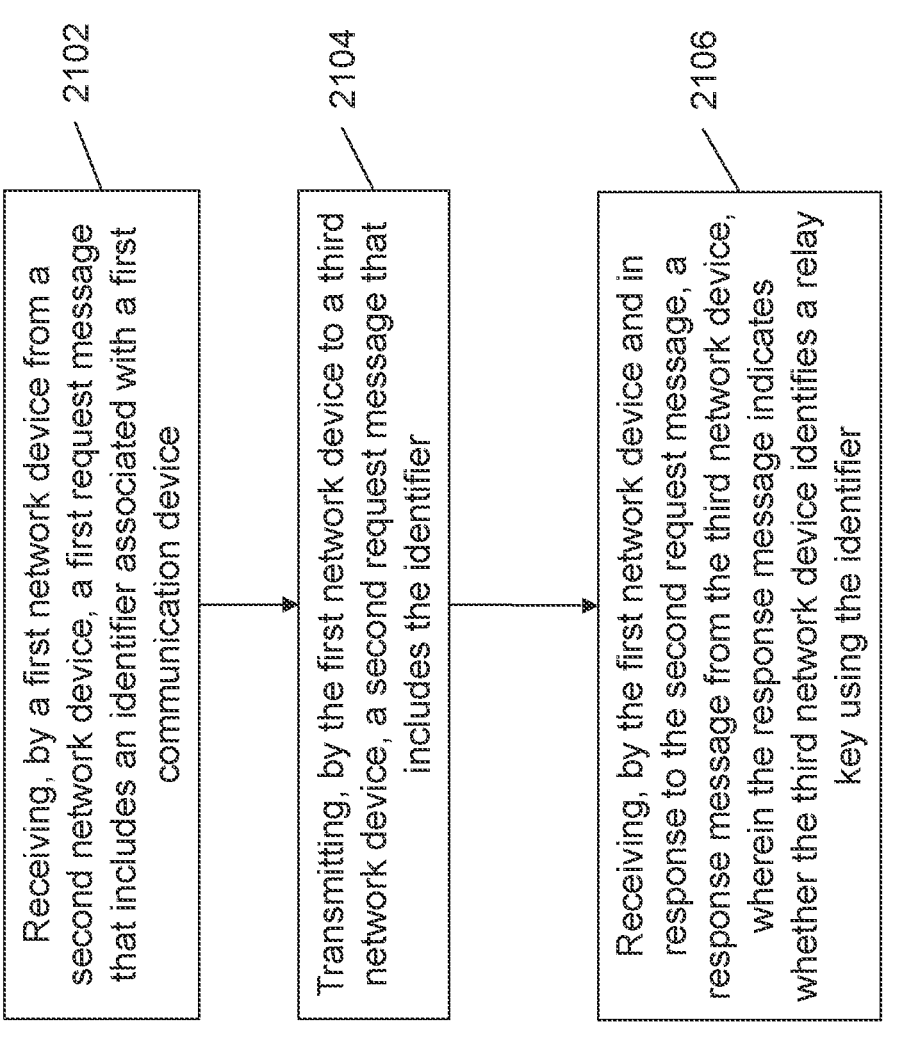

Receiving, by a first network device from a second network device, a first request message that includes an identifier associated with a first communication device

2102

Transmitting, by the first network device to a third network device, a second request message that includes the identifier

2104

Receiving, by the first network device and in response to the second request message, a response message from the third network device, wherein the response message indicates whether the third network device identifies a relay key using the identifier

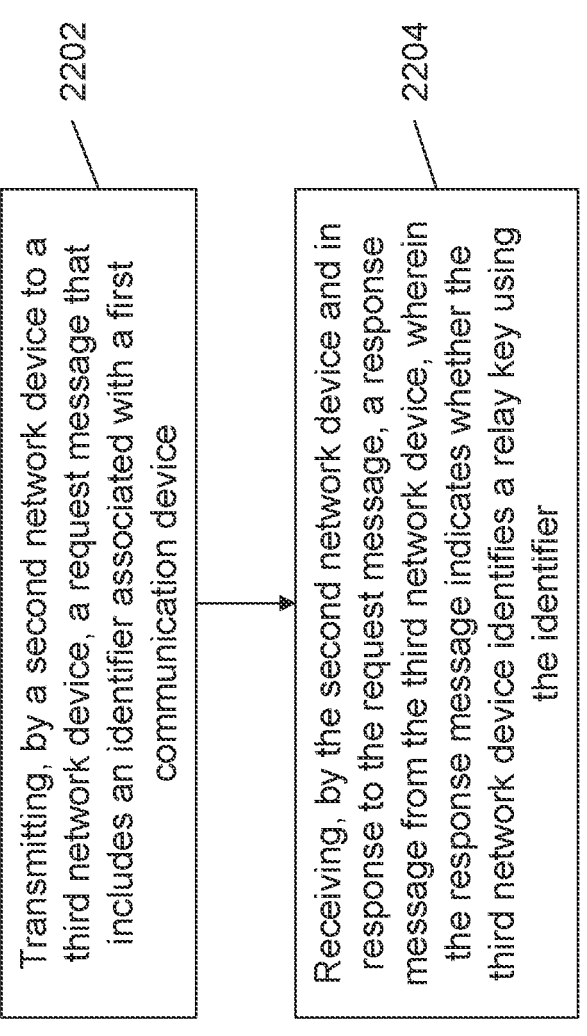

Transmitting, by a second network device to a third network device, a request message that includes an identifier associated with a first communication device

2202

Receiving, by the second network device and in response to the request message, a response message from the third network device, wherein the response message indicates whether the third network device identifies a relay key using the identifier

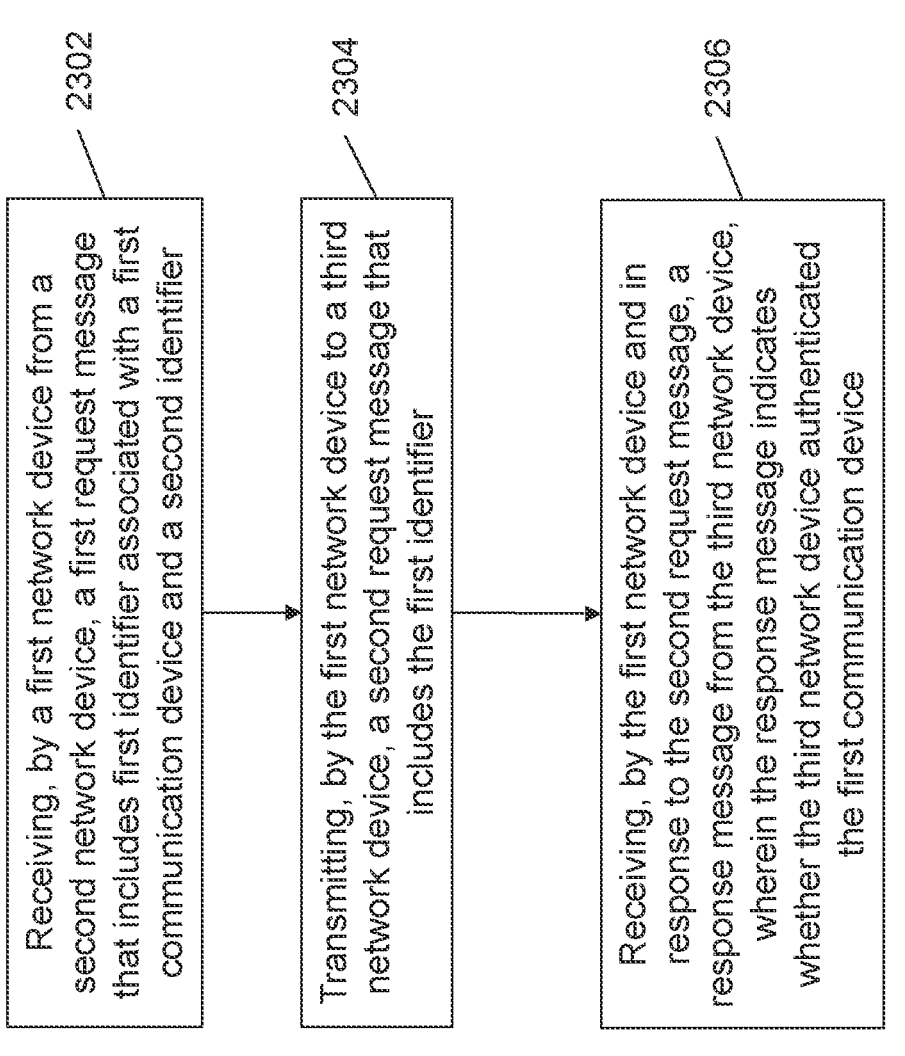

Receiving, by a first network device from a second network device, a first request message that includes first identifier associated with a first communication device and a second identifier — 2302

Transmitting, by the first network device to a third network device, a second request message that includes the first identifier — 2304

Receiving, by the first network device and in response to the second request message, a response message from the third network device, wherein the response message indicates whether the third network device authenticated the first communication device — 2306

FIG. 23

NETWORK RELAY SECURITY

CROSS REFERENCE TO RELATED APPLICATIONS

This patent document is a continuation of and claims benefit of priority to International Patent Application No. PCT/CN2022/085697, filed on Apr. 8, 2022. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for performing network relay security.

A first wireless communication method includes receiving, by a network device, a request message that includes an identifier associated with a first communication device; determining, by the network device in response to the receiving, that the first communication device is authenticated based on a local policy of the network device; and sending, by the network device in response to the determining, a message to a second communication device to relay to the first communication device, where the message indicates that the identifier is rejected by the network device for communication with the first communication device, or where the message indicates that the first communication device is triggered to send another identifier.

In some embodiments, the message is a reject message that includes a cause of a rejection and a transaction identifier, the reject message indicates that the identifier is rejected by the network device for communication with the first communication device, and the method further comprises: receiving, from the first communication device and in response to the sending, a second message that includes a subscription concealed identifier (SUCI). In some embodiments, the message is an identity request message that includes a transaction identifier, and the method further comprises: receiving, from the first communication device and in response to the sending, a second message that includes a subscription concealed identifier (SUCI). In some embodiments, the second communication device is authorized to act as a relay between the first communication device and a communication network that includes the network device. In some embodiments, the identifier includes a 5G ProSe Relay User Key (PRUK) identifier (ID). In some embodiments, the network device includes a remote access and mobility management function (AMF) device.

A second wireless communication method includes receiving, by a first network device from a second network device, a first request message that includes an identifier associated with a first communication device; transmitting, by the first network device to a third network device, a second request message that includes the identifier; and receiving, by the first network device and in response to the second request message, a response message from the third network device, wherein the response message indicates whether the third network device identifies a relay key using the identifier.

In some embodiment, the third network device is determined by the first network device based on the identifier. In some embodiment, after the receiving and prior to the transmitting, the method further comprises: transmitting, by the first network device, a third request to the third network device, wherein the third request includes the identifier; and receiving, from the third network device, another identifier that identifies the third network device. In some embodiment, the identifier includes a 5G ProSe Relay User Key (PRUK) identifier (ID) that includes a routing identifier or a routing indicator (RID), and wherein the relay key includes 5G PRUK. In some embodiment, the 5G PRUK ID includes a first part that includes the RID and a prose temporary user equipment identifier (P-TID), and a second part that includes a home network identifier, and the first part precedes the second part.

In some embodiment, a second communication device is authorized to act as a relay between the first communication device and a communication network that includes any one or more of first network device, the second network device, and the third network device. In some embodiment, the first network device includes an authentication server function (AUSF) device, the second network device includes a remote access and mobility management function (AMF) device, and the third network device includes a prose anchor function (PAnF).

A third wireless communication method includes transmitting, by a second network device to a third network device, a request message that includes an identifier associated with a first communication device; and receiving, by the second network device and in response to the request message, a response message from the third network device, wherein the response message indicates whether the third network device identifies a relay key using the identifier.

In some embodiments, the third network device is determined by the second network device based on the identifier. In some embodiments, prior to the transmitting, the method further comprises: transmitting, by the second network device, a second request to the third network device, wherein the third request includes the identifier; and receiving, from a first network device, another identifier that identifies the third network device, wherein the first network device includes an authentication server function (AUSF) device. In some embodiments, the identifier includes a 5G ProSe Relay User Key (PRUK) identifier (ID) that includes a routing identifier or a routing indicator (RID), and wherein the relay key includes 5G PRUK. In some embodiments, the 5G PRUK ID includes a first part that includes the RID and a prose temporary user equipment identifier (P-TID), and a second part that includes a home network identifier, and the first part precedes the second part.

In some embodiments, a second communication device is authorized to act as a relay between the first communication device and a communication network that includes any one or more of the second network device, and the third network device. In some embodiments, the second network device includes a remote access and mobility management function (AMF) device, and the third network device includes a prose anchor function (PAnF).

A fourth wireless communication method includes receiving, by a first network device from a second network device, a first request message that includes first identifier associated with a first communication device and a second identifier; transmitting, by the first network device to a third network device, a second request message that includes the first identifier; and receiving, by the first network device and in response to the second request message, a response message from the third network device, wherein the response message indicates whether the third network device authenticated the first communication device.

In some embodiments, the first identifier includes a 5G ProSe Relay User Key (PRUK) identifier (ID), and the second identifier includes a subscription concealed identifier (SUCI). In some embodiments, a second communication device is authorized to act as a relay between the first communication device and a communication network that includes any one or more of the first network device, the second network device, and the third network device. In some embodiments, the first network device includes an authentication server function (AUSF) device, the second network device includes a remote access and mobility management function (AMF) device, and the third network device includes a unified data management (UDM).

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIG. 20 shows an example flowchart for facilitating network security between a network device and a remote communication device.

FIGS. 21 to 22 show example flowcharts for receiving by a network device a message that indicates whether another network device identifies a relay key using an identifier.

FIG. 23 shows a flowchart for receiving a message by a network node that indicates whether another network node authenticates a communication device.

DETAILED DESCRIPTION

3GPP system is designed to authorize a UE to access 5GC via a 5G UE-to-Network Relay and to authorize a UE to perform as a UE-to-Network Relay. Without a proper authorization, unauthorized entities will be able to access 5GC via UE-to-Network Relay or act as UE-to-Network Relays creating a vulnerability and causing possible (D)DOS attacks or leading to unauthorized service usage on both 5GS and UE-to-Network Relay.

Security procedure over control plane is specified in TR 33.503 clause 6.3.3.3. UE will generate 5G ProSe Relay User Key (PRUK) identifier (ID) after authentication of UE. However, the PRUK ID also can be used to access the network. How to use the PRUK ID to access the network is not specified.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Introduction

Figure 1:
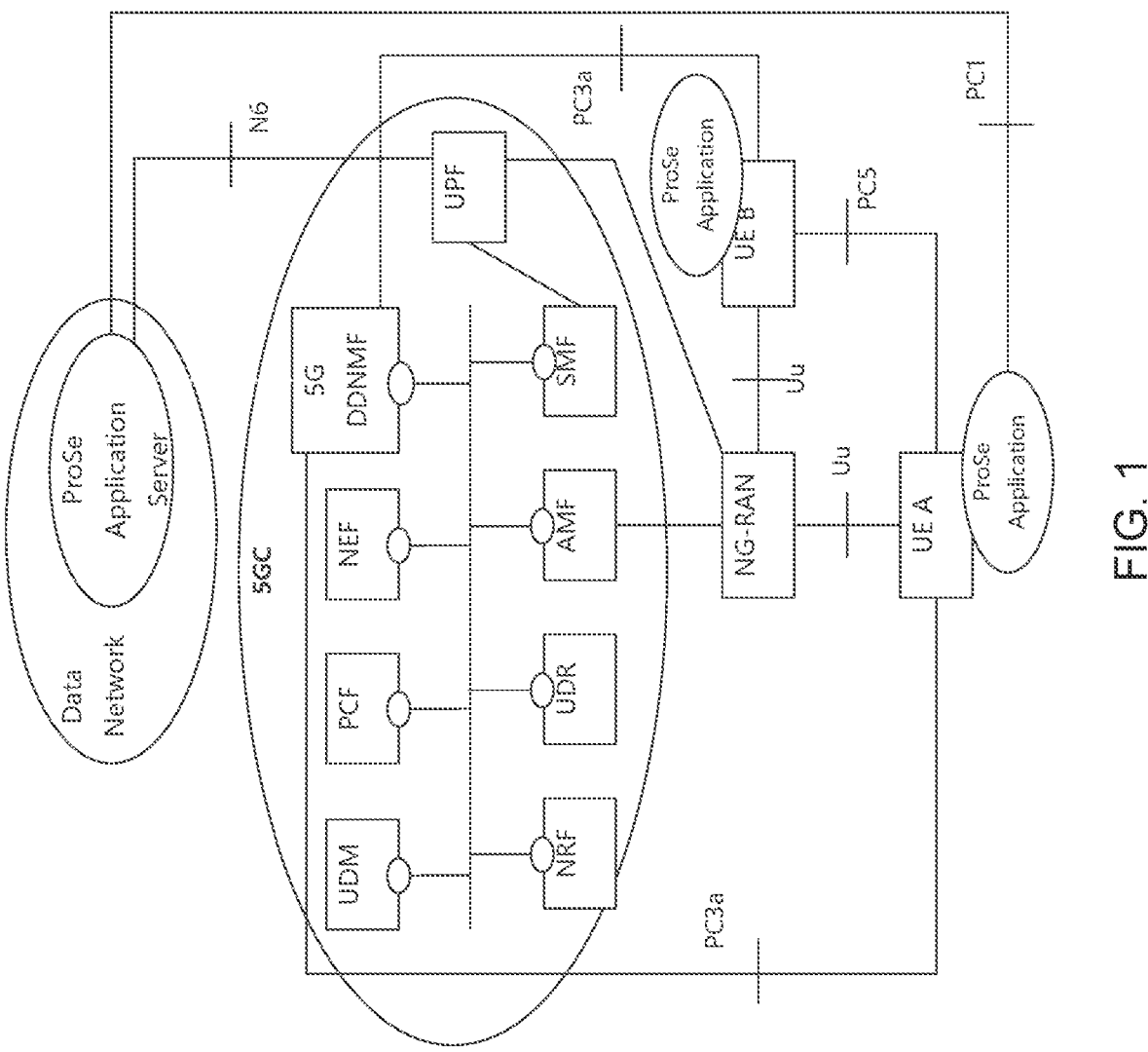
FIG. 1 shows an architecture for 5G Core Network.

FIG. 1 shows an architecture for 5G Core Network. In the architecture, 5G DDNMF is introduced into 5GC as a new network function. 5G DDNMF has similar functions from architecture point of view to the DDNMF part of ProSe Function.

Figure 2A:
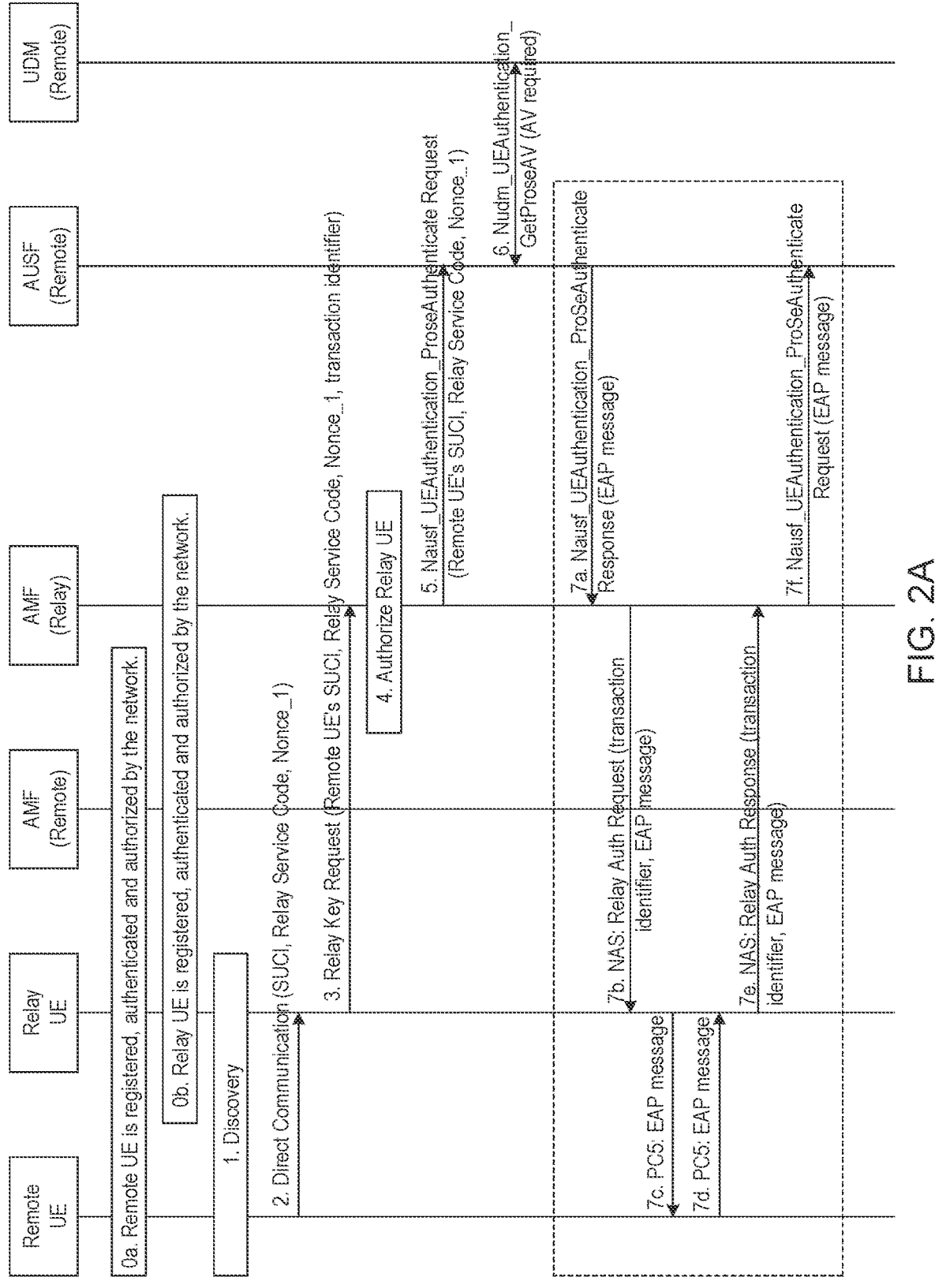
FIGS. 2A-2B show a security procedure over control plane.
Figure 2B:
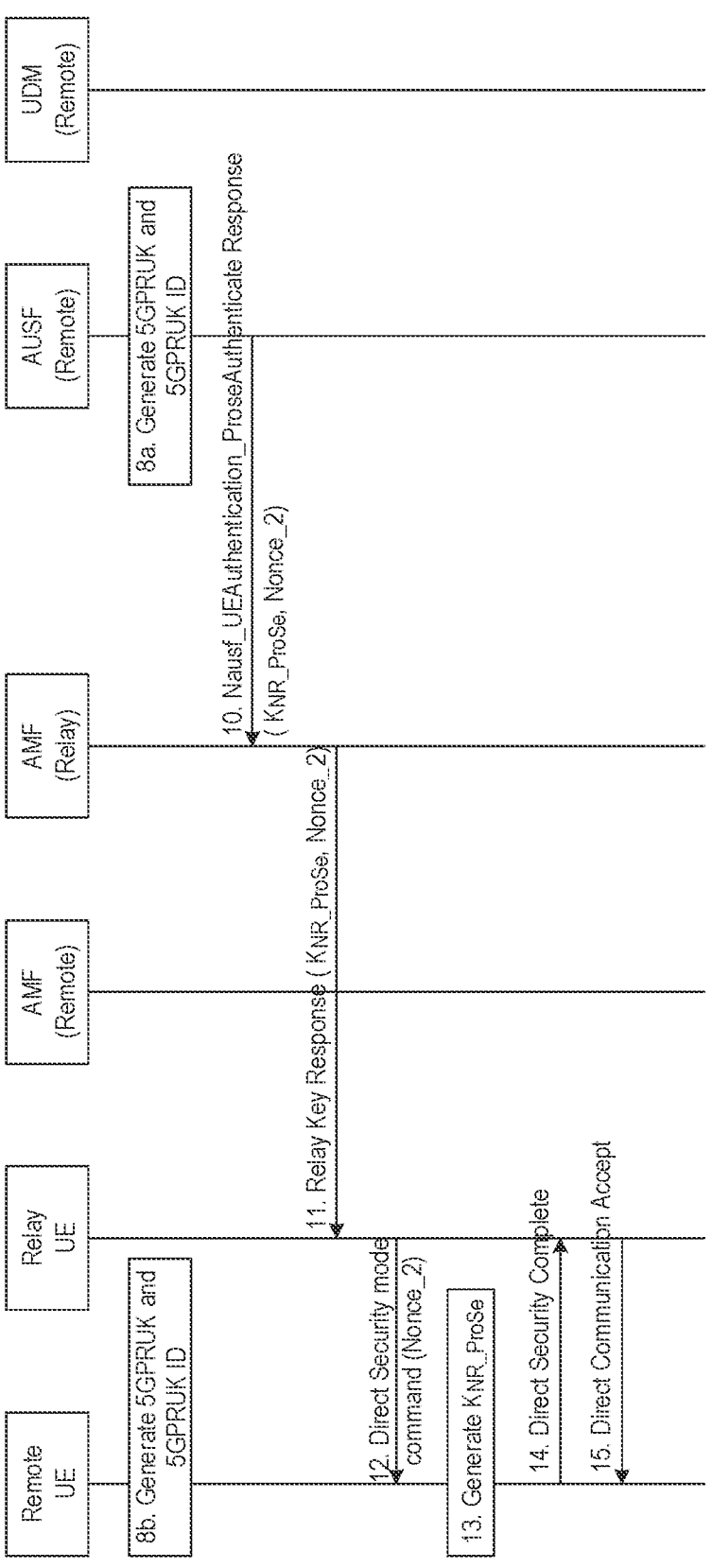

Security procedure over control plane is shown in FIGS. 2A-2B and as further described with step numbers below. FIG. 2B is a continuation of the process in FIG. 2A.

0. The 5G ProSe Remote UE and the 5G ProSe UE-to-Network Relay can be registered with the network. The 5G ProSe UE-to-Network Relay can be authenticated and authorized by the network to provide UE-to-Network relay service. The 5G ProSe Remote UE can be authenticated and authorized by the network to receive UE-to-Network relay service. PC5 security policies are provisioned to the 5G ProSe Remote UE and the 5G ProSe UE-to-Network Relay respectively during this authorization and information provisioning procedure.

1. The 5G ProSe Remote UE can initiate discovery procedure using any of Model A or Model B method.

2-5. After the discovery of the 5G ProSe UE-to-Network Relay, the 5G ProSe Remote UE can send a Direct Communication Request to the 5G ProSe UE-to-Network Relay for establishing secure PC5 unicast link. The 5G ProSe Remote UE can include its security capabilities and PC5 security signalling policy in the DCR message. The message can also include subscription concealed identifier (SUCI), Relay Service Code, Nonce_1. Upon receiving the DCR message, the 5G ProSe UE-to-Network Relay can send the Relay Key Request to the AMF of the 5G ProSe UE-to-Network Relay, including partial parameters received in the DCR message. The 5G ProSe UE-to-Network Relay can also include in the message a transaction identifier that identifies the 5G ProSe Remote UE for the subsequent messages over 5G ProSe UE-to-Network Relay's NAS messages and PC5 messages. The AMF of the 5G ProSe UE-to-Network Relay can verify whether the 5G ProSe UE-to-Network Relay is authorized to provide the UE-to-Network relay service. The AMF of the 5G ProSe UE-to-Network Relay can select an authentication server function (AUSF) based on SUCI and forward the parameters received in Relay Key Request to the AUSF in Nausf_UEAuthentication_ProseAuthenticate Request message. The Nausf_U-EAuthentication_ProseAuthenticate Request message can contain the 5G ProSe Remote UE's SUCI, Relay Service Code, Nonce_1. The AUSF can initiate a 5G ProSe Remote UE specific authentication using the ProSe specific parameters received (e.g., RSC, etc.).

6. The AUSF of the 5G ProSe Remote UE can retrieve the Authentication Vectors from the UDM via Nudm_UEAuthentication_GetProseAv Request message and trigger authentication of the 5G ProSe Remote UE. This authentication is performed between the AUSF of the 5G ProSe Remote UE and the 5G ProSe Remote UE via the AMF of the 5G ProSe UE-to-Network Relay and the 5G ProSe UE-to-Network Relay. Based on SUPI, the UDM can choose the authentication method.

7a. If EAP-AKA' is selected by UDM, the AUSF of the 5G ProSe Remote UE can trigger authentication of the 5G ProSe Remote UE based on EAP-AKA'. The AUSF of the 5G ProSe Remote UE generates the EAP-Request/AKA'-Challenge message and send EAP-Request/AKA'-Challenge message to the AMF of the 5G ProSe UE-to-Network Relay in a Nausf_UEAuthentication_ProSeAuthenticate Response message.

7b. The AMF of the 5G ProSe UE-to-Network Relay can forward the Relay Authentication Request (including the EAP-Request/AKA'-Challenge) to the 5G ProSe UE-to-Network Relay over NAS message, including transaction identifier of the 5G ProSe Remote UE in the message. The NAS message is protected using the NAS security context created for the 5G ProSe UE-to-Network Relay.

7c. Based on the transaction identifier, the 5G ProSe UE-to-Network Relay can forwards the EAP-Request/AKA'-Challenge to the 5G ProSe Remote UE over PC5 messages.

The USIM in the 5G ProSe Remote UE verifies the freshness of the received values by checking whether AUTN can be accepted.

For EAP-AKA', the USIM computes a response RES. The USIM can return RES, CK, IK to the ME. The ME can derive CK' and IK'.

7d. The 5G ProSe Remote UE can return EAP-Response/AKA'-Challenge to the 5G ProSe UE-to-Network Relay over PC5 messages.

7e. The 5G ProSe UE-to-Network Relay forwards the EAP-Response/AKA'-Challenge together with the transaction identifier of the 5G ProSe Remote UE to the AMF of the 5G ProSe UE-to-Network Relay in a NAS message Relay Authentication Response.

7f. The AMF of the 5G ProSe UE-to-Network Relay forwards EAP-Response/AKA'-Challenge to the AUSF of the 5G ProSe Remote UE via Nausf_UEAuthentication_ProSeAuthenticate Request.

The AUSF of the 5G ProSe Remote UE performs the UE authentication by verifying the received information.

For EAP-AKA', the AUSF of the 5G ProSe Remote UE and the 5G ProSe Remote UE may exchange EAP-Request/AKA'-Notification and EAP-Response/AKA'-Notification messages via the AMF of the 5G ProSe UE-to-Network Relay. After the exchanges, the AUSF of the 5G ProSe Remote UE derives $K_{AUSF}$ without calculating the $K_{SEAF}$ The AUSF of the 5G ProSe Remote UE and the 5G ProSe Remote UE can derive a new $K_{AUSF\_P}$ (different from $K_{AUSF}$). NAS SMC procedure is not performed between 5G ProSe Remote UE and AMF of the 5G ProSe UE-to-Network Relay.

8. As shown in FIG. 2B, which continues the process from FIG. 2A, on successful authentication, the AUSF of the 5G ProSe Remote UE and the 5G ProSe Remote UE can generate 5GPRUK as specified in Annex A.2 and 5GPRUK ID using the newly derived $K_{AUSF\_P}$.

9. The AUSF of the 5G ProSe Remote UE can generate the $K_{NR\_ProSe\_key}$.

10-11. The AUSF of the 5G ProSe Remote UE can send the $K_{NR\_ProSe}$, Nonce_2 in Nausf_UEAuthentication_Prose-Authenticate Response message to the 5G ProSe UE-to-Network Relay via the AMF of the 5G ProSe UE-to-Network Relay. When receiving a $K_{NR\_ProSe}$ from the AUSF of the 5G ProSe Remote UE, the AMF of the 5G ProSe UE-to-Network Relay can not attempt to trigger NAS SMC procedure with the 5G ProSe Remote UE. The 5G ProSe UE-to-Network Relay derives PC5 session key Krelay-sess and confidentiality and integrity keys from $K_{NR\_ProSe}$.

12. The 5G ProSe UE-to-Network Relay can send the received Nonce_2 to the 5G ProSe Remote UE in Direct Security mode command message, which is protected using Krelay-policies between the 5G ProSe Remote UE and the 5G ProSe UE-to-Network Relay.

13-15b. The 5G ProSe Remote UE can use the 5GPRUK ID to locate the KAUSF_P/5GPRUK to be used for the PC5 link security. The 5G ProSe Remote UE can generate the KNR_ProSe key to be used for Remote access via the 5G ProSe UE-to-Network Relay in the same way as defined in step 9. The 5G ProSe Remote UE can derive PC5 session key Krelay-sess and confidentiality and integrity keys from KNR_ProSe the same way as defined in step 11. The 5G ProSe Remote UE can send the Direct Security Mode Complete message containing its PC5 user plane security policies to the 5G ProSe UE-to-Network relay, which is protected by Krelay-int or/and Krelay-enc derived from Krelay-sess according to the negotiated PC5 signalling policies between the 5G ProSe Remote UE and the 5G ProSe UE-to-Network Relay. After the successful verification of the Direct Security Mode complete message, the 5G ProSe UE-to-Network Relay responds a Direct Communication Accept message to the ProSe Remote UE to finish the PC5 connection establishment procedures.

Further communication between the 5G ProSe Remote UE and the Network takes place securely via the 5G ProSe UE-to-Network Relay.

II. Case 1: The Remote UE use SUCI or 5G PRUK ID. No PAnF.

II.(a) Case 1.1: AUSF generate $K_{NR\_Prose}$ and store 5G PRUK.

Figure 3A:
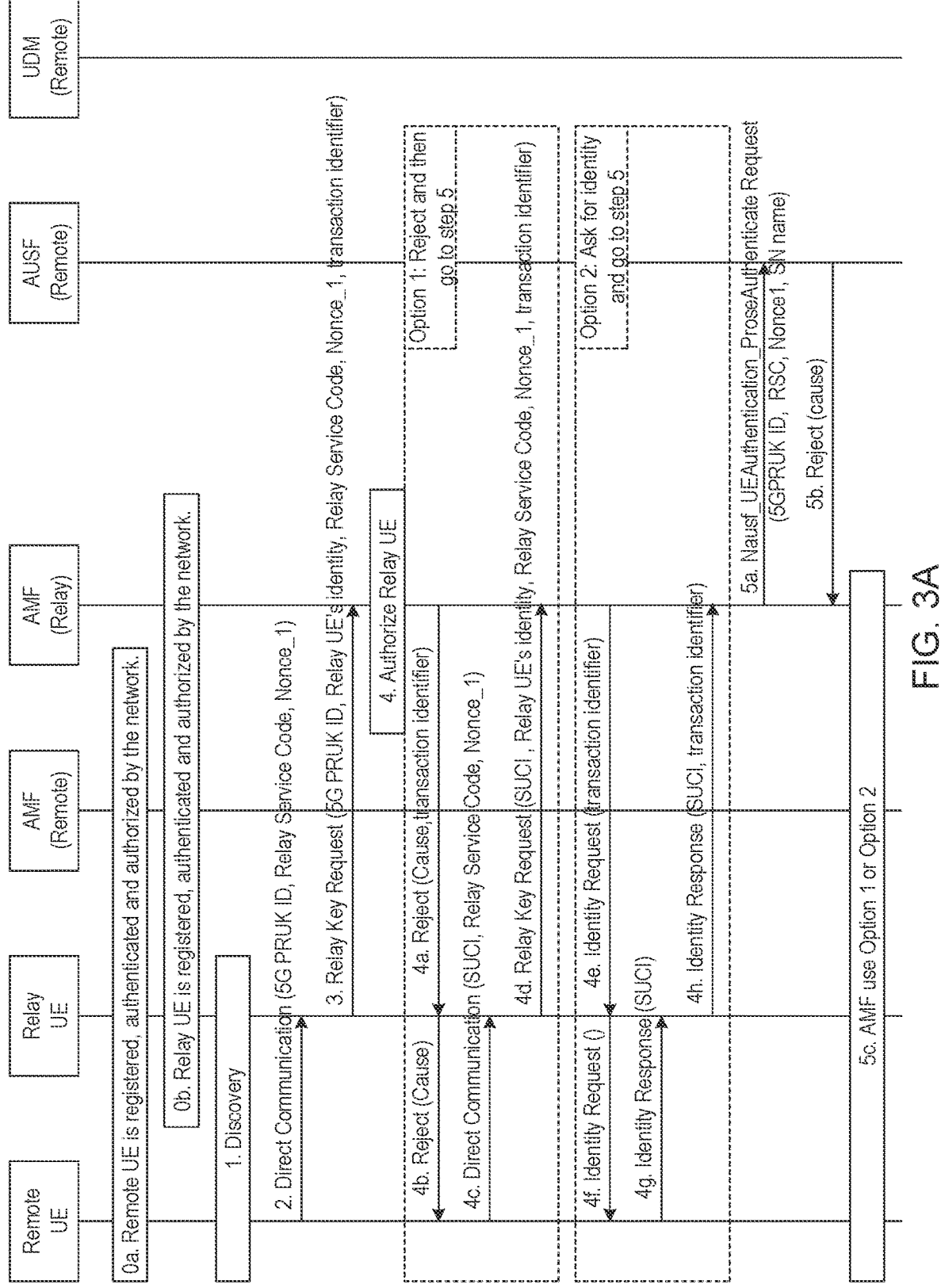
FIGS. 3A-3B show an example flowchart of a security procedure where the Remote user equipment (UE) uses either subscription concealed identifier (SUCI) or 5G ProSe Relay User Key (PRUK) identifier (ID) without prose anchor function (PAnF) and authentication server function (AUSF) store the 5G PRUK.
Figure 3B:
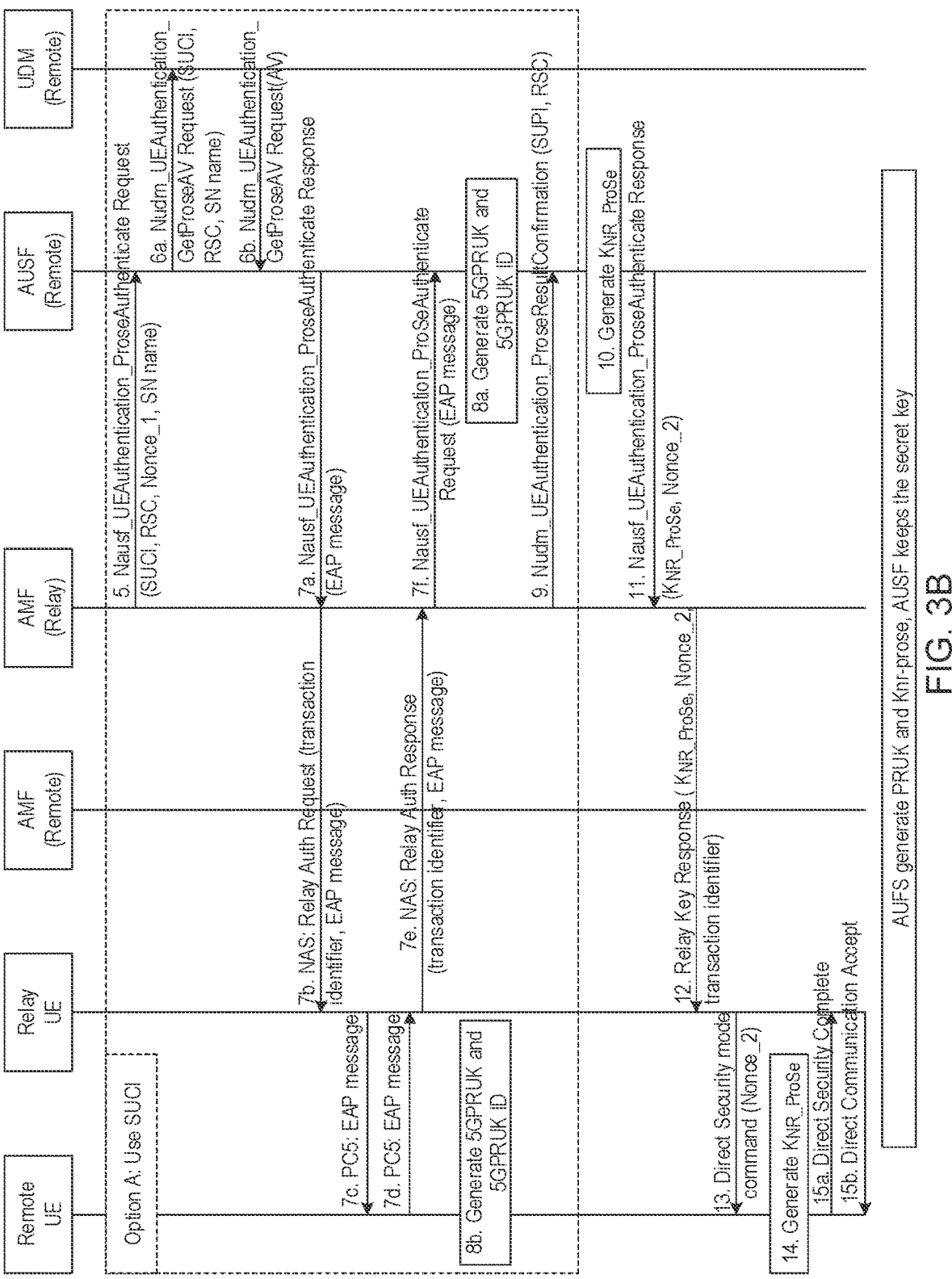

FIGS. 3A-3B show an example flowchart of a security procedure where the Remote UE uses either SUCI or 5G PRUK ID without PAnF. FIG. 3B is a continuation of the process in FIG. 3A.

0. The Remote UE and relay UE can be registered with the network. The UE-to-Network relay can be authenticated and authorized by the network to support as a relay UE. Remote UE can be authenticated and authorized by the network to act as a Remote UE.

1. The remote UE can initiate discovery procedure using any of Model A or Model B method.

2. After the discovery of the UE-to-Network relay, the Remote UE can send a Direct Communication Request to the relay UE for establishing secure PC5 unicast link. The Remote UE can include its security capabilities and security policy in the DCR message. The message can also include 5GPRUK ID if available, Relay Service Code, Nonce_1. If UE has no available 5G PRUK ID or the 5G PRUK ID has been reject before, the UE can use SUCI instead of 5G PRUK ID.

3. Upon receiving the DCR message, the Relay UE can send the relay key request to the relay AMF, including the parameters received in the DCR message.

4. The Relay AMF can verify whether the relay UE is authorized to act as U2N relay. The Relay AMF decides to whether to authenticate the Remote UE. If so, AMF use Option 1 or Option 2. Otherwise go to step 5a.

Option 1

4a. If the Relay AMF decide to authenticate the Remote UE based on its (the Relay AMF's) local policy, then the Relay AMF sends Reject message include the cause and the transaction identifier. The local policy may indicate that, for example, the AMF may store a mapping between 5G PRUK ID and network function (NF) instance ID), but if the mapping information is not available, e.g., the NF instance ID is invalid, then the AMF cannot find the NF related to the 5G PRUK ID. In some embodiments, if AMF may not know how to use the 5G PRUK ID, the AMF may trigger the remote UE to use SUCI, so that the remote UE can be authenticated whenever the remote UE try to use the relay UE service. In such embodiments, the PRUK can be refreshed. In some embodiments, if the AMF receives a reject message or no key response from the other NF, the AMF can send a message to the relay UE to send to the remote UE to trigger the remote UE to send SUCI.

4b. The Relay UE forward the Reject message to the Remote UE. The cause in the Reject message indicates that Remote UE should send another message so that the Reject message triggers the Remote UE to send a new DCR message as mentioned in 4c.

4c. The Remote UE sends a new DCR message, the message can include the Remote UE's SUCI, Relay service code and Nonce_1. The Nonce_1 can be the same or different with the Nonce_1 in step 2.

4d. The Relay UE can send the relay key request to the relay AMF, including the parameters received in the DCR message. Then go to Step 5.

Option 2

4e. If the Relay AMF decide to authenticate the Remote UE based on its (the Relay AMF's) local policy, then the Relay AMF sends Identity Request message include the transaction identifier.

4f. The Relay UE forward the Identity Request message to the Remote UE. The Identity request message indicates to the Remote UE that the Relay AMF is requesting SUCI from the Remote UE.

4g. The Remote UE sends its SUCI in the Identity Response message

4h. The Relay UE forward the Identity Response message to the Relay AMF. Then go to Step 5.

5a. The relay AMF can select AUSF based on 5GPRUK ID and sends a Nausf_UEAuthentication_ProseAuthenticate Request to AUSF. The request message include 5GPRUK ID, RSC, Nonce1, SN name.

If AMF can use 5G PRUK ID to find a AUSF instance ID which is stored in the Relay AMF, then the AMF select the AUSF.

If RID is included in the 5G PRUK ID, the AUSF selection should consider the RID.

The 5GPRUK ID may be generated as follows:

5GPRUK ID is in NAI format as specified in clause 2.2 of IETF RFC 7542, e.g. username@realm. The username part can include the RID and the P-TID (Prose Temporary UE Identifier), and the realm part can include Home Network Identifier.

The P-TID is derived from $K_{AUSF}$ or Kausf_p.

5b. If the AUSF can not find the 5G PRUK which is related to the 5G PRUK ID. The AUSF sends a reject response to the AMF with a cause.

5c. AMF use Option 1 or Option 2.

5. As shown in FIG. 3B, which is a continuation of the process in FIG. 3A, the relay AMF sends a Nausf_UEAuthentication_ProseAuthenticate Request to AUSF. The request message include 5GPRUK ID, RSC, Nonce1, SN name.

6a~6b. The AUSF can retrieve the Authentication Vectors from the UDM via Nudm_UEAuthentication_GetProseAv Request message and trigger authentication of the remote UE.

7a. If EAP-AKA' is selected by UDM, the AUSF of the 5G ProSe Remote UE can trigger authentication of the 5G ProSe Remote UE based on EAP-AKA'. The AUSF of the 5G ProSe Remote UE generates the EAP-Request/AKA'-Challenge message and send EAP-Request/AKA'-Challenge message to the AMF of the 5G ProSe UE-to-Network Relay in a Nausf_UEAuthentication_ProSeAuthenticate Response message.

7b. The AMF of the 5G ProSe UE-to-Network Relay can forward the Relay Authentication Request (including the EAP-Request/AKA'-Challenge) to the 5G ProSe UE-to-Network Relay over NAS message, including transaction identifier of the 5G ProSe Remote UE in the message. The NAS message is protected using the NAS security context created for the 5G ProSe UE-to-Network Relay.

7c. Based on the transaction identifier, the 5G ProSe UE-to-Network Relay can forwards the EAP-Request/AKA'-Challenge to the 5G ProSe Remote UE over PC5 messages.

The USIM in the 5G ProSe Remote UE verifies the freshness of the received values by checking whether AUTN can be accepted.

For EAP-AKA', the USIM computes a response RES. The USIM can return RES, CK, IK to the ME. The ME can derive CK' and IK'.

7d. The 5G ProSe Remote UE can return EAP-Response/AKA'-Challenge to the 5G ProSe UE-to-Network Relay over PC5 messages.

7e. The 5G ProSe UE-to-Network Relay forwards the EAP-Response/AKA'-Challenge together with the transaction identifier of the 5G ProSe Remote UE to the AMF of the 5G ProSe UE-to-Network Relay in a NAS message Relay Authentication Response.

7f. The AMF of the 5G ProSe UE-to-Network Relay forwards EAP-Response/AKA'-Challenge to the AUSF of the 5G ProSe Remote UE via Nausf_UEAuthentication_ ProSeAuthenticate Request.

The AUSF of the 5G ProSe Remote UE performs the UE authentication by verifying the received information.

For EAP-AKA', the AUSF of the 5G ProSe Remote UE and the 5G ProSe Remote UE may exchange EAP-Request/AKA'-Notification and EAP-Response/AKA'-Notification messages via the AMF of the 5G ProSe UE-to-Network Relay. After the exchanges, the AUSF of the 5G ProSe Remote UE derives $K_{AUSF}$ without calculating the KSEAF.

The AUSF of the 5G ProSe Remote UE and the 5G ProSe Remote UE can derive a new $K_{AUSF\_P}$ (different from $K_{AUSF}$). NAS SMC procedure is not performed between 5G ProSe Remote UE and AMF of the 5G ProSe UE-to-Network Relay.

8.0n successful authentication, the AUSF of the 5G ProSe Remote UE and the 5G ProSe Remote UE can generate 5GPRUK and 5GPRUK ID using the newly derived $K_{AUSF\_P}$.

9. AUSF sends a Nudm_UEAuthentication_ProSeResult-Confirmation to the UDM.

10. The AUSF of the 5G ProSe Remote UE can generate the $K_{NR\_ProSe\ key}$.

11. The AUSF of the 5G ProSe Remote UE can send the $K_{NR\_ProSe}$, Nonce_2 in Nausf_UEAuthentication_ProSeAuthenticate Response message to the 5G ProSe UE-to-Network Relay via the AMF of the 5G ProSe UE-to-Network Relay. When receiving a $K_{NR\_ProSe}$ from the AUSF of the 5G ProSe Remote UE, the AMF of the 5G ProSe UE-to-Network Relay can not attempt to trigger NAS SMC procedure with the 5G ProSe Remote UE. The 5G ProSe UE-to-Network Relay derives PC5 session key Krelay-sess and confidentiality and integrity keys from KNR_ProSe.

12. The 5G ProSe UE-to-Network Relay can send the received Nonce_2 to the 5G ProSe Remote UE in Direct Security mode command message, which is protected using Krelay-int or/and Krelay-enc derived from Krelay-sess according to the negotiated PC5 signalling policies between the 5G ProSe Remote UE and the 5G ProSe UE-to-Network Relay.

13-15b. The 5G ProSe Remote UE can use the 5GPRUK ID to locate the $K_{AUSF}$_P/5GPRUK to be used for the PC5 link security. The 5G ProSe Remote UE can generate the KNR_ProSe key to be used for Remote access via the 5G ProSe UE-to-Network Relay. The 5G ProSe Remote UE can derive PC5 session key Krelay-sess and confidentiality and integrity keys from KNR_ProSe. The 5G ProSe Remote UE can send the Direct Security Mode Complete message containing its PC5 user plane security policies to the 5G ProSe UE-to-Network relay, which is protected by Krelay-int or/and Krelay-enc derived from Krelay-sess according to the negotiated PC5 signalling policies between the 5G ProSe Remote UE and the 5G ProSe UE-to-Network Relay. After the successful verification of the Direct Security Mode complete message, the 5G ProSe UE-to-Network Relay responds a Direct Communication Accept message to the 5G ProSe Remote UE to finish the PC5 connection establishment procedures.

FIG. 20 shows an example flowchart for facilitating network security between a network device and a remote communication device. Operation 2002 includes receiving, by a network device, a request message that includes an identifier associated with a first communication device. Operation 2004 includes determining, by the network device in response to the receiving, that the first communication device is authenticated based on a local policy of the network device. Operation 2006 includes sending, by the network device in response to the determining, a message to a second communication device to relay to the first communication device, where the message indicates that the identifier is rejected by the network device for communication with the first communication device, or where the message indicates that the first communication device is triggered to send another identifier.

In some embodiments, the message is a reject message that includes a cause of a rejection and a transaction identifier, the reject message indicates that the identifier is rejected by the network device for communication with the first communication device, and the method further comprises: receiving, from the first communication device and in response to the sending, a second message that includes a subscription concealed identifier (SUCI). In some embodiments, the message is an identity request message that includes a transaction identifier, and the method further comprises: receiving, from the first communication device and in response to the sending, a second message that includes a subscription concealed identifier (SUCI). In some embodiments, the second communication device is authorized to act as a relay between the first communication device and a communication network that includes the network device. In some embodiments, the identifier includes a 5G ProSe Relay User Key (PRUK) identifier (ID). In some embodiments, the network device includes a remote access and mobility management function (AMF) device.

II.(b) Case 1.2: AUSF Generate $K_{NR\_Prose}$ and UDM Store 5G PRUK.

UDM Stores 5G PRUK

Figure 4A:
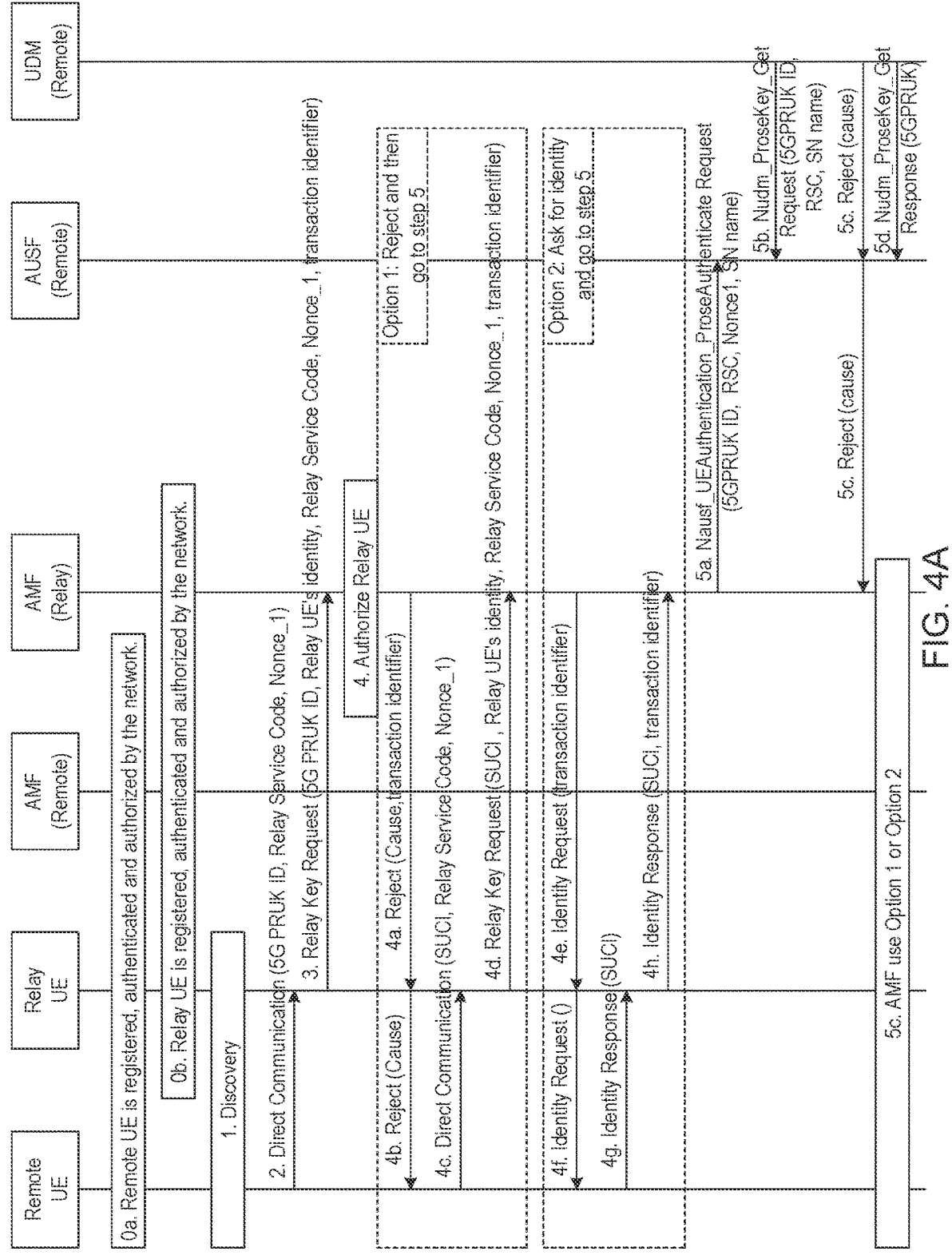
FIGS. 4A-4B shows an example flowchart of a security procedure where the Remote UE uses either SUCI or 5G PRUK ID and AUSF generates $K_{NR\_Prose}$ and unified data management (UDM) stores 5G RPUK.
Figure 4B:
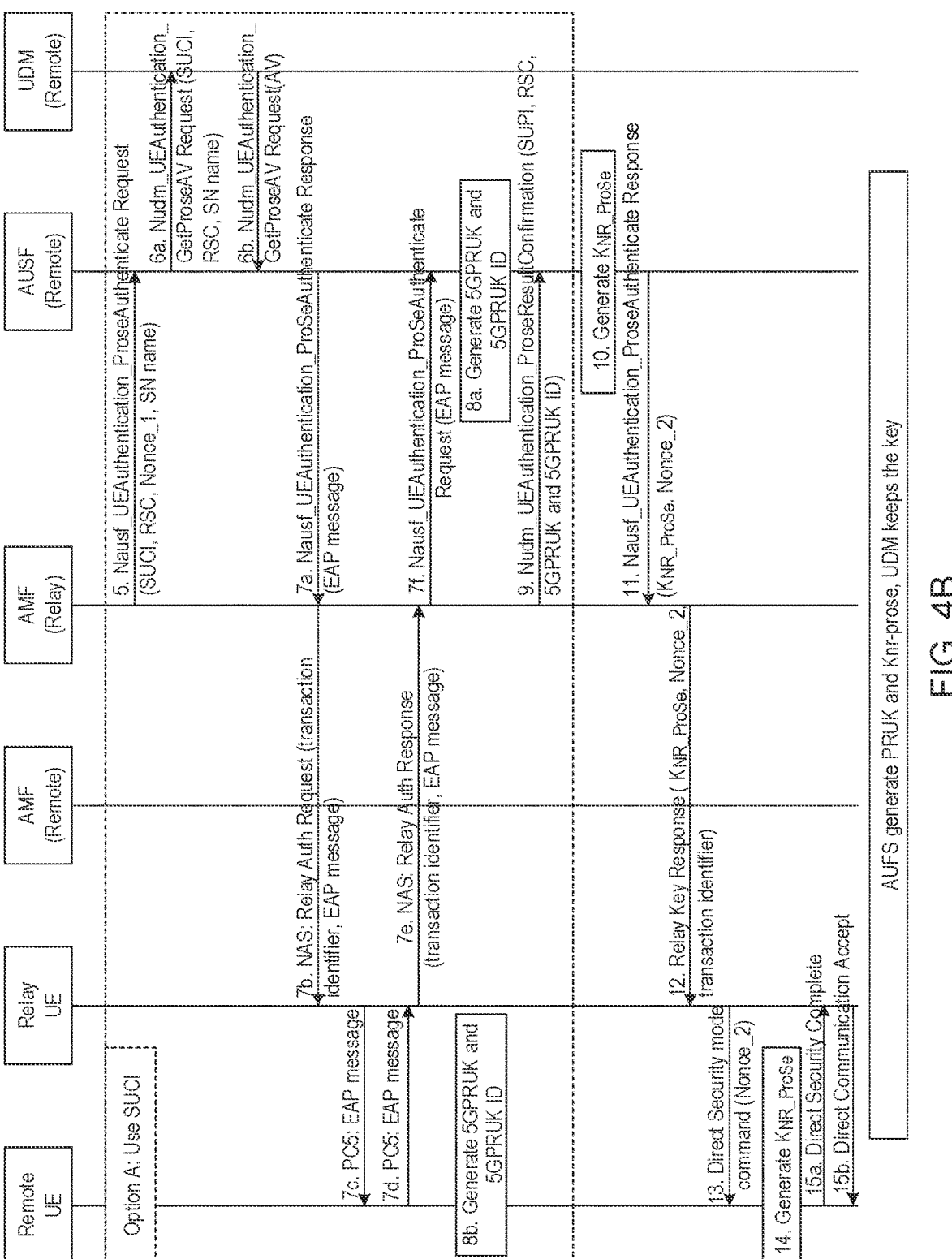

FIGS. 4A-4B show an example flowchart of a security procedure where AUSF generates $K_{NR\_Prose}$ and UDM stores 5G RPUK. FIG. 4B is a continuation of the process in FIG. 4A.

0. The Remote UE and relay UE can be registered with the network. The UE-to-Network relay can be authenticated and authorized by the network to support as a relay UE. Remote UE can be authenticated and authorized by the network to act as a Remote UE.

1. The remote UE can initiate discovery procedure using any of Model A or Model B method.

2. After the discovery of the UE-to-Network relay, the Remote UE can send a Direct Communication Request to the relay UE for establishing secure PC5 unicast link. The Remote UE can include its security capabilities and security policy in the DCR message. The message can also include 5GPRUK ID if available, Relay Service Code, Nonce_1. If UE has no available 5G PRUK ID or the 5G PRUK ID has been reject before, the UE can use SUCI instead of 5G PRUK ID.

3. Upon receiving the DCR message, the Relay UE can send the relay key request to the relay AMF, including the parameters received in the DCR message.

4. The Relay AMF can verify whether the relay UE is authorized to act as U2N relay. The Relay AMF decides to whether to authenticate the Remote UE. If so, AMF use Option 1 or Option 2. Otherwise go to step 5a.

Option 1

4a. If the Relay AMF decide to authenticate the Remote UE based on its (the Relay AMF's) local policy, then the Relay AMF sends Reject message include the cause and the transaction identifier.

4b. The Relay UE forward the Reject message to the Remote UE.

4c. The Remote UE sends a new DCR message, the message can include the Remote UE's SUCI, Relay service code and Nonce_1. The Nonce_1 can be the same or different with the Nonce_1 in step 2.

4d. The Relay UE can send the relay key request to the relay AMF, including the parameters received in the DCR message. Then go to Step 5.

Option 2

4e. If the Relay AMF decide to authenticate the Remote UE based on its (the Relay AMF's) local policy, then the Relay AMF sends Identity Request message include the transaction identifier.

4f. The Relay UE forward the Identity Request message to the Remote UE.

4g. The Remote UE sends its SUCI in the Identity Response message

4h. The Relay UE forward the Identity Response message to the Relay AMF. Then go to Step 5.

5a. The relay AMF can select AUSF based on 5GPRUK ID and sends a Nausf_UEAuthentication_ProseAuthenticate Request to AUSF. The request message include 5GPRUK ID, RSC, Nonce1, SN name.

5b. The AUSF sends the Nudm_Prosekey_Get Request to UDM

5c. The UDM may decide to authenticate the UE based on its local policy and sends a reject message with a cause to AUSF. Then AUSF forward the Reject message to Relay AMF, Relay AMF use Option 1 or Option 2.

5d. If UDM decide not to authenticate the UE, then UDM sends a response to the AUSF with the 5G PRUK. The UDM may also sends a Nonce_2 to AUSF. Then go to step 10.

5. As shown in FIG. 4B, which is a continuation of the process in FIG. 4A, the relay AMF sends a Nausf_UEAuthentication_ProseAuthenticate Request to AUSF. The request message include 5GPRUK ID, RSC, Nonce1, SN name.

6a~6b. The AUSF can retrieve the Authentication Vectors from the UDM via Nudm_UEAuthentication_GetProseAv Request message and trigger authentication of the remote UE.

7a. If EAP-AKA' is selected by UDM, the AUSF of the 5G ProSe Remote UE can trigger authentication of the 5G ProSe Remote UE based on EAP-AKA'. The AUSF of the 5G ProSe Remote UE generates the EAP-Request/AKA'-Challenge message and send EAP-Request/AKA'-Challenge message to the AMF of the 5G ProSe UE-to-Network Relay in a Nausf_UEAuthentication_ProSeAuthenticate Response message.

7b. The AMF of the 5G ProSe UE-to-Network Relay can forward the Relay Authentication Request (including the EAP-Request/AKA'-Challenge) to the 5G ProSe UE-to-Network Relay over NAS message, including transaction identifier of the 5G ProSe Remote UE in the message. The NAS message is protected using the NAS security context created for the 5G ProSe UE-to-Network Relay.

7c. Based on the transaction identifier, the 5G ProSe UE-to-Network Relay can forwards the EAP-Request/AKA'-Challenge to the 5G ProSe Remote UE over PC5 messages.

The USIM in the 5G ProSe Remote UE verifies the freshness of the received values by checking whether AUTN can be accepted.

For EAP-AKA', the USIM computes a response RES. The USIM can return RES, CK, IK to the ME. The ME can derive CK' and IK'.

7d. The 5G ProSe Remote UE can return EAP-Response/AKA'-Challenge to the 5G ProSe UE-to-Network Relay over PC5 messages.

7e. The 5G ProSe UE-to-Network Relay forwards the EAP-Response/AKA'-Challenge together with the transaction identifier of the 5G ProSe Remote UE to the AMF of the 5G ProSe UE-to-Network Relay in a NAS message Relay Authentication Response.

7f. The AMF of the 5G ProSe UE-to-Network Relay forwards EAP-Response/AKA'-Challenge to the AUSF of the 5G ProSe Remote UE via Nausf_UEAuthentication_ProSeAuthenticate Request.

The AUSF of the 5G ProSe Remote UE performs the UE authentication by verifying the received information.

For EAP-AKA', the AUSF of the 5G ProSe Remote UE and the 5G ProSe Remote UE may exchange EAP-Request/AKA'-Notification and EAP-Response/AKA'-Notification messages via the AMF of the 5G ProSe UE-to-Network Relay. After the exchanges, the AUSF of the 5G ProSe Remote UE derives $K_{AUSF}$ without calculating the $K_{SEAF}$ The AUSF of the 5G ProSe Remote UE and the 5G ProSe Remote UE can derive a new $K_{AUSF\_P}$ (different from $K_{AUSF}$) NAS SMC procedure is not performed between 5G ProSe Remote UE and AMF of the 5G ProSe UE-to-Network Relay.

8.On successful authentication, the AUSF of the 5G ProSe Remote UE and the 5G ProSe Remote UE can generate 5GPRUK and 5GPRUK ID using the newly derived $K_{AUSF\_P}$.

9. AUSF sends a Nudm_UEAuthentication_ProseResult-Confirmation to the UDM. The message include SUPI, RSC, 5GPRUK and 5GPRUK ID.

10. The AUSF of the 5G ProSe Remote UE can generate the $K_{NR\_ProSe}$_key. If UDM sends a Nonce_2 to AUSF, then the AUSF use the Nonce_2 to generate the $K_{NR\_ProSe}$ key. Otherwise, AUSF generate the Nonce_2 itself.

11. The AUSF of the 5G ProSe Remote UE can send the $K_{NR\_ProSe}$, Nonce_2 in Nausf_UEAuthentication_ProseAuthenticate Response message to the 5G ProSe UE-to-Network Relay via the AMF of the 5G ProSe UE-to-Network Relay. When receiving a $K_{NR\_ProSe}$ from the AUSF of the 5G ProSe Remote UE, the AMF of the 5G ProSe UE-to-Network Relay can not attempt to trigger NAS SMC procedure with the 5G ProSe Remote UE. The 5G ProSe UE-to-Network Relay derives PC5 session key Krelay-sess and confidentiality and integrity keys from $K_{NR\_ProSe}$.

12. The 5G ProSe UE-to-Network Relay can send the received Nonce_2 to the 5G ProSe Remote UE in Direct Security mode command message, which is protected using Krelay-policies between the 5G ProSe Remote UE and the 5G ProSe UE-to-Network Relay.

13-15b. The 5G ProSe Remote UE can use the 5GPRUK ID to locate the $K_{AUSF\_P}$/5GPRUK to be used for the PC5 link security. The 5G ProSe Remote UE can generate the $K_{NR\_Prose}$ key to be used for Remote access via the 5G ProSe UE-to-Network Relay. The 5G ProSe Remote UE can derive PC5 session key Krelay-sess and confidentiality and integrity keys from $K_{NR\_Prose}$. The 5G ProSe Remote UE can send the Direct Security Mode Complete message containing its PC5 user plane security policies to the 5G ProSe UE-to-Network relay, which is protected by Krelay-int or/and Krelay-enc derived from Krelay-sess according to the negotiated PC5 signalling policies between the 5G ProSe Remote UE and the 5G ProSe UE-to-Network Relay. After the successful verification of the Direct Security Mode complete message, the 5G ProSe UE-to-Network Relay responds a Direct Communication Accept message to the 5G ProSe Remote UE to finish the PC5 connection establishment procedures.

II.(c) Case 1.3: AUSF Generate $K_{NR\_Prose}$. UDM Generate and Store 5G PRUK.

Figure 5A:
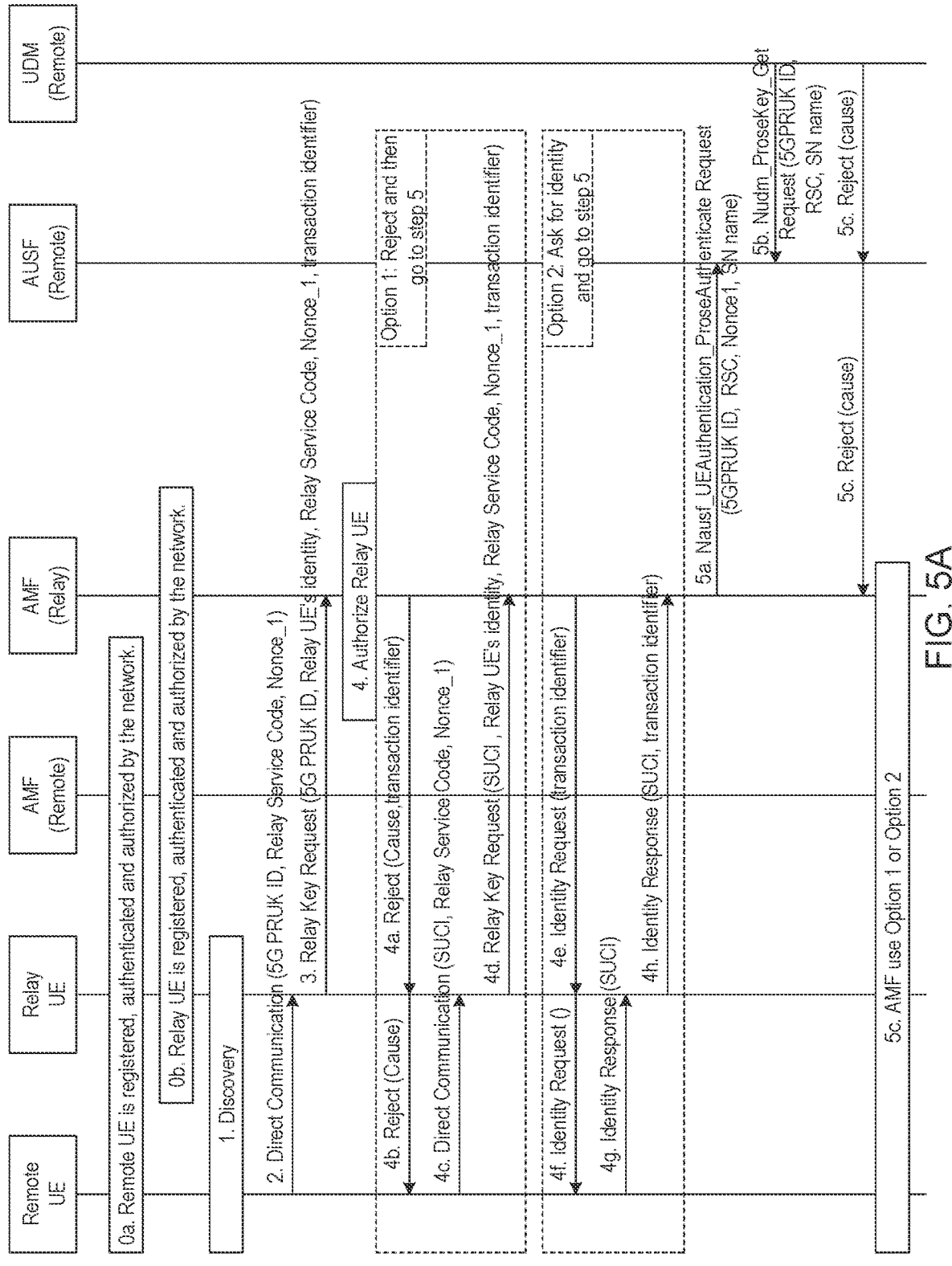
FIGS. 5A-5B show an example flowchart of a security procedure where the Remote UE uses either SUCI or 5G PRUK ID and AUSF generates $K_{NR\_Prose}$, and UDM generates and stores 5G PRUK.
Figure 5B:
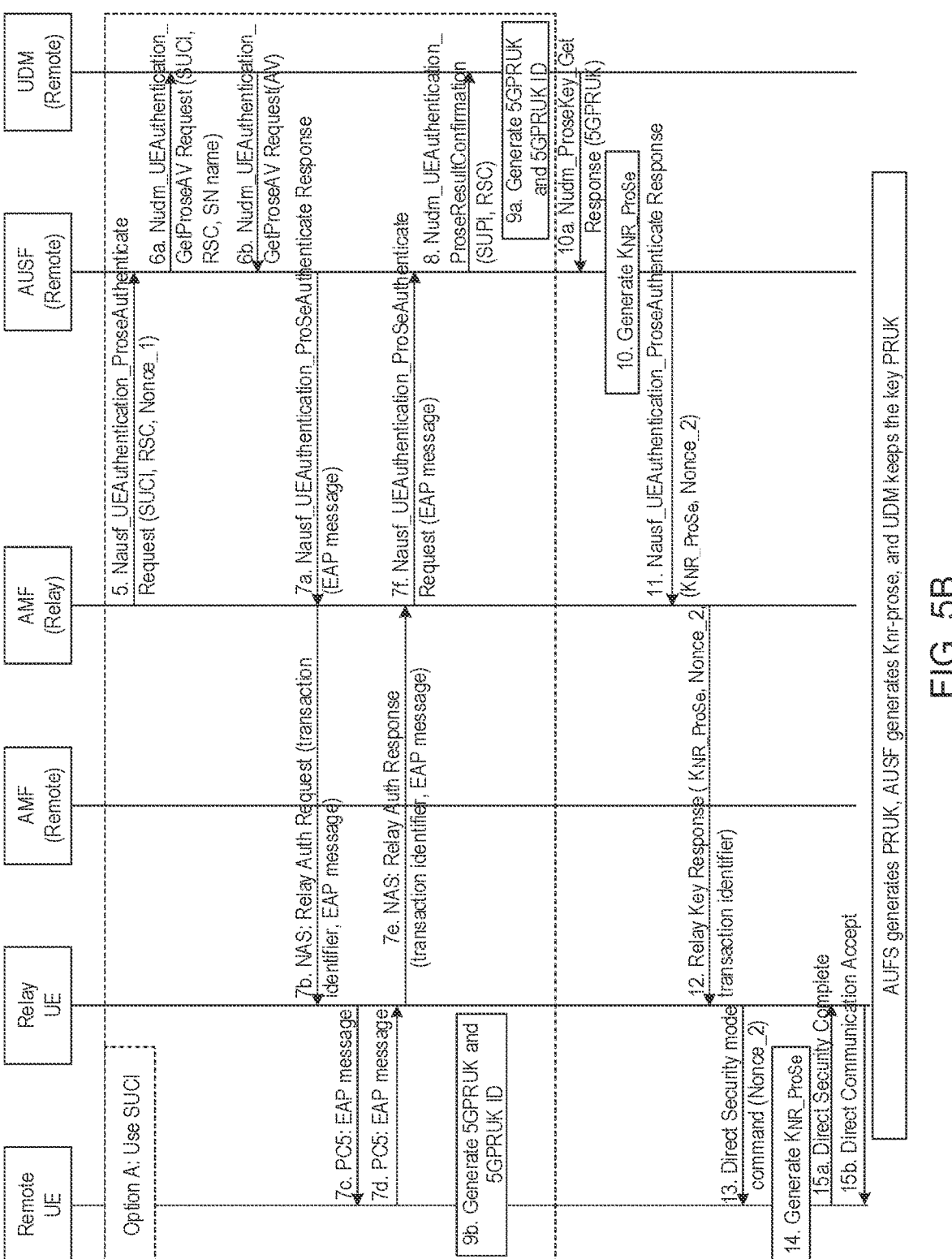

FIGS. 5A-5B show an example flowchart of a security procedure where AUSF generates $K_{NR\_Prose}$, and UDM generates and stores 5G PRUK. FIG. 5B is a continuation of the process in FIG. 5A.

0. The Remote UE and relay UE can be registered with the network. The UE-to-Network relay can be authenticated and authorized by the network to support as a relay UE. Remote UE can be authenticated and authorized by the network to act as a Remote UE.

1. The remote UE can initiate discovery procedure using any of Model A or Model B method.

2. After the discovery of the UE-to-Network relay, the Remote UE can send a Direct Communication Request to the relay UE for establishing secure PC5 unicast link. The Remote UE can include its security capabilities and security policy in the DCR message. The message can also include 5GPRUK ID if available, Relay Service Code, Nonce_1. If UE has no available 5G PRUK ID or the 5G PRUK ID has been reject before, the UE can use SUCI instead of 5G PRUK ID.

3. Upon receiving the DCR message, the Relay UE can send the relay key request to the relay AMF, including the parameters received in the DCR message.

4. The Relay AMF can verify whether the relay UE is authorized to act as U2N relay. The Relay AMF decides to whether to authenticate the Remote UE. If so, AMF use Option 1 or Option 2. Otherwise go to step 5a.

Option 1

4a. If the Relay AMF decide to authenticate the Remote UE based on its (the Relay AMF's) local policy, then the Relay AMF sends Reject message include the cause and the transaction identifier.

4b. The Relay UE forward the Reject message to the Remote UE.

4c. The Remote UE sends a new DCR message, the message can include the Remote UE's SUCI, Relay service code and Nonce_1. The Nonce_1 can be the same or different with the Nonce_1 in step 2.

4d. The Relay UE can send the relay key request to the relay AMF, including the parameters received in the DCR message. Then go to Step 5.

Option 2

4e. If the Relay AMF decide to authenticate the Remote UE based on its (the Relay AMF's) local policy, then the Relay AMF sends Identity Request message include the transaction identifier.

4f. The Relay UE forward the Identity Request message to the Remote UE.

4g. The Remote UE sends its SUCI in the Identity Response message

4h. The Relay UE forward the Identity Response message to the Relay AMF. Then go to Step 5.

5a. The relay AMF can select AUSF based on 5GPRUK ID and sends a Nausf_UEAuthentication_ProseAuthenticate Request to AUSF. The request message include 5GPRUK ID, RSC, Nonce1, SN name.

5b. The AUSF sends the Nausf_UEAuthentication_ProseAuthenticate Request to UDM

5c. The UDM may decide to authenticate the UE based on its local policy and sends a reject message with a cause to AUSF. Then AUSF forward the Reject message to Relay AMF, Relay AMF use Option 1 or Option 2. Then go to step 10a.

5. As shown in FIG. 5B, which is a continuation of the process in FIG. 5A, the relay AMF sends a Nausf_UEAuthentication_ProseAuthenticate Request to AUSF. The request message include 5GPRUK ID, RSC, Nonce1, SN name.

6a~6b. The AUSF can retrieve the Authentication Vectors from the UDM via Nudm_UEAuthentication_GetProseAv Request message and trigger authentication of the remote UE.

7a. If EAP-AKA' is selected by UDM, the AUSF of the 5G ProSe Remote UE can trigger authentication of the 5G ProSe Remote UE based on EAP-AKA'. The AUSF of the 5G ProSe Remote UE generates the EAP-Request/AKA'-Challenge message and send EAP-Request/AKA'-Challenge message to the AMF of the 5G ProSe UE-to-Network Relay in a Nausf_UEAuthentication_ProSeAuthenticate Response message.

7b. The AMF of the 5G ProSe UE-to-Network Relay can forward the Relay Authentication Request (including the EAP-Request/AKA'-Challenge) to the 5G ProSe UE-to-Network Relay over NAS message, including transaction identifier of the 5G ProSe Remote UE in the message. The NAS message is protected using the NAS security context created for the 5G ProSe UE-to-Network Relay.

7c. Based on the transaction identifier, the 5G ProSe UE-to-Network Relay can forwards the EAP-Request/AKA'-Challenge to the 5G ProSe Remote UE over PC5 messages.

The USIM in the 5G ProSe Remote UE verifies the freshness of the received values by checking whether AUTN can be.

For EAP-AKA', the USIM computes a response RES. The USIM can return RES, CK, IK to the ME. The ME can derive CK' and IK'.

7d. The 5G ProSe Remote UE can return EAP-Response/AKA'-Challenge to the 5G ProSe UE-to-Network Relay over PC5 messages.

7e. The 5G ProSe UE-to-Network Relay forwards the EAP-Response/AKA'-Challenge together with the transaction identifier of the 5G ProSe Remote UE to the AMF of the 5G ProSe UE-to-Network Relay in a NAS message Relay Authentication Response.

7f. The AMF of the 5G ProSe UE-to-Network Relay forwards EAP-Response/AKA'-Challenge to the AUSF of the 5G ProSe Remote UE via Nausf_UEAuthentication_ProSeAuthenticate Request.

The AUSF of the 5G ProSe Remote UE performs the UE authentication by verifying the received information.

For EAP-AKA', the AUSF of the 5G ProSe Remote UE and the 5G ProSe Remote UE may exchange EAP-Request/AKA'-Notification and EAP-Response/AKA'-Notification messages via the AMF of the 5G ProSe UE-to-Network Relay. After the exchanges, the AUSF of the 5G ProSe Remote UE derives $K_{AUSF}$ without calculating the $K_{SEAF}$ The AUSF of the 5G ProSe Remote UE and the 5G ProSe Remote UE can derive a new $K_{AUSF\_P}$ (different from $K_{AUSF}$) NAS SMC procedure is not performed between 5G ProSe Remote UE and AMF of the 5G ProSe UE-to-Network Relay.

8.0n successful authentication, the AUSF of the 5G ProSe Remote UE and the 5G ProSe Remote UE can generate 5GPRUK and 5GPRUK ID using the newly derived $K_{AUSF\_P}$.

9. AUSF sends a Nudm_UEAuthentication_ProseResult-Confirmation to the UDM. The message include SUPI, RSC.

10a. UDM sends a Nudm_ProseKey_Get Response to the AUSF with the 5G PRUK. The UDM may also sends a Nonce_2 to AUSF 10. The AUSF of the 5G ProSe Remote UE can generate the $K_{NR\_ProSe}$ key. If UDM sends a Nonce_2 to AUSF, then the AUSF use the Nonce_2 to generate the $K_{NR\_ProSe}$ key. Otherwise, AUSF generate the Nonce_2 itself.

11. The AUSF of the 5G ProSe Remote UE can send the $K_{NR\_ProSe}$, Nonce_2 in Nausf_UEAuthentication_ProseAuthenticate Response message to the 5G ProSe UE-to-Network Relay via the AMF of the 5G ProSe UE-to-Network Relay. When receiving a $K_{NR\_ProSe}$ from the AUSF of the 5G ProSe Remote UE, the AMF of the 5G ProSe UE-to-Network Relay can not attempt to trigger NAS SMC procedure with the 5G ProSe Remote UE. The 5G ProSe UE-to-Network Relay derives PC5 session key Krelay-sess and confidentiality and integrity keys from $K_{NR\_ProSe}$.

12. The 5G ProSe UE-to-Network Relay can send the received Nonce_2 to the 5G ProSe Remote UE in Direct Security mode command message, which is protected using Krelay-int or/and Krelay-enc derived from Krelay-sess according to the negotiated PC5 signalling policies between the 5G ProSe Remote UE and the 5G ProSe UE-to-Network Relay.

13-15b. The 5G ProSe Remote UE can use the 5GPRUK ID to locate the $K_{AUSF}\_P$/5GPRUK to be used for the PC5 link security. The 5G ProSe Remote UE can generate the $K_{NR\_ProSe}$ key to be used for Remote access via the 5G ProSe UE-to-Network Relay. The 5G ProSe Remote UE can derive PC5 session key Krelay-sess and confidentiality and integrity keys from $K_{NR\_ProSe}$. The 5G ProSe Remote UE can send the Direct Security Mode Complete message containing its PC5 user plane security policies to the 5G ProSe UE-to-Network relay, which is protected by Krelay-int or/and Krelay-enc derived from Krelay-sess according to the negotiated PC5 signalling policies between the 5G ProSe Remote UE and the 5G ProSe UE-to-Network Relay. After the successful verification of the Direct Security Mode complete message, the 5G ProSe UE-to-Network Relay responds a Direct Communication Accept message to the 5G ProSe Remote UE to finish the PC5 connection establishment procedures.

II.(d) Case 1.4: UDM Generate 5G PRUK and $K_{NR\_Prose}$ and Store 5G PRUK.

Figure 6A:
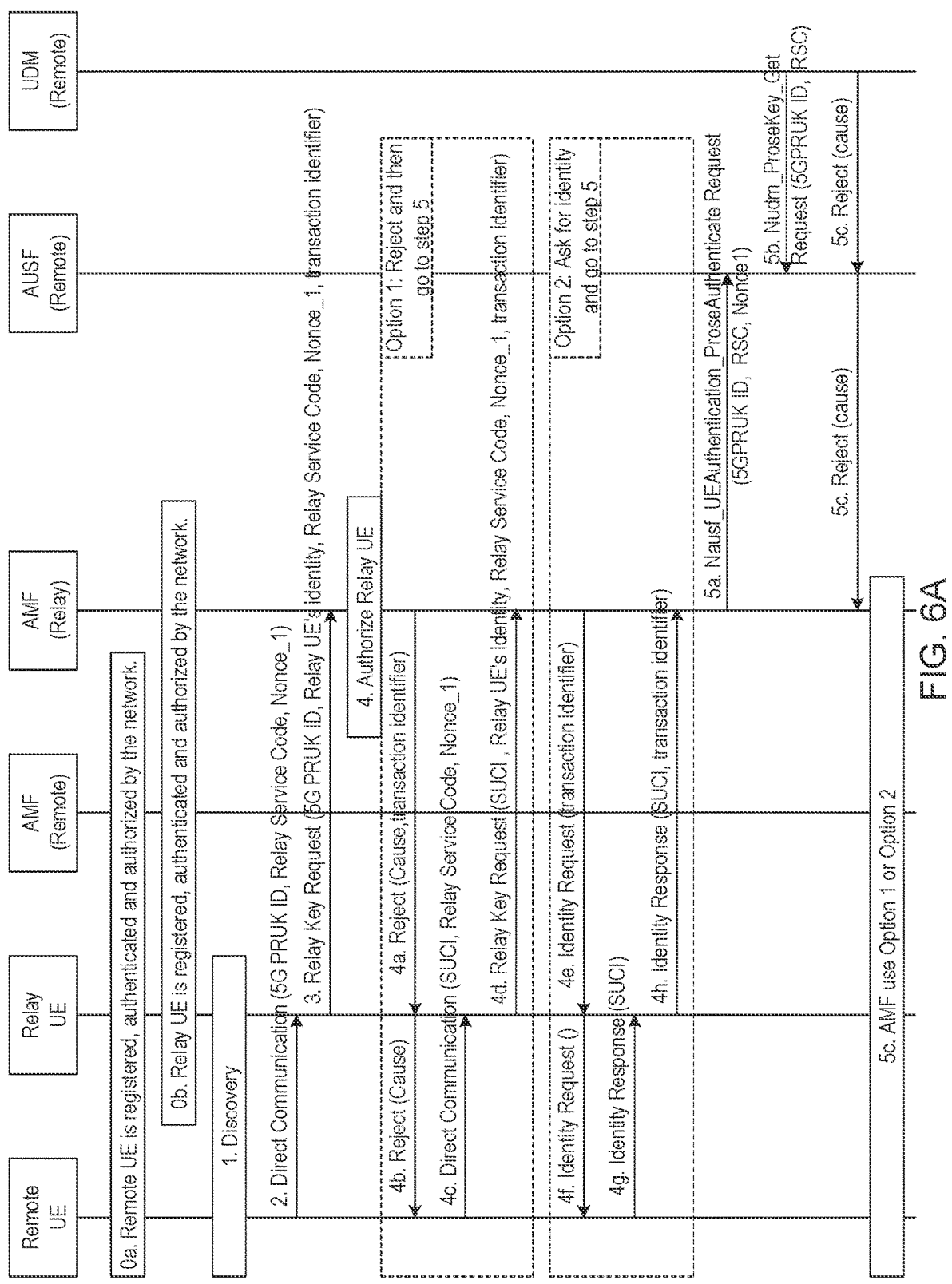
FIGS. 6A-6B show an example flowchart of a security procedure where the Remote UE uses either SUCI or 5G PRUK ID and UDM generates 5G PRUK and $K_{NR\_Prose}$ and stores 5G PRUK.
Figure 6B:
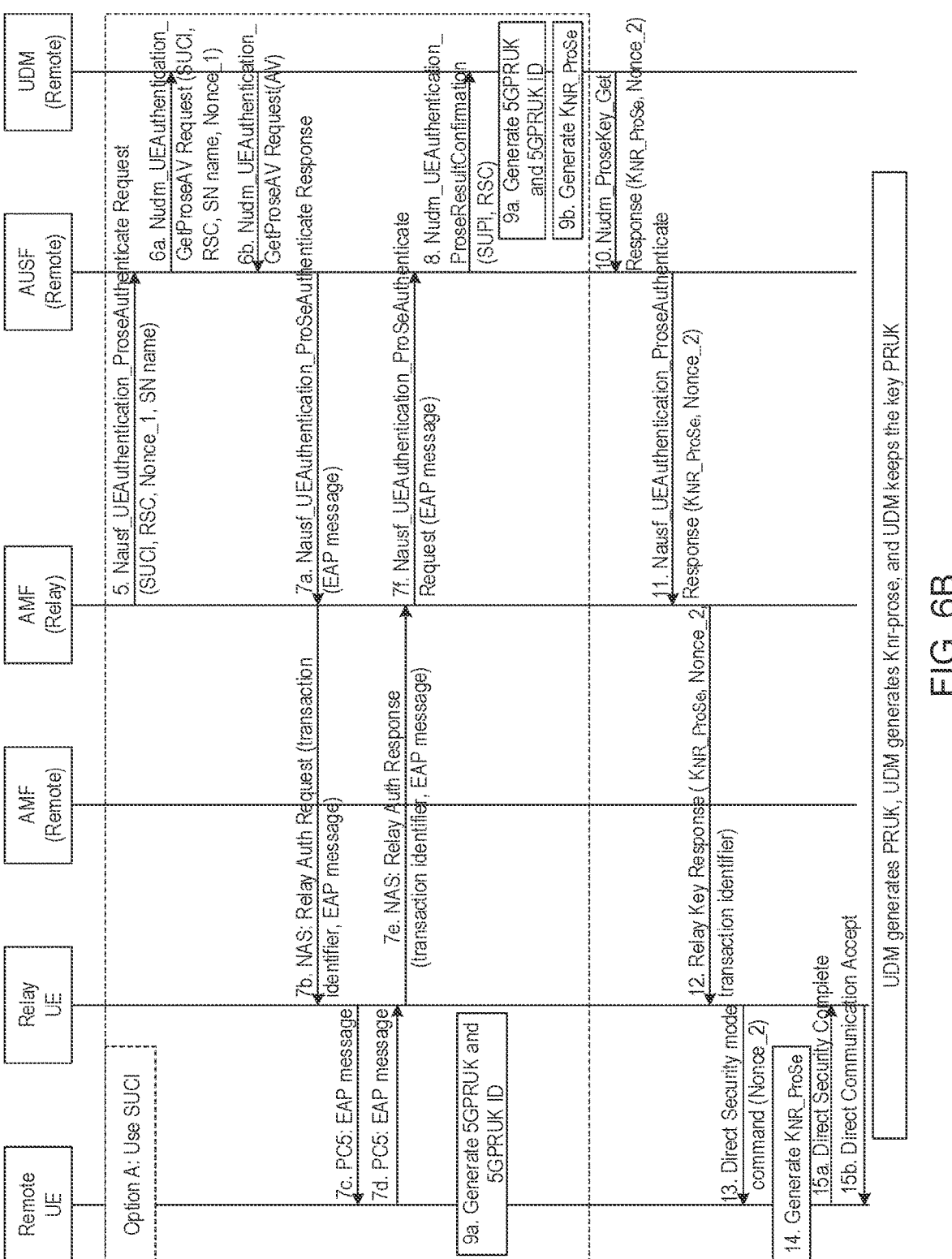

FIGS. 6A-6B show an example flowchart of a security procedure where UDM generates 5G PRUK and $K_{NR\_Prose}$ and stores 5G PRUK. FIG. 6B is a continuation of the process in FIG. 6A.

0. The Remote UE and relay UE can be registered with the network. The UE-to-Network relay can be authenticated and authorized by the network to support as a relay UE. Remote UE can be authenticated and authorized by the network to act as a Remote UE.

1. The remote UE can initiate discovery procedure using any of Model A or Model B method.

2. After the discovery of the UE-to-Network relay, the Remote UE can send a Direct Communication Request to the relay UE for establishing secure PC5 unicast link. The Remote UE can include its security capabilities and security policy in the DCR message. The message can also include 5GPRUK ID if available, Relay Service Code, Nonce_1. If UE has no available 5G PRUK ID or the 5G PRUK ID has been reject before, the UE can use SUCI instead of 5G PRUK ID.

3. Upon receiving the DCR message, the Relay UE can send the relay key request to the relay AMF, including the parameters received in the DCR message.

4. The Relay AMF can verify whether the relay UE is authorized to act as U2N relay. The Relay AMF decides to whether to authenticate the Remote UE. If so, AMF use Option 1 or Option 2. Otherwise go to step 5a.

Option 1

4a. If the Relay AMF decide to authenticate the Remote UE based on its (the Relay AMF's) local policy, then the Relay AMF sends Reject message include the cause and the transaction identifier.

4b. The Relay UE forward the Reject message to the Remote UE.

4c. The Remote UE sends a new DCR message, the message can include the Remote UE's SUCI, Relay service code and Nonce_1. The Nonce_1 can be the same or different with the Nonce_1 in step 2.

4d. The Relay UE can send the relay key request to the relay AMF, including the parameters received in the DCR message. Then go to Step 5.

Option 2

4e. If the Relay AMF decide to authenticate the Remote UE based on its (the Relay AMF's) local policy, then the Relay AMF sends Identity Request message include the transaction identifier.

4f. The Relay UE forward the Identity Request message to the Remote UE.

4g. The Remote UE sends its SUCI in the Identity Response message

4h. The Relay UE forward the Identity Response message to the Relay AMF. Then go to Step 5.

5a. The relay AMF can select AUSF based on 5GPRUK ID and sends a Nausf_UEAuthentication_ProseAuthenticate Request to AUSF. The request message include 5GPRUK ID, RSC, Nonce1, SN name.

5b. The AUSF sends the Nausf_UEAuthentication_ProseAuthenticate Request to UDM

5c. The UDM may decide to authenticate the UE based on its local policy and sends a reject message with a cause to AUSF. Then AUSF forward the Reject message to Relay AMF, Relay AMF use Option 1 or Option 2. Then go to step 10.

5. As shown in FIG. 6B, which is a continuation of the process in FIG. 5A, the relay AMF sends a Nausf_UEAuthentication_ProseAuthenticate Request to AUSF. The request message include 5GPRUK ID, RSC, Nonce1, SN name.

6a~6b. The AUSF can retrieve the Authentication Vectors from the UDM via Nudm_UEAuthentication_GetProseAv Request message and trigger authentication of the remote UE. The request message include 5GPRUK ID, RSC, Nonce1, SN name.

7a. If EAP-AKA' is selected by UDM, the AUSF of the 5G ProSe Remote UE can trigger authentication of the 5G ProSe Remote UE based on EAP-AKA'. The AUSF of the 5G ProSe Remote UE generates the EAP-Request/AKA'-Challenge message and send EAP-Request/AKA'-Challenge message to the AMF of the 5G ProSe UE-to-Network Relay in a Nausf_UEAuthentication_ProSeAuthenticate Response message.

7b. The AMF of the 5G ProSe UE-to-Network Relay can forward the Relay Authentication Request (including the EAP-Request/AKA'-Challenge) to the 5G ProSe UE-to-Network Relay over NAS message, including transaction identifier of the 5G ProSe Remote UE in the message. The NAS message is protected using the NAS security context created for the 5G ProSe UE-to-Network Relay.

7c. Based on the transaction identifier, the 5G ProSe UE-to-Network Relay can forwards the EAP-Request/AKA'-Challenge to the 5G ProSe Remote UE over PC5 messages.

The USIM in the 5G ProSe Remote UE verifies the freshness of the received values by checking whether AUTN can be accepted.

For EAP-AKA', the USIM computes a response RES. The USIM can return RES, CK, IK to the ME. The ME can derive CK' and IK'.

7d. The 5G ProSe Remote UE can return EAP-Response/AKA'-Challenge to the 5G ProSe UE-to-Network Relay over PC5 messages.

7e. The 5G ProSe UE-to-Network Relay forwards the EAP-Response/AKA'-Challenge together with the transaction identifier of the 5G ProSe Remote UE to the AMF of the ProSe UE-to-Network Relay in a NAS message Relay Authentication Response.

7f. The AMF of the 5G ProSe UE-to-Network Relay forwards EAP-Response/AKA'-Challenge to the AUSF of the 5G ProSe Remote UE via Nausf_UEAuthentication_ProSeAuthenticate Request.

The AUSF of the 5G ProSe Remote UE performs the UE authentication by verifying the received information.

For EAP-AKA', the AUSF of the 5G ProSe Remote UE and the 5G ProSe Remote UE may exchange EAP-Request/AKA'-Notification and EAP-Response/AKA'-Notification messages via the AMF of the 5G ProSe UE-to-Network Relay. After the exchanges, the AUSF of the 5G ProSe Remote UE derives $K_{AUSF}$ without calculating the $K_{SEAF}$.

The AUSF of the 5G ProSe Remote UE and the 5G ProSe Remote UE can derive a new $K_{AUSF\_P}$ (different from $K_{AUSF}$). NAS SMC procedure is not performed between 5G ProSe Remote UE and AMF of the 5G ProSe UE-to-Network Relay.

8. On successful authentication, AUSF sends a Nudm_UEAuthentication_ProseResultConfirmation to the UDM. The message include SUPI, RSC.

9a. The UDM and the 5G ProSe Remote UE can generate 5GPRUK and 5GPRUK ID using the newly derived $K_{AUSF\_P}$.

9b. The UDM can generate the $K_{NR\_ProSe}$ key.

10. UDM sends a Nudm_ProseKey_Get Response to the AUSF with the $K_{NR\_ProSe}$, Nonce_2.

11. The AUSF of the 5G ProSe Remote UE can send the $K_{NR\_ProSe}$, Nonce_2 in Nausf_UEAuthentication_ProseAuthenticate Response message to the 5G ProSe UE-to-Network Relay via the AMF of the 5G ProSe UE-to-Network Relay. When receiving a $K_{NR\_ProSe}$ from the AUSF of the 5G ProSe Remote UE, the AMF of the 5G ProSe UE-to-Network Relay can not attempt to trigger NAS SMC procedure with the 5G ProSe Remote UE. The 5G ProSe UE-to-Network Relay derives PC5 session key Krelay-sess and confidentiality and integrity keys from $K_{NR\_ProSe}$.

12. The 5G ProSe UE-to-Network Relay can send the received Nonce_2 to the 5G ProSe Remote UE in Direct Security mode command message, which is protected using Krelay-int or/and Krelay-enc derived from Krelay-sess according to the negotiated PC5 signalling policies between the 5G ProSe Remote UE and the 5G ProSe UE-to-Network Relay.

13-15b. The 5G ProSe Remote UE can use the 5GPRUK ID to locate the $K_{AUSF\_P}$/5GPRUK to be used for the PC5 link security. The 5G ProSe Remote UE can generate the $K_{NR\_ProSe}$ key to be used for Remote access via the 5G ProSe UE-to-Network Relay. The 5G ProSe Remote UE can derive PC5 session key Krelay-sess and confidentiality and integrity keys from $K_{NR\_ProSe}$. The 5G ProSe Remote UE can send the Direct Security Mode Complete message containing its PC5 user plane security policies to the 5G ProSe UE-to-Network relay, which is protected by Krelay-int or/and Krelay-enc derived from Krelay-sess according to the negotiated PC5 signalling policies between the 5G ProSe Remote UE and the 5G ProSe UE-to-Network Relay. After the successful verification of the Direct Security Mode complete message, the 5G ProSe UE-to-Network Relay responds a Direct Communication Accept message to the 5G ProSe Remote UE to finish the PC5 connection establishment procedures.

III. Case 2: The Remote UE Use SUCI and 5G PRUK ID. No PAnF.

III.(a) Case 2.1 AUSF Generate $K_{NR\_Prose}$ and UDM Store 5G PRUK

Figure 7A:
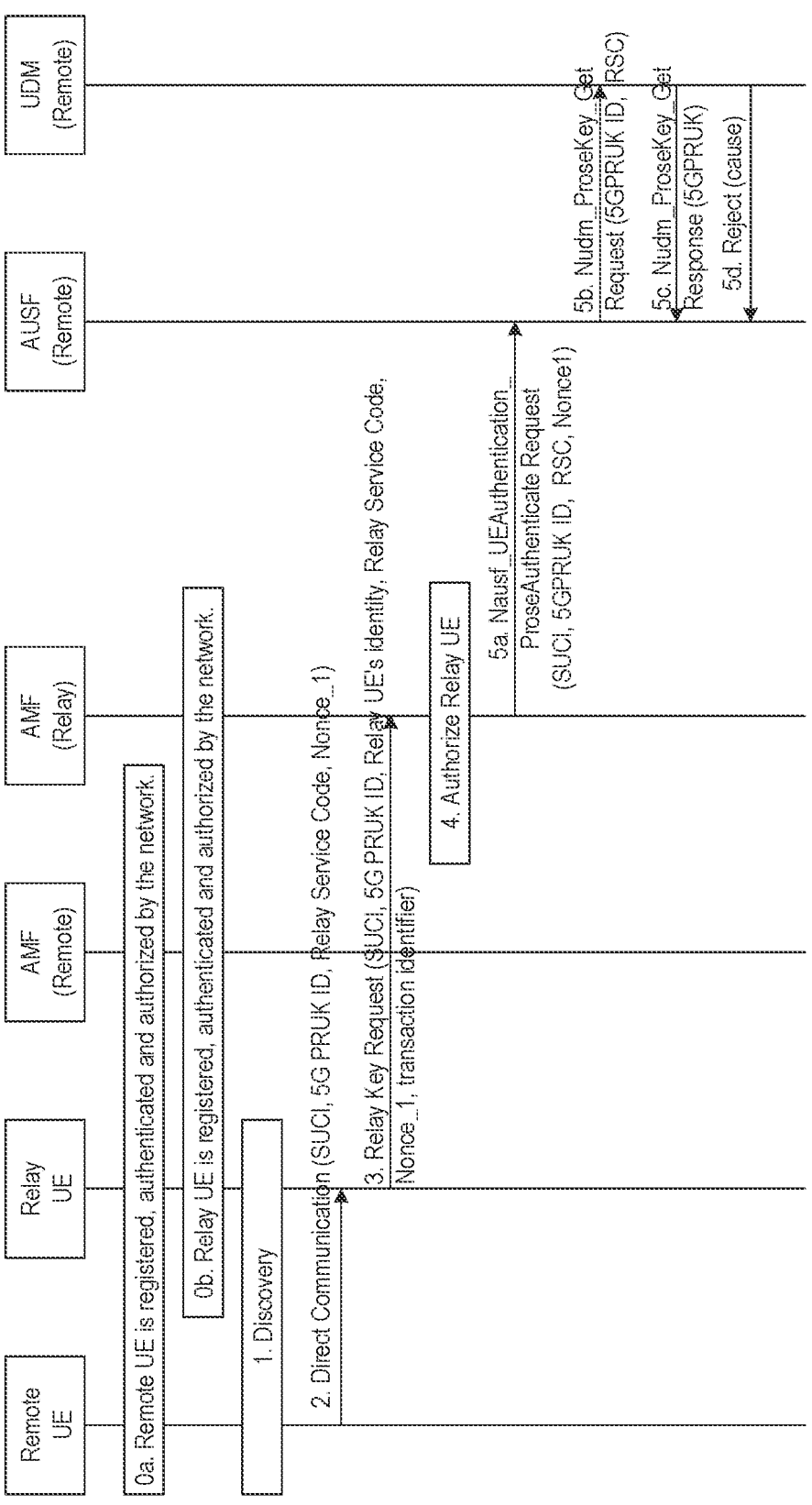
FIGS. 7A-7B show an example flowchart of a security procedure where the Remote UE uses both SUCI and 5G PRUK ID and AUSF generates $K_{NR\_prose}$, and UDM stores 5G PRUK.
Figure 7B:
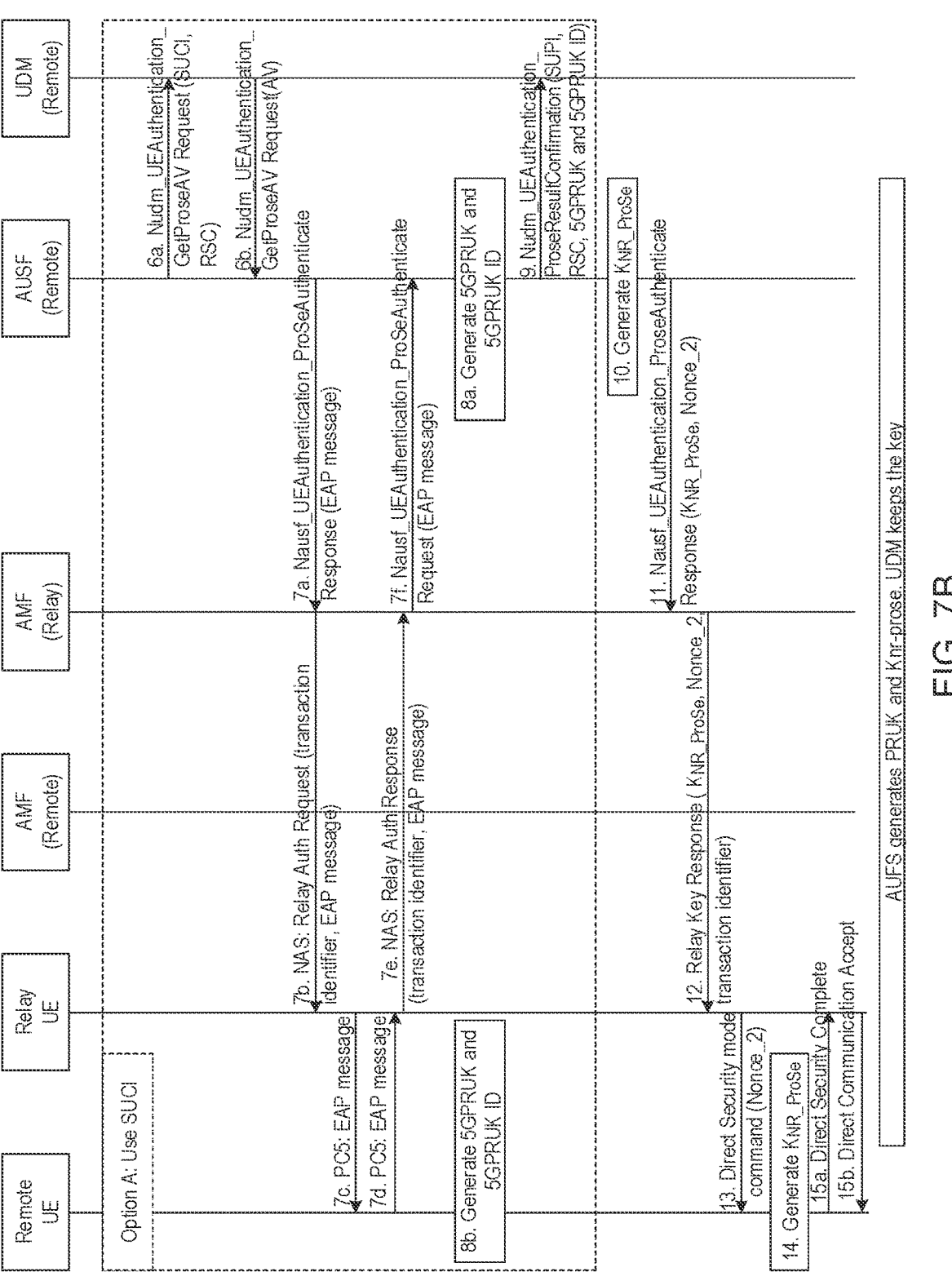

FIGS. 7A-7B show an example flowchart of a security procedure where AUSF generates $K_{NR\_Prose}$, and UDM stores 5G PRUK. FIG. 7B is a continuation of the process in FIG. 7A.

0. The Remote UE and relay UE can be registered with the network. The UE-to-Network relay can be authenticated and authorized by the network to support as a relay UE. Remote UE can be authenticated and authorized by the network to act as a Remote UE.

1. The remote UE can initiate discovery procedure using any of Model A or Model B method.

2. After the discovery of the UE-to-Network relay, the Remote UE can send a Direct Communication Request to the relay UE for establishing secure PC5 unicast link. The Remote UE can include its security capabilities and security policy in the DCR message. The message can also include SUCI and 5GPRUK ID if available, Relay Service Code, Nonce_1.

3. Upon receiving the DCR message, the Relay UE can send the relay key request to the relay AMF, including the parameters received in the DCR message.

4. The Relay AMF can verify whether the relay UE is authorized to act as U2N relay.

5a. The relay AMF can select AUSF based on 5GPRUK ID and sends a Nausf_UEAuthentication_ProseAuthenticate Request to AUSF. The request message include SUCI, 5GPRUK ID, RSC, Nonce1, SN name.

5b. The AUSF sends a Nudm_ProseKey_Get Request to UDM.

5c. If UDM decide not to authenticate the Remote UE, the UDM sends a response to AUSF with 5G PRUK to the AUSF, the UDM may also sends a Nonce_2 to AUSF. Then go to step 10.

5d. If UDM decide to authenticate the Remote UE, the UDM sends a reject response to the AUSF with a cause.

6a~6b. As shown in FIG. 7B, which is a continuation of the process in FIG. 7A, the AUSF can retrieve the Authentication Vectors from the UDM via Nudm_UEAuthentication_GetProseAv Request message and trigger authentication of the remote UE.

7a. If EAP-AKA' is selected by UDM, the AUSF of the 5G ProSe Remote UE can trigger authentication of the 5G ProSe Remote UE based on EAP-AKA'. The AUSF of the 5G ProSe Remote UE generates the EAP-Request/AKA'-Challenge message defined in clause 6.1.3.1 of TS 33.501 and send EAP-Request/AKA'-Challenge message to the AMF of the 5G ProSe UE-to-Network Relay in a Nausf_UEAuthentication_ProSeAuthenticate Response message.

7b. The AMF of the 5G ProSe UE-to-Network Relay can forward the Relay Authentication Request (including the EAP-Request/AKA'-Challenge) to the 5G ProSe UE-to-Network Relay over NAS message, including transaction identifier of the 5G ProSe Remote UE in the message. The NAS message is protected using the NAS security context created for the 5G ProSe UE-to-Network Relay.

7c. Based on the transaction identifier, the 5G ProSe UE-to-Network Relay can forwards the EAP-Request/AKA'-Challenge to the 5G ProSe Remote UE over PC5 messages.

The USIM in the 5G ProSe Remote UE verifies the freshness of the received values by checking whether AUTN can be accepted.

For EAP-AKA', the USIM computes a response RES. The USIM can return RES, CK, IK to the ME. The ME can derive CK' and IK'.

7d. The 5G ProSe Remote UE can return EAP-Response/AKA'-Challenge to the 5G ProSe UE-to-Network Relay over PC5 messages.

7e. The 5G ProSe UE-to-Network Relay forwards EAP-Response/AKA'-Challenge together with the transaction identifier of the 5G ProSe Remote UE to the AMF of the 5G ProSe UE-to-Network Relay in a NAS message Relay Authentication Response.

7f. The AMF of the 5G ProSe UE-to-Network Relay forwards EAP-Response/AKA'-Challenge to the AUSF of the 5G ProSe Remote UE via Nausf_UEAuthentication_ProSeAuthenticate Request.

The AUSF of the 5G ProSe Remote UE performs the UE authentication by verifying the received information.

For EAP-AKA', the AUSF of the 5G ProSe Remote UE and the 5G ProSe Remote UE may exchange EAP-Request/AKA'-Notification and EAP-Response/AKA'-Notification messages via the AMF of the 5G ProSe UE-to-Network Relay. After the exchanges, the AUSF of the 5G ProSe Remote UE derives $K_{AUSF}$ without calculating the $K_{SEAF}$.

The AUSF of the 5G ProSe Remote UE and the 5G ProSe Remote UE can derive a new $K_{AUSF\_P}$ (different from $K_{AUSF}$). NAS SMC procedure is not performed between 5G ProSe Remote UE and AMF of the 5G ProSe UE-to-Network Relay.

8.On successful authentication, the AUSF of the 5G ProSe Remote UE and the 5G ProSe Remote UE can generate 5GPRUK and 5GPRUK ID using the newly derived $K_{AUSF\_P}$.

9. AUSF sends a Nudm_UEAuthentication_ProseResult-Confirmation to the UDM.

10. The AUSF of the 5G ProSe Remote UE can generate the $K_{NR\_ProSe}$ key.

11. The AUSF of the 5G ProSe Remote UE can send the $K_{NR\_ProSe}$, Nonce_2 in Nausf_UEAuthentication_ProseAuthenticate Response message to the 5G ProSe UE-to-Network Relay via the AMF of the 5G ProSe UE-to-Network Relay. When receiving a $K_{NR\_ProSe}$ from the AUSF of the 5G ProSe Remote UE, the AMF of the 5G ProSe UE-to-Network Relay can not attempt to trigger NAS SMC procedure with the 5G ProSe Remote UE. The 5G ProSe UE-to-Network Relay derives PC5 session key Krelay-sess and confidentiality and integrity keys from $K_{NR\_ProSe}$.

12. The 5G ProSe UE-to-Network Relay can send the received Nonce_2 to the 5G ProSe Remote UE in Direct Security mode command message, which is protected using Krelay-int or/and Krelay-enc derived from Krelay-sess according to the negotiated PC5 signalling policies between the 5G ProSe Remote UE and the 5G ProSe UE-to-Network Relay.

13-15b. The 5G ProSe Remote UE can use the 5GPRUK ID to locate the $K_{AUSF}\_P$/5GPRUK to be used for the PC5 link security. The 5G ProSe Remote UE can generate the $K_{NR\_ProSe}$ key to be used for Remote access via the 5G ProSe UE-to-Network Relay. The 5G ProSe Remote UE can derive PC5 session key Krelay-sess and confidentiality and integrity keys from $K_{NR\_ProSe}$. The 5G ProSe Remote UE can send the Direct Security Mode Complete message containing its PC5 user plane security policies to the 5G ProSe UE-to-Network relay, which is protected by Krelay-int or/and Krelay-enc derived from Krelay-sess according to the negotiated PC5 signalling policies between the 5G ProSe Remote UE and the 5G ProSe UE-to-Network Relay. After the successful verification of the Direct Security Mode complete message, the 5G ProSe UE-to-Network Relay responds a Direct Communication Accept message to the 5G ProSe Remote UE to finish the PC5 connection establishment procedures.

FIG. 23 shows a flowchart for receiving a message by a network node that indicates whether another network node authenticates a communication device. Operation 2302 includes receiving, by a first network device from a second network device, a first request message that includes first identifier associated with a first communication device and a second identifier. Operation 2304 includes transmitting, by the first network device to a third network device, a second request message that includes the first identifier. Operation 2306 includes receiving, by the first network device and in response to the second request message, a response message from the third network device, wherein the response message indicates whether the third network device authenticated the first communication device.

In some embodiments, the first identifier includes a 5G ProSe Relay User Key (PRUK) identifier (ID), and the second identifier includes a subscription concealed identifier (SUCI). In some embodiments, a second communication device is authorized to act as a relay between the first communication device and a communication network that includes any one or more of the first network device, the second network device, and the third network device. In some embodiments, the first network device includes an authentication server function (AUSF) device, the second network device includes a remote access and mobility management function (AMF) device, and the third network device includes a unified data management (UDM).

III.(b) Case 2.2 AUSF Generate $K_{NR\_Prose}$ and Store 5G PRUK

Figure 8A:
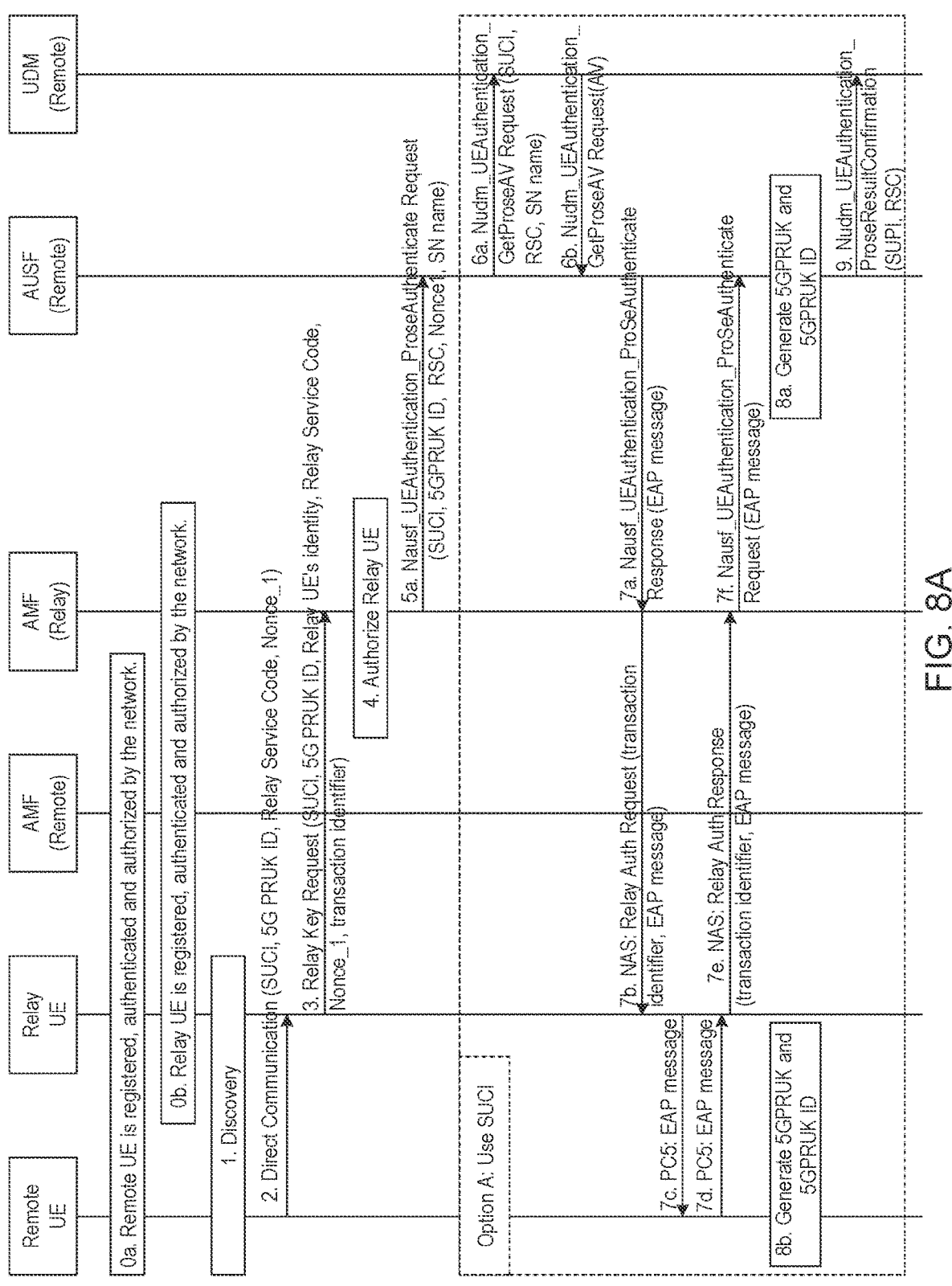
FIGS. 8A-8B show an example flowchart of a security procedure where the Remote UE uses both SUCI and 5G PRUK ID and AUSF generates $K_{NR\_prose}$ and stores 5G PRUK.
Figure 8B:
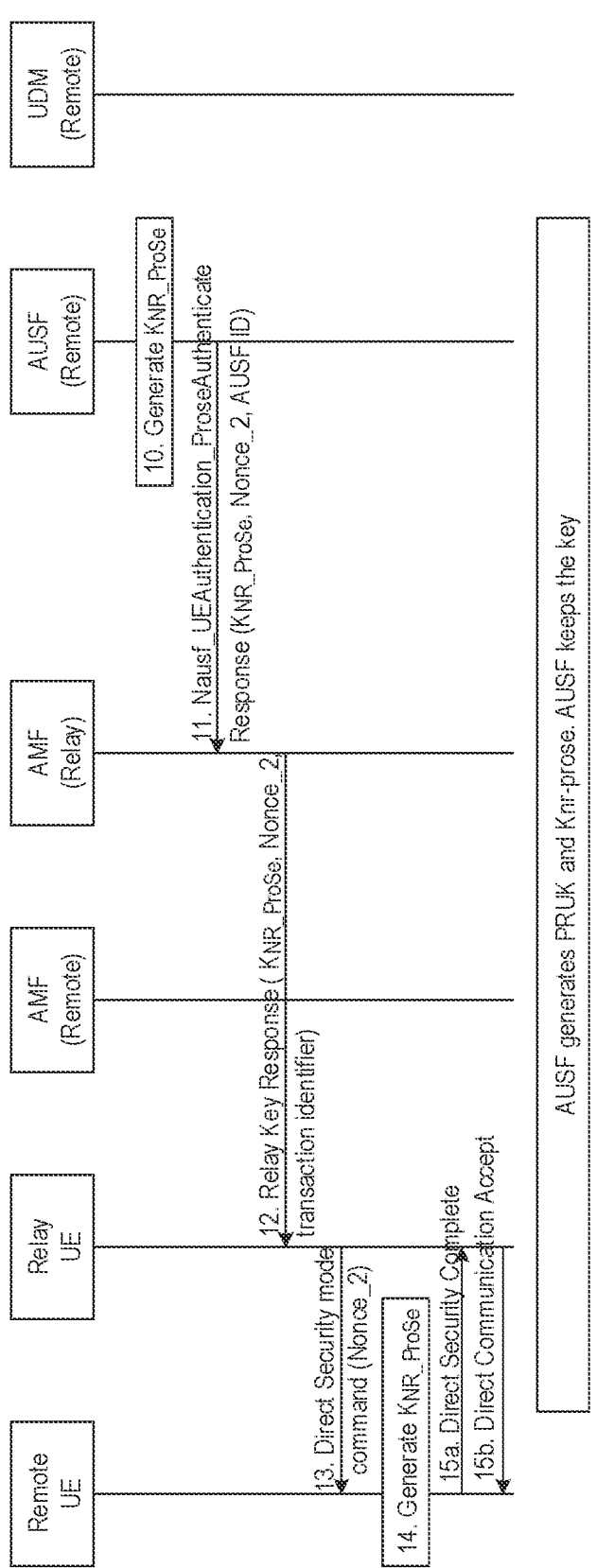

FIGS. 8A-8B show an example flowchart of a security procedure where AUSF generates $K_{NR\_Prose}$ and stores 5G PRUK. FIG. 8B is a continuation of the process in FIG. 8A.

0. The Remote UE and relay UE can be registered with the network. The UE-to-Network relay can be authenticated and authorized by the network to support as a relay UE. Remote UE can be authenticated and authorized by the network to act as a Remote UE.

1. The remote UE can initiate discovery procedure using any of Model A or Model B method as specified.

2. After the discovery of the UE-to-Network relay, the Remote UE can send a Direct Communication Request to the relay UE for establishing secure PC5 unicast link. The Remote UE can include its security capabilities and security policy in the DCR message. The message can also include SUCI and 5GPRUK ID if available, Relay Service Code, Nonce_1.

3. Upon receiving the DCR message, the Relay UE can send the relay key request to the relay AMF, including parameters received in the DCR message.

4. The Relay AMF can verify whether the relay UE is authorized to act as U2N relay.

5a. The relay AMF can select AUSF based on SUCI or 5GPRUK ID and sends a Nausf_UEAuthentication_Prose-Authenticate Request to AUSF. The request message include 5GPRUK ID, RSC, Nonce1, SN name. If the AUSF can find the 5G PRUK, then go to step 10. Otherwise continue step 6a.

If AMF can use 5G PRUK ID to find a AUSF instance ID which is stored in the Relay AMF, then the AMF select the AUSF.

If RID is included in the 5G PRUK ID, the AUSF selection should consider the RID.

The 5GPRUK ID may be generated as follows:

5GPRUK ID is in NAI format as specified in clause 2.2 of IETF RFC 7542, e.g. username@realm. The username part can include the RID and the P-TID (Prose Temporary UE Identifier), and the realm part can include Home Network Identifier.

The P-TID is derived from $K_{AUSF}$ or Kausf_p.

The AUSF selection may also consider the RID in SUCI.

6a~6b. The AUSF can retrieve the Authentication Vectors from the UDM via Nudm_UEAuthentication_GetProseAv Request message and trigger authentication of the remote UE.

7a. If EAP-AKA' is selected by UDM, the AUSF of the 5G ProSe Remote UE can trigger authentication of the 5G ProSe Remote UE based on EAP-AKA'. The AUSF of the 5G ProSe Remote UE generates the EAP-Request/AKA'-

Challenge message1 and send EAP-Request/AKA'-Challenge message to the AMF of the 5G ProSe UE-to-Network Relay in a Nausf_UEAuthentication_ProSeAuthenticate Response message.

7b. The AMF of the 5G ProSe UE-to-Network Relay can forward the Relay Authentication Request (including the EAP-Request/AKA'-Challenge) to the 5G ProSe UE-to-Network Relay over NAS message, including transaction identifier of the 5G ProSe Remote UE in the message. The NAS message is protected using the NAS security context created for the 5G ProSe UE-to-Network Relay.

7c. Based on the transaction identifier, the 5G ProSe UE-to-Network Relay can forwards the EAP-Request/AKA'-Challenge to the 5G ProSe Remote UE over PC5 messages.

The USIM in the 5G ProSe Remote UE verifies the freshness of the received values by checking whether AUTN can be accepted.

For EAP-AKA', the USIM computes a response RES. The USIM can return RES, CK, IK to the ME. The ME can derive CK' and IK'.

7d. The 5G ProSe Remote UE can return EAP-Response/AKA'-Challenge to the 5G ProSe UE-to-Network Relay over PC5 messages.

7e. The 5G ProSe UE-to-Network Relay forwards the EAP-Response/AKA'-Challenge together with the transaction identifier of the 5G ProSe Remote UE to the AMF of the 5G ProSe UE-to-Network Relay in a NAS message Relay Authentication Response.

7f. The AMF of the 5G ProSe UE-to-Network Relay forwards EAP-Response/AKA'-Challenge to the AUSF of the 5G ProSe Remote UE via Nausf_UEAuthentication_ProSeAuthenticate Request.

The AUSF of the 5G ProSe Remote UE performs the UE authentication by verifying the received information.

For EAP-AKA', the AUSF of the 5G ProSe Remote UE and the 5G ProSe Remote UE may exchange EAP-Request/AKA'-Notification and EAP-Response/AKA'-Notification messages via the AMF of the 5G ProSe UE-to-Network Relay. After the exchanges, the AUSF of the 5G ProSe Remote UE derives $K_{AUSF}$ without calculating the $K_{SEAF}$.

The AUSF of the 5G ProSe Remote UE and the 5G ProSe Remote UE can derive a new $K_{AUSF\_P}$ (different from $K_{AUSF}$). NAS SMC procedure is not performed between 5G ProSe Remote UE and AMF of the 5G ProSe UE-to-Network Relay.

8. On successful authentication, the AUSF of the 5G ProSe Remote UE and the 5G ProSe Remote UE can generate 5GPRUK and 5GPRUK ID using the newly derived $K_{AUSF\_P}$.

9. AUSF sends a Nudm_UEAuthentication_ProseResultConfirmation to the UDM.

10. As shown in FIG. 8B, which is a continuation of the process in FIG. 8A, the AUSF of the 5G ProSe Remote UE can generate the $K_{NR\_ProSe}$ key.

11. The AUSF of the 5G ProSe Remote UE can send the $K_{NR\_ProSe}$, Nonce_2 in Nausf_UEAuthentication_ProseAuthenticate Response message to the 5G ProSe UE-to-Network Relay via the AMF of the 5G ProSe UE-to-Network Relay. The AUSF may also send the AUSF instance ID in the Response message. When AMF receive the AUSF instance ID, AMF should store the mapping (5G PRUK ID, AUSF ID). When receiving a $K_{NR\_ProSe}$ from the AUSF of the 5G ProSe Remote UE, the AMF of the 5G ProSe UE-to-Network Relay can not attempt to trigger NAS SMC procedure with the 5G ProSe Remote UE. The 5G ProSe UE-to-Network Relay derives PC5 session key Krelay-sess and confidentiality and integrity keys from $K_{NR\_ProSe}$.

12. The 5G ProSe UE-to-Network Relay can send the received Nonce_2 to the 5G ProSe Remote UE in Direct Security mode command message, which is protected using Krelay-int or/and Krelay-enc derived from Krelay-sess according to the negotiated PC5 signalling policies between the 5G ProSe Remote UE and the 5G ProSe UE-to-Network Relay.

13-15b. The 5G ProSe Remote UE can use the 5GPRUK ID to locate the $K_{AUSF\_P}$/5GPRUK to be used for the PC5 link security. The 5G ProSe Remote UE can generate the $K_{NR\_ProSe}$ key to be used for Remote access via the 5G ProSe UE-to-Network Relay. The 5G ProSe Remote UE can derive PC5 session key Krelay-sess and confidentiality and integrity keys from $K_{NR\_ProSe}$. The 5G ProSe Remote UE can send the Direct Security Mode Complete message containing its PC5 user plane security policies to the 5G ProSe UE-to-Network relay, which is protected by Krelay-int or/and Krelay-enc derived from Krelay-sess according to the negotiated PC5 signalling policies between the 5G ProSe Remote UE and the 5G ProSe UE-to-Network Relay. After the successful verification of the Direct Security Mode complete message, the 5G ProSe UE-to-Network Relay responds a Direct Communication Accept message to the 5G ProSe Remote UE to finish the PC5 connection establishment procedures.

III.(c) Case 2.3 AUSF Generate $K_{NR\_Prose}$. UDM Generate and Store 5G PRUK

Figure 9A:
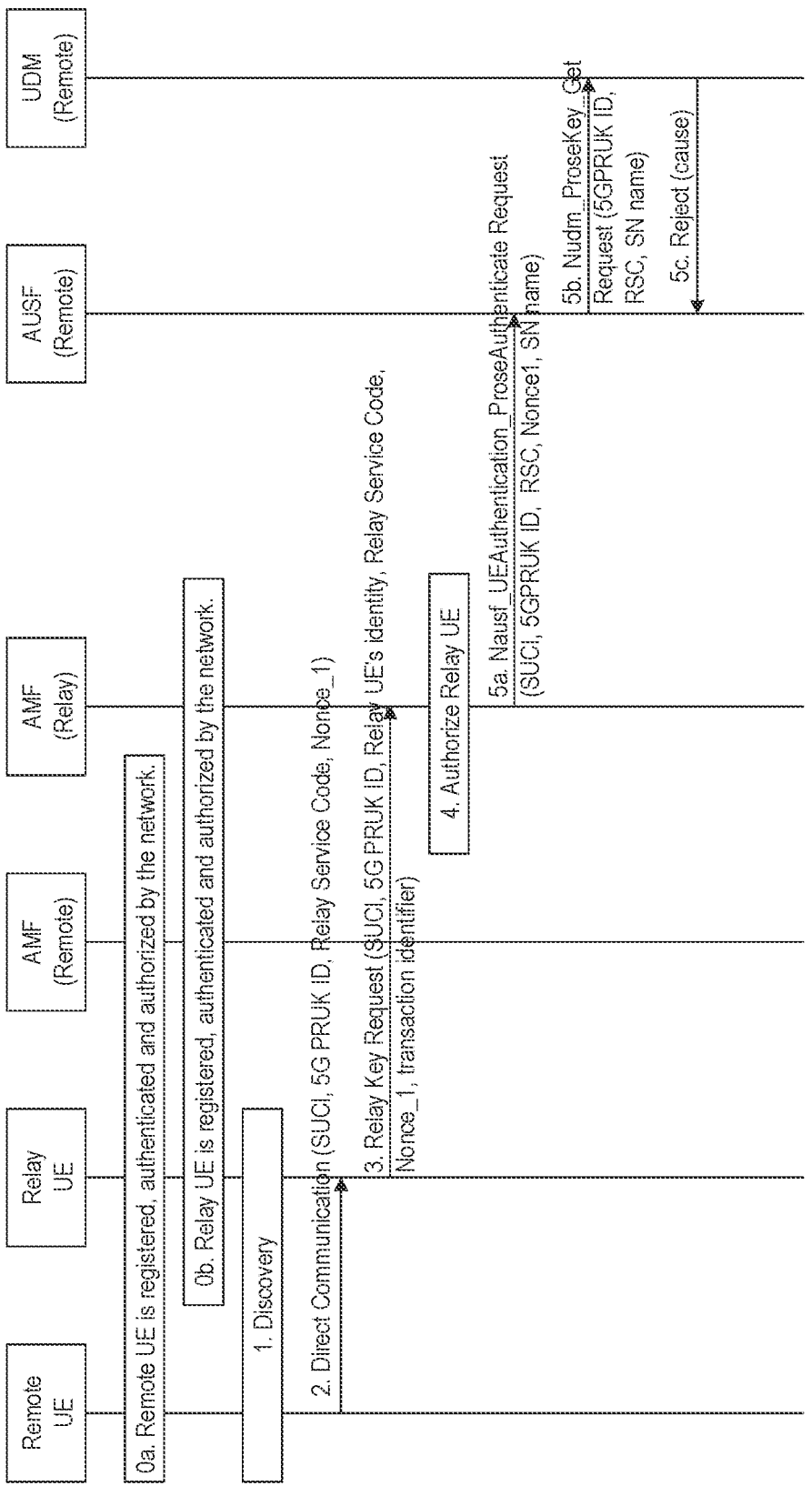
FIGS. 9A-9B show an example flowchart of a security procedure where the Remote UE uses both SUCI and 5G PRUK ID and AUSF generates $K_{NR\_Prose}$, and UDM generates and stores 5G PRUK.
Figure 9B:
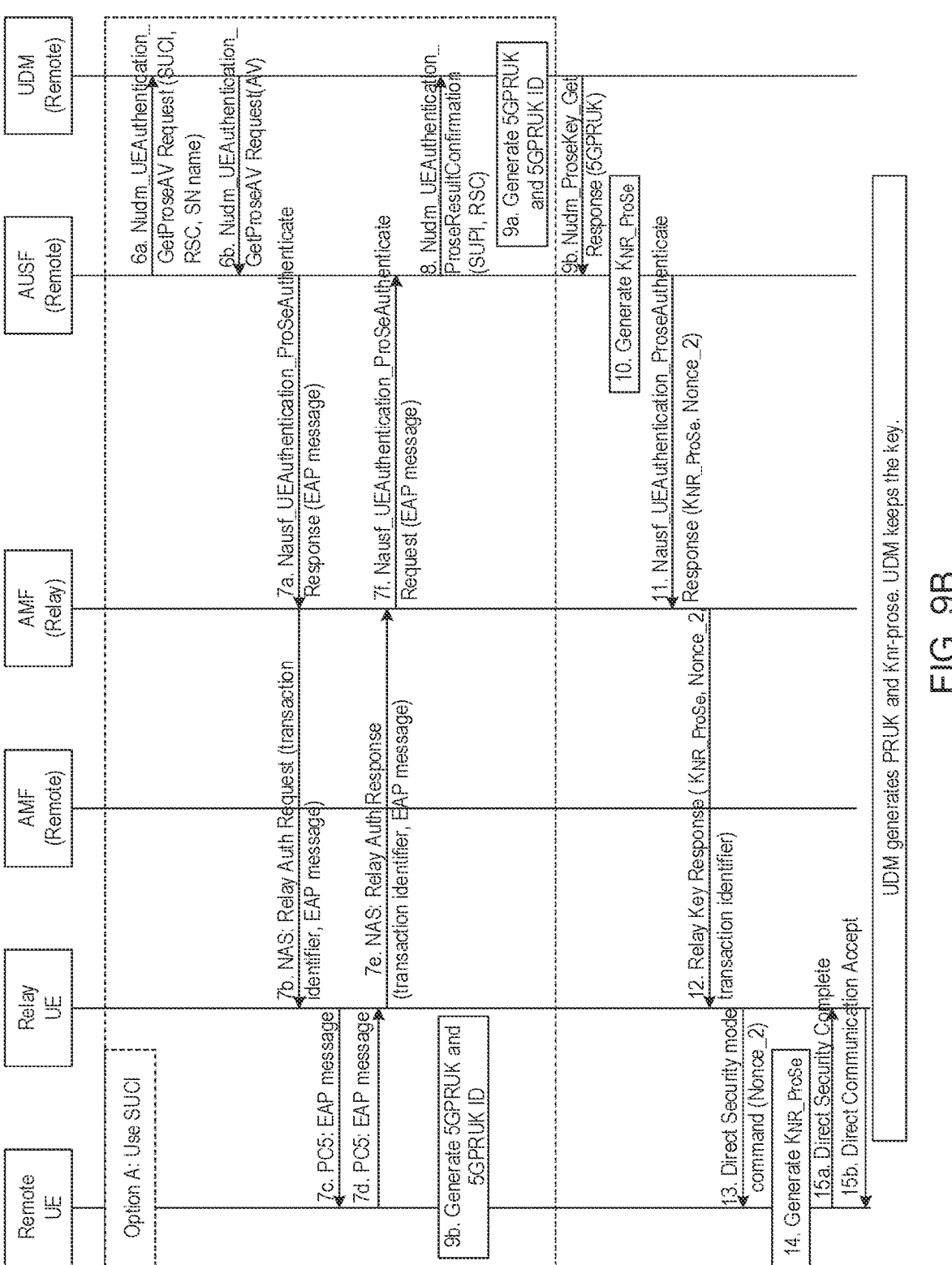

FIGS. 9A-9B show an example flowchart of a security procedure where AUSF generates $K_{NR\_Prose}$, and UDM generates and stores 5G PRUK. FIG. 9B is a continuation of the process in FIG. 9A.

0. The Remote UE and relay UE can be registered with the network. The UE-to-Network relay can be authenticated and authorized by the network to support as a relay UE. Remote UE can be authenticated and authorized by the network to act as a Remote UE.

1. The remote UE can initiate discovery procedure using any of Model A or Model B method.

2. After the discovery of the UE-to-Network relay, the Remote UE can send a Direct Communication Request to the relay UE for establishing secure PC5 unicast link. The Remote UE can include its security capabilities and security policy in the DCR message. The message can also include SUCI and 5GPRUK ID if available, Relay Service Code, Nonce_1.

3. Upon receiving the DCR message, the Relay UE can send the relay key request to the relay AMF, including the parameters received in the DCR message.

4. The Relay AMF can verify whether the relay UE is authorized to act as U2N relay.

5a. The relay AMF can select AUSF based on SUCI or 5GPRUK ID and sends a Nausf_UEAuthentication_Prose-Authenticate Request to AUSF. The request message include 5GPRUK ID, RSC, Nonce1, SN name.

5b. The AUSF sends the Nudm_Prosekey_Get Request to UDM

5c. The UDM may decide to authenticate the UE based on its local policy and sends a reject message with a cause to AUSF.

6a~6b. As shown in FIG. 9B, which is a continuation of the process in FIG. 9A, the AUSF can retrieve the Authentication Vectors from the UDM via Nudm_UEAuthentication_GetProseAv Request message and trigger authentication of the remote UE.

7a. If EAP-AKA' is selected by UDM, the AUSF of the 5G ProSe Remote UE can trigger authentication of the 5G ProSe Remote UE based on EAP-AKA'. The AUSF of the 5G ProSe Remote UE generates the EAP-Request/AKA'-Challenge message and send EAP-Request/AKA'-Challenge message to the AMF of the 5G ProSe UE-to-Network Relay in a Nausf_UEAuthentication_ProSeAuthenticate Response message.

7b. The AMF of the 5G ProSe UE-to-Network Relay can forward the Relay Authentication Request (including the EAP-Request/AKA'-Challenge) to the 5G ProSe UE-to-Network Relay over NAS message, including transaction identifier of the 5G ProSe Remote UE in the message. The NAS message is protected using the NAS security context created for the 5G ProSe UE-to-Network Relay.

7c. Based on the transaction identifier, the 5G ProSe UE-to-Network Relay can forwards the EAP-Request/AKA'-Challenge to the 5G ProSe Remote UE over PC5 messages.

The USIM in the 5G ProSe Remote UE verifies the freshness of the received values by checking whether AUTN can be accepted.

For EAP-AKA', the USIM computes a response RES. The USIM can return RES, CK, IK to the ME. The ME can derive CK' and IK'.

7d. The 5G ProSe Remote UE can return EAP-Response/AKA'-Challenge to the 5G ProSe UE-to-Network Relay over PC5 messages.

7e. The 5G ProSe UE-to-Network Relay forwards the EAP-Response/AKA'-Challenge together with the transaction identifier of the 5G ProSe Remote UE to the AMF of the ProSe UE-to-Network Relay in a NAS message Relay Authentication Response.

7f. The AMF of the 5G ProSe UE-to-Network Relay forwards EAP-Response/AKA'-Challenge to the AUSF of the 5G ProSe Remote UE via Nausf_UEAuthentication_ProSeAuthenticate Request.

The AUSF of the 5G ProSe Remote UE performs the UE authentication by verifying the received information.

For EAP-AKA', the AUSF of the 5G ProSe Remote UE and the 5G ProSe Remote UE may exchange EAP-Request/AKA'-Notification and EAP-Response/AKA'-Notification messages via the AMF of the 5G ProSe UE-to-Network Relay. After the exchanges, the AUSF of the 5G ProSe Remote UE derives $K_{AUSF}$ without calculating the KSEAF.

The AUSF of the 5G ProSe Remote UE and the 5G ProSe Remote UE can derive a new $K_{AUSF\_P}$ (different from $K_{AUSF}$). NAS SMC procedure is not performed between 5G ProSe Remote UE and AMF of the 5G ProSe UE-to-Network Relay.

8. AUSF sends a Nudm_UEAuthentication_ProseResult-Confirmation to the UDM

9a. On successful authentication, the UDM and the 5G ProSe Remote UE can generate 5GPRUK and 5GPRUK ID using the newly derived $K_{AUSF\_P}$.

9b. UDM sends a Nudm_ProseKey_Get Response to the AUSF with the 5G PRUK. The UDM may also sends a Nonce_2 to AUSF 10. The AUSF of the 5G ProSe Remote UE can generate the $K_{NR\_ProSe}$ key. If UDM sends a Nonce_2 to AUSF, then the AUSF use the Nonce_2 to generate the $K_{NR\_ProSe}$ key. Otherwise, AUSF generate the Nonce_2 itself.

11. The AUSF of the 5G ProSe Remote UE can send the $K_{NR\_ProSe}$, Nonce_2 in Nausf_UEAuthentication_ProseAuthenticate Response message to the 5G ProSe UE-to-Network Relay via the AMF of the 5G ProSe UE-to-Network Relay. When receiving a $K_{NR\_ProSe}$ from the AUSF of the 5G ProSe Remote UE, the AMF of the 5G ProSe UE-to-Network Relay can not attempt to trigger NAS SMC procedure with the 5G ProSe Remote UE. The 5G ProSe UE-to-Network Relay derives PC5 session key Krelay-sess and confidentiality and integrity keys from $K_{NR\_ProSe}$.

12. The 5G ProSe UE-to-Network Relay can send the received Nonce_2 to the 5G ProSe Remote UE in Direct Security mode command message, which is protected using Krelay-int or/and Krelay-enc derived from Krelay-sess according to the negotiated PC5 signalling policies between the 5G ProSe Remote UE and the 5G ProSe UE-to-Network Relay.

13-15b. The 5G ProSe Remote UE can use the 5GPRUK ID to locate the $K_{AUSF}$_P/5GPRUK to be used for the PC5 link security. The 5G ProSe Remote UE can generate the $K_{NR\_ProSe}$_key to be used for Remote access via the 5G ProSe UE-to-Network Relay. The 5G ProSe Remote UE can derive PC5 session key Krelay-sess and confidentiality and integrity keys from $K_{NR\_ProSe}$. The 5G ProSe Remote UE can send the Direct Security Mode Complete message containing its PC5 user plane security policies to the 5G ProSe UE-to-Network relay, which is protected by Krelay-int or/and Krelay-enc derived from Krelay-sess according to the negotiated PC5 signalling policies between the 5G ProSe Remote UE and the 5G ProSe UE-to-Network Relay. After the successful verification of the Direct Security Mode complete message, the 5G ProSe UE-to-Network Relay responds a Direct Communication Accept message to the 5G ProSe Remote UE to finish the PC5 connection establishment procedures.

III.(d) Case 2.4 UDM Generate $K_{NR\_Prose}$ and Store 5G PRUK

Figure 10A:
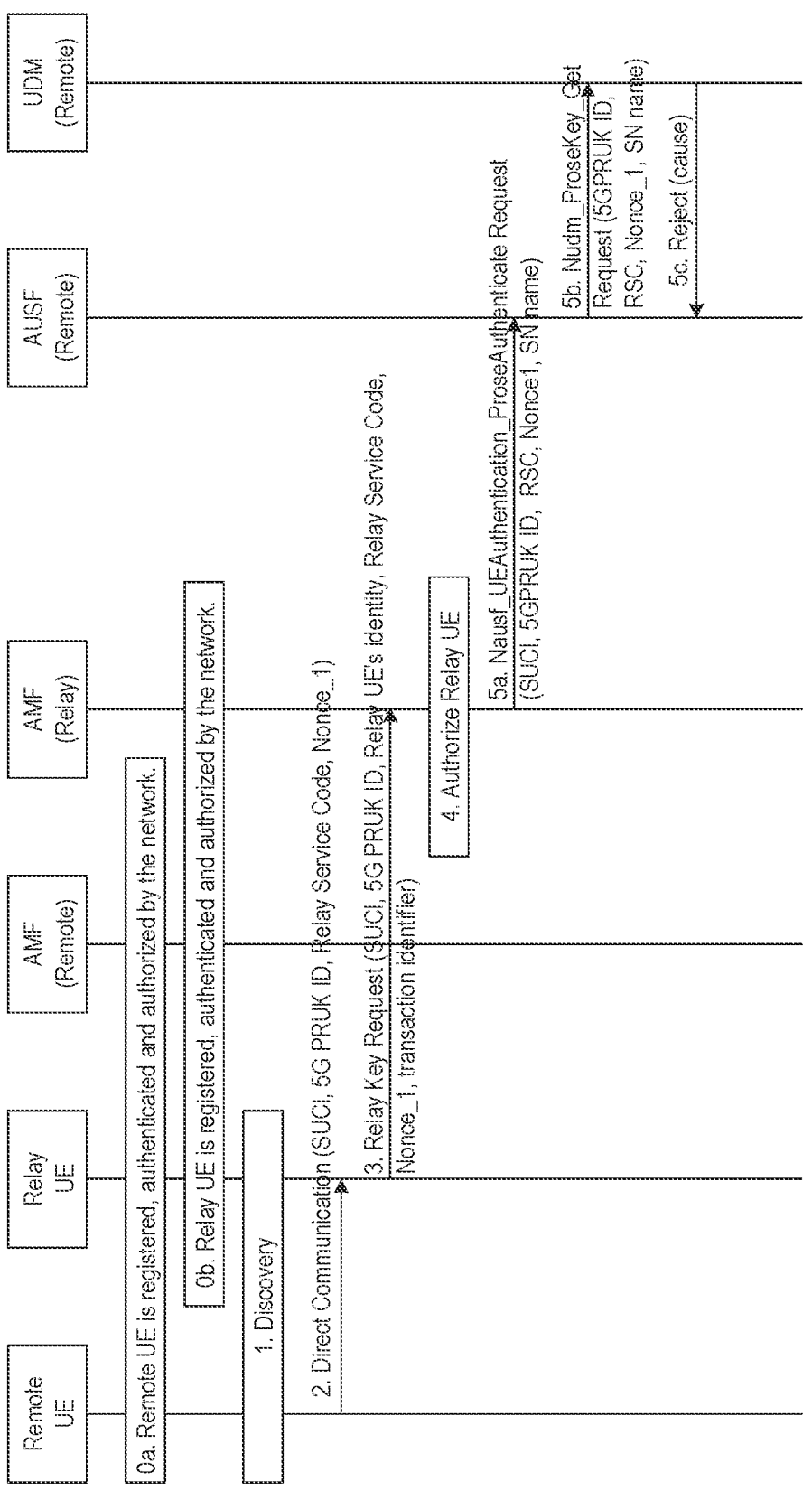
FIGS. 10A-10B show an example flowchart of a security procedure where the Remote UE uses both SUCI and 5G PRUK ID and UDM generates $K_{NR\_prose}$ and stores 5G PRUK.
Figure 10B:
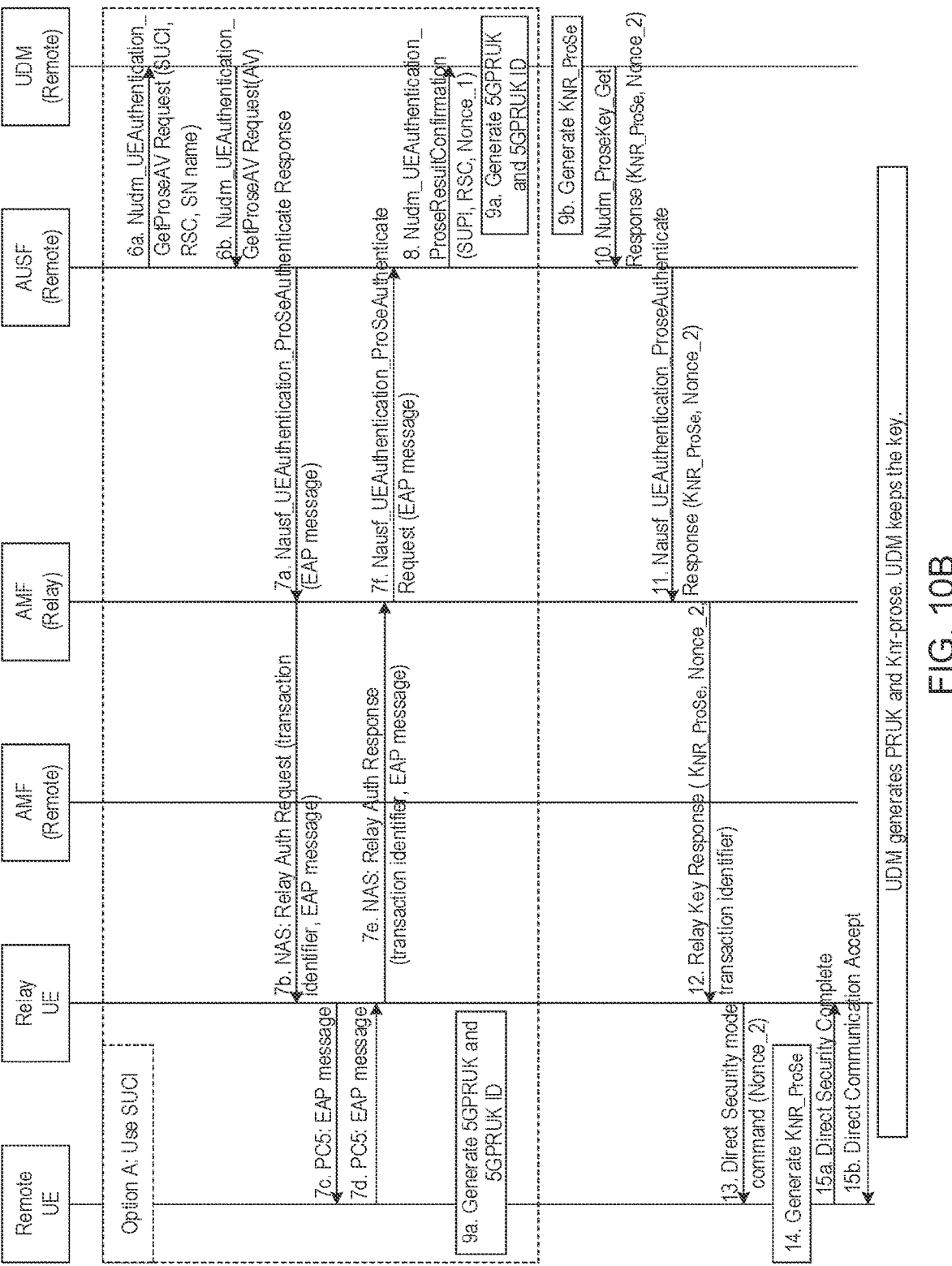

FIGS. 10A-10B show an example flowchart of a security procedure where UDM generates $K_{NR\_Prose}$ and stores 5G PRUK. FIG. 10B is a continuation of the process in FIG. 10A.

0. The Remote UE and relay UE can be registered with the network. The UE-to-Network relay can be authenticated and authorized by the network to support as a relay UE. Remote UE can be authenticated and authorized by the network to act as a Remote UE.

1. The remote UE can initiate discovery procedure using any of Model A or Model B method.

2. After the discovery of the UE-to-Network relay, the Remote UE can send a Direct Communication Request to the relay UE for establishing secure PC5 unicast link. The Remote UE can include its security capabilities and security policy in the DCR message. The message can also include SUCI and 5GPRUK ID if available, Relay Service Code, Nonce_1.

3. Upon receiving the DCR message, the Relay UE can send the relay key request to the relay AMF, including the parameters received in the DCR message.

4. The Relay AMF can verify whether the relay UE is authorized to act as U2N relay.

5a. The relay AMF can select AUSF based on SUCI or 5GPRUK ID and sends a Nausf_UEAuthentication_Prose-Authenticate Request to AUSF. The request message include 5GPRUK ID, RSC, Nonce1, SN name.

5b. The AUSF sends the Nudm_Prosekey_Get Request to UDM

5c. The UDM may decide to authenticate the UE based on its local policy and sends a reject message with a cause to AUSF and continue the step 6a. Otherwise go to step 9b.

6a~6b. As shown in FIG. 10B, which is a continuation of the process in FIG. 10A, the AUSF can retrieve the Authentication Vectors from the UDM via Nudm_UEAuthentication_GetProseAv Request message and trigger authentication of the remote UE.

7a. If EAP-AKA' is selected by UDM, the AUSF of the 5G ProSe Remote UE can trigger authentication of the 5G ProSe Remote UE based on EAP-AKA'. The AUSF of the 5G ProSe Remote UE generates the EAP-Request/AKA'-Challenge message defined in clause 6.1.3.1 of TS 33.501 and send EAP-Request/AKA'-Challenge message to the AMF of the 5G ProSe UE-to-Network Relay in a Nausf_U-EAuthentication_ProSeAuthenticate Response message.

7b. The AMF of the 5G ProSe UE-to-Network Relay can forward the Relay Authentication Request (including the EAP-Request/AKA'-Challenge) to the 5G ProSe UE-to-Network Relay over NAS message, including transaction identifier of the 5G ProSe Remote UE in the message. The NAS message is protected using the NAS security context created for the 5G ProSe UE-to-Network Relay.

7c. Based on the transaction identifier, the 5G ProSe UE-to-Network Relay can forwards the EAP-Request/AKA'-Challenge to the 5G ProSe Remote UE over PC5 messages.

The USIM in the 5G ProSe Remote UE verifies the freshness of the received values by checking whether AUTN can be accepted.

For EAP-AKA', the USIM computes a response RES. The USIM can return RES, CK, IK to the ME. The ME can derive CK' and IK'.

7d. The 5G ProSe Remote UE can return EAP-Response/AKA'-Challenge to the 5G ProSe UE-to-Network Relay over PC5 messages.

7e. The 5G ProSe UE-to-Network Relay forwards the EAP-Response/AKA'-Challenge together with the transaction identifier of the 5G ProSe Remote UE to the AMF of the 5G ProSe UE-to-Network Relay in a NAS message Relay Authentication Response.

7f. The AMF of the 5G ProSe UE-to-Network Relay forwards EAP-Response/AKA'-Challenge to the AUSF of the 5G ProSe Remote UE via Nausf_UEAuthentication_ProSeAuthenticate Request.

The AUSF of the 5G ProSe Remote UE performs the UE authentication by verifying the received information.

For EAP-AKA', the AUSF of the 5G ProSe Remote UE and the 5G ProSe Remote UE may exchange EAP-Request/AKA'-Notification and EAP-Response/AKA'-Notification messages via the AMF of the 5G ProSe UE-to-Network Relay. After the exchanges, the AUSF of the 5G ProSe Remote UE derives $K_{AUSF}$ without calculating the KSEAF.

The AUSF of the 5G ProSe Remote UE and the 5G ProSe Remote UE can derive a new $K_{AUSF\_P}$ (different from $K_{AUSF}$). NAS SMC procedure is not performed between 5G ProSe Remote UE and AMF of the 5G ProSe UE-to-Network Relay.

8. AUSF sends a Nudm_UEAuthentication_ProseResult-Confirmation to the UDM. The message may include SUPI, RSC, Nonce_1. The message may also include Nonce_2.

9a. On successful authentication, the UDM and the 5G ProSe Remote UE can generate 5GPRUK and 5GPRUK ID using the newly derived $K_{AUSF\_P}$.

9b. UDM can generate the $K_{NR\_ProSe}$ key. If the UDM receive Nonce_2 from AUSF, the UDM use the Nonce_2 to generate the $K_{NR\_ProSe}$ key. Otherwise, UDM generate the Nonce_2 itself.

10. UDM sends a Nudm_ProseKey_Get Response to the AUSF with the $K_{NR\_ProSe}$ key. If UDM generate the Nonce_2 itself, UDM also include the Nonce_2 in the response.

11. The AUSF of the 5G ProSe Remote UE can send the $K_{NR\_ProSe}$, Nonce_2 in Nausf_UEAuthentication_ProseAuthenticate Response message to the 5G ProSe UE-to-Network Relay via the AMF of the 5G ProSe UE-to-Network Relay. When receiving a $K_{NR\_ProSe}$ from the AUSF of the 5G ProSe Remote UE, the AMF of the 5G ProSe UE-to-Network Relay can not attempt to trigger NAS SMC procedure with the 5G ProSe Remote UE. The 5G ProSe UE-to-Network Relay derives PC5 session key Krelay-sess and confidentiality and integrity keys from $K_{NR\_ProSe}$.

12. The 5G ProSe UE-to-Network Relay can send the received Nonce_2 to the 5G ProSe Remote UE in Direct Security mode command message, which is protected using Krelay-int or/and Krelay-enc derived from Krelay-sess according to the negotiated PC5 signalling policies between the 5G ProSe Remote UE and the 5G ProSe UE-to-Network Relay.

13-15b. The 5G ProSe Remote UE can use the 5GPRUK ID to locate the $K_{AUSF\_P}$/5GPRUK to be used for the PC5 link security. The 5G ProSe Remote UE can generate the $K_{NR\_ProSe}$ key to be used for Remote access via the 5G ProSe UE-to-Network Relay. The 5G ProSe Remote UE can derive PC5 session key Krelay-sess and confidentiality and integrity keys from $K_{NR\_ProSe}$. The 5G ProSe Remote UE can send the Direct Security Mode Complete message containing its PC5 user plane security policies to the 5G ProSe UE-to-Network relay, which is protected by Krelay-int or/and Krelay-enc derived from Krelay-sess according to the negotiated PC5 signalling policies between the 5G ProSe Remote UE and the 5G ProSe UE-to-Network Relay. After the successful verification of the Direct Security Mode complete message, the 5G ProSe UE-to-Network Relay responds a Direct Communication Accept message to the 5G ProSe Remote UE to finish the PC5 connection establishment procedures.

IV. Case 3: The Remote UE Use SUCI or 5G PRUK ID. PAnF Involved to Store the 5G PRUK.

IV.(a) Case 3.1 AUSF Finds (or Determines) PAnF. AUSF Generate $K_{NR\_Prose}$

Figure 11A:
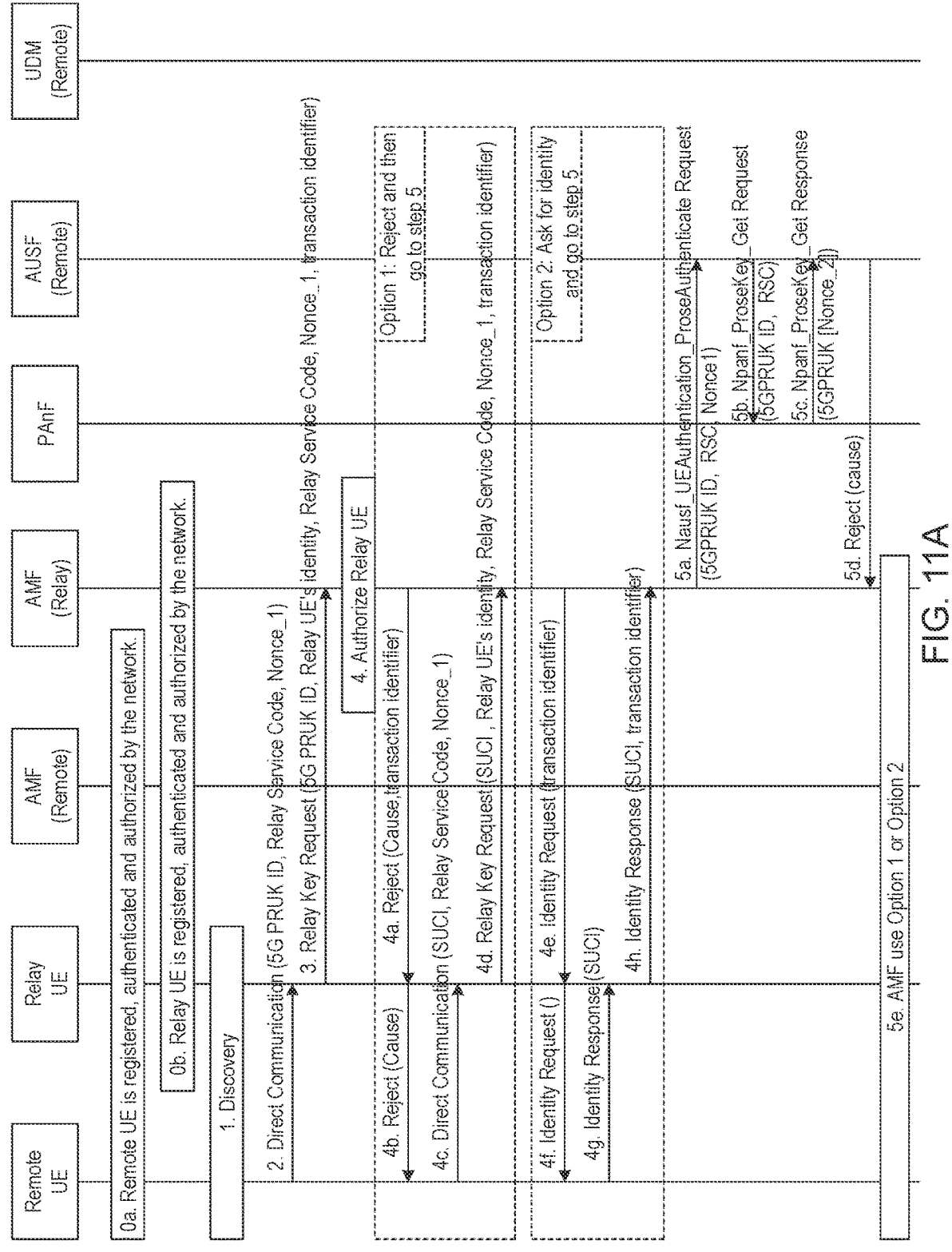
FIGS. 11A-11B show an example flowchart of a security procedure where the Remote UE uses either SUCI or 5G PRUK ID and AUSF finds PAnF, and AUSF generates $K_{NR\_Prose}$.
Figure 11B:
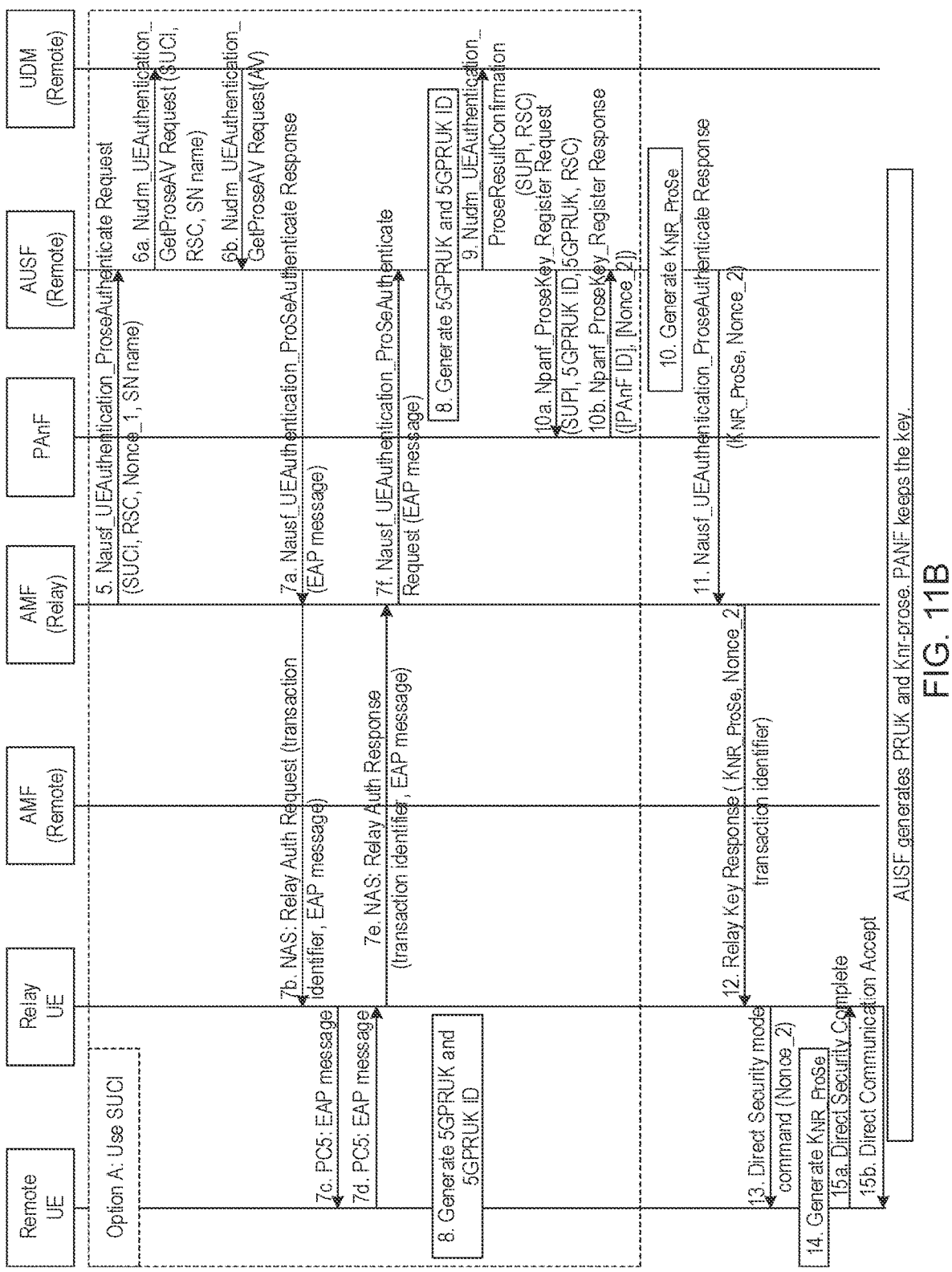

FIGS. 11A-11B shows an example flowchart of a security procedure AUSF finds PAnF, and AUSF generates $K_{NR\_Prose}$. FIG. 11B is a continuation of the process in FIG. 11A.

0. The Remote UE and relay UE can be registered with the network. The UE-to-Network relay can be authenticated and authorized by the network to support as a relay UE. Remote UE can be authenticated and authorized by the network to act as a Remote UE.

1. The remote UE can initiate discovery procedure using any of Model A or Model B method.

2. After the discovery of the UE-to-Network relay, the Remote UE can send a Direct Communication Request to the relay UE for establishing secure PC5 unicast link. The Remote UE can include its security capabilities and security policy in the DCR message. The message can also include 5GPRUK ID if available, Relay Service Code, Nonce_1. If UE has no available PRUK ID or the 5G PRUK ID has been reject before, the UE can use SUCI instead of 5G PRUK ID.

3. Upon receiving the DCR message, the Relay UE can send the relay key request to the relay AMF, including the parameters received in the DCR message.

4. The Relay AMF can verify whether the relay UE is authorized to act as U2N relay. The Relay AMF decides to whether to authenticate the Remote UE. If so, AMF use Option 1 or Option 2. Otherwise go to step 5a.

Option 1

4a. If the Relay AMF decide to authenticate the Remote UE based on its (the Relay AMF's) local policy, then the Relay AMF sends Reject message include the cause and the transaction identifier.

4b. The Relay UE forward the Reject message to the Remote UE.

4c. The Remote UE sends a new DCR message, the message can include the Remote UE's SUCI, Relay service code and Nonce_1. The Nonce_1 can be the same or different with the Nonce_1 in step 2.

4d. The Relay UE can send the relay key request to the relay AMF, including the parameters received in the DCR message. Then go to Step 5.

Option 2

4e. If the Relay AMF decide to authenticate the Remote UE based on its (the Relay AMF's) local policy, then the Relay AMF sends Identity Request message include the transaction identifier.

4f. The Relay UE forward the Identity Request message to the Remote UE.

4g. The Remote UE sends its SUCI in the Identity Response message

4h. The Relay UE forward the Identity Response message to the Relay AMF. Then go to Step 5.

5a. The relay AMF sends a Nausf_UEAuthentication-_ProseAuthenticate Request to AUSF. The request message include 5GPRUK ID, RSC, Nonce1, SN name.

5b. The AUSF can select PAnF based on 5GPRUK ID and sends a Npanf_ProseKey_Get Request to PAnF. The request message include 5GPRUK ID, RSC.

If AUSF can use 5G PRUK ID to find a PAnF instance ID which is stored in the AUSF, then the AUSF select the PAnF.

If RID is included in the 5G PRUK ID, the PAnF selection should consider the RID.

The 5GPRUK ID may be generated as follows:

5GPRUK ID is in NAI format as specified in clause 2.2 of IETF RFC 7542, e.g. username@realm. The username part can include the RID and the P-TID (Prose Temporary UE Identifier), and the realm part can include Home Network Identifier.

The P-TID is derived from $K_{AUSF}$ or Kausf_p.

5c. If the PAnF can find the 5G PRUK, then sends a Npanf_ProseKey_Get Response with 5G PRUK to the AUSF. The response may also include the Nonce_2.

5d. If the PAnF can not find the 5G PRUK, then sends a Reject Response to the AUSF. Then AUSF forward the Reject response to Relay AMF.

5e. AMF use Option 1 or Option 2.

5. As shown in FIG. 11B, which is a continuation of the process in FIG. 11A, the relay AMF sends a Nausf_UEAuthentication_ProseAuthenticate Request to AUSF. The request message include 5GPRUK ID, RSC, Nonce1, SN name.

6a~6b. The AUSF can retrieve the Authentication Vectors from the UDM via Nudm_UEAuthentication_GetProseAv Request message and trigger authentication of the remote UE.

7a. If EAP-AKA' is selected by UDM, the AUSF of the 5G ProSe Remote UE can trigger authentication of the 5G ProSe Remote UE based on EAP-AKA'. The AUSF of the 5G ProSe Remote UE generates the EAP-Request/AKA'-Challenge message defined in clause 6.1.3.1 of TS 33.501 and send EAP-Request/AKA'-Challenge message to the AMF of the 5G ProSe UE-to-Network Relay in a Nausf_UEAuthentication_ProSeAuthenticate Response message.

7b. The AMF of the 5G ProSe UE-to-Network Relay can forward the Relay Authentication Request (including the EAP-Request/AKA'-Challenge) to the 5G ProSe UE-to-Network Relay over NAS message, including transaction identifier of the 5G ProSe Remote UE in the message. The NAS message is protected using the NAS security context created for the 5G ProSe UE-to-Network Relay.

7c. Based on the transaction identifier, the 5G ProSe UE-to-Network Relay can forwards the EAP-Request/AKA'-Challenge to the 5G ProSe Remote UE over PC5 messages.

The USIM in the 5G ProSe Remote UE verifies the freshness of the received values by checking whether AUTN can be accepted.

For EAP-AKA', the USIM computes a response RES. The USIM can return RES, CK, IK to the ME. The ME can derive CK' and IK'.

7d. The 5G ProSe Remote UE can return EAP-Response/AKA'-Challenge to the 5G ProSe UE-to-Network Relay over PC5 messages.

7e. The 5G ProSe UE-to-Network Relay forwards the EAP-Response/AKA'-Challenge together with the transaction identifier of the 5G ProSe Remote UE to the AMF of the 5G ProSe UE-to-Network Relay in a NAS message Relay Authentication Response.

7f. The AMF of the 5G ProSe UE-to-Network Relay forwards EAP-Response/AKA'-Challenge to the AUSF of the 5G ProSe Remote UE via Nausf_UEAuthentication_ProSeAuthenticate Request.

The AUSF of the 5G ProSe Remote UE performs the UE authentication by verifying the received information.

For EAP-AKA', the AUSF of the 5G ProSe Remote UE and the 5G ProSe Remote UE may exchange EAP-Request/AKA'-Notification and EAP-Response/AKA'-Notification messages via the AMF of the 5G ProSe UE-to-Network Relay. After the exchanges, the AUSF of the 5G ProSe Remote UE derives $K_{AUSF}$ without calculating the KSEAF.

The AUSF of the 5G ProSe Remote UE and the 5G ProSe Remote UE can derive a new $K_{AUSF\_P}$ (different from $K_{AUSF}$). NAS SMC procedure is not performed between 5G ProSe Remote UE and AMF of the 5G ProSe UE-to-Network Relay.

8. On successful authentication, the AUSF of the 5G ProSe Remote UE and the 5G ProSe Remote UE can generate 5GPRUK and 5GPRUK ID using the newly derived $K_{AUSF\_P}$.

9. AUSF sends a Nudm_UEAuthentication_ProseResult-Confirmation to the UDM.

10a. The AUSF select a PAnF and sends a Npanf_ProseKey_Register Request to the PAnF. This message include 5GPRUK ID, 5GPRUK, RSC.

10b. The PAnF sends a Npanf_ProseKey_Register Response to AUSF. The Response may include the PAnF instance ID. The Response may also include Nonce_2.

10. The AUSF of the 5G ProSe Remote UE can generate the $K_{NR\_ProSe}$ key.

11. The AUSF of the 5G ProSe Remote UE can send the $K_{NR\_ProSe}$, Nonce_2 in Nausf_UEAuthentication_ProseAuthenticate Response message to the 5G ProSe UE-to-Network Relay via the AMF of the 5G ProSe UE-to-Network Relay. When receiving a $K_{NR\_ProSe}$ from the AUSF of the 5G ProSe Remote UE, the AMF of the 5G ProSe UE-to-Network Relay can not attempt to trigger NAS SMC procedure with the 5G ProSe Remote UE. The 5G ProSe UE-to-Network Relay derives PC5 session key Krelay-sess and confidentiality and integrity keys from $K_{NR\_ProSe}$.

12. The 5G ProSe UE-to-Network Relay can send the received Nonce_2 to the 5G ProSe Remote UE in Direct Security mode command message, which is protected using Krelay-int or/and Krelay-enc derived from Krelay-sess according to the negotiated PC5 signalling policies between the 5G ProSe Remote UE and the 5G ProSe UE-to-Network Relay.

13-15b. The 5G ProSe Remote UE can use the 5GPRUK ID to locate the $K_{AUSF\_P}$/5GPRUK to be used for the PC5 link security. The 5G ProSe Remote UE can generate the $K_{NR\_ProSe}$ key to be used for Remote access via the 5G ProSe UE-to-Network Relay. The 5G ProSe Remote UE can derive PC5 session key Krelay-sess and confidentiality and integrity keys from $K_{NR\_ProSe}$. The 5G ProSe Remote UE can send the Direct Security Mode Complete message containing its PC5 user plane security policies to the 5G ProSe UE-to-Network relay, which is protected by Krelay-int or/and Krelay-enc derived from Krelay-sess according to the negotiated PC5 signalling policies between the 5G ProSe Remote UE and the 5G ProSe UE-to-Network Relay. After the successful verification of the Direct Security Mode complete message, the 5G ProSe UE-to-Network Relay responds a Direct Communication Accept message to the 5G ProSe Remote UE to finish the PC5 connection establishment procedures.

FIG. 21 shows an example flowchart for receiving by a network device a message that indicates whether another network device identifies a relay key using an identifier. Operation 2102 includes receiving, by a first network device from a second network device, a first request message that includes an identifier associated with a first communication device. Operation 2104 includes transmitting, by the first network device to a third network device, a second request message that includes the identifier. Operation 2106 includes receiving, by the first network device and in response to the second request message, a response message from the third network device, wherein the response message indicates whether the third network device identifies a relay key using the identifier.

In some embodiment, the third network device is determined by the first network device based on the identifier. In some embodiment, after the receiving and prior to the transmitting, the method further comprises: transmitting, by the first network device, a third request to the third network device, wherein the third request includes the identifier; and receiving, from the third network device, another identifier that identifies the third network device. In some embodiment, the identifier includes a 5G ProSe Relay User Key (PRUK) identifier (ID) that includes a routing identifier or a routing indicator (RID), and wherein the relay key includes 5G PRUK. In some embodiment, the 5G PRUK ID includes a first part that includes the RID and a prose temporary user equipment identifier (P-TID), and a second part that includes a home network identifier, and the first part precedes the second part.

In some embodiment, a second communication device is authorized to act as a relay between the first communication device and a communication network that includes any one or more of first network device, the second network device, and the third network device. In some embodiment, the first network device includes an authentication server function (AUSF) device, the second network device includes a remote access and mobility management function (AMF) device, and the third network device includes a prose anchor function (PAnF).

IV.(b) Case 3.2 AMF Find PAnF. PAnF Generate $K_{NR\_Prose}$

Figure 12A:
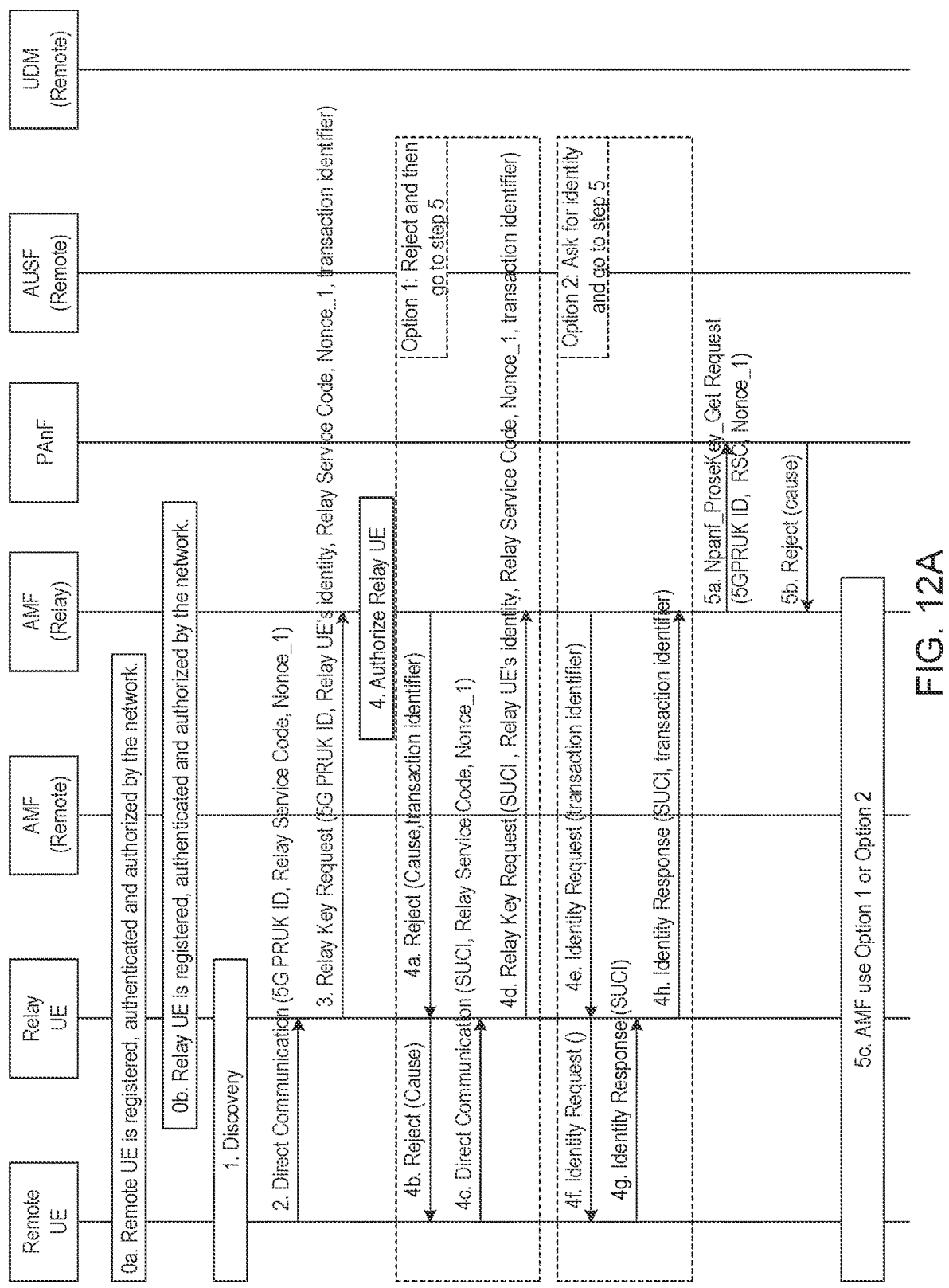
FIGS. 12A-12B show an example flowchart of a security procedure where the Remote UE uses either SUCI or 5G PRUK ID and AMF finds PAnF, and PAnF generates $K_{NR\_Prose}$.
Figure 12B:
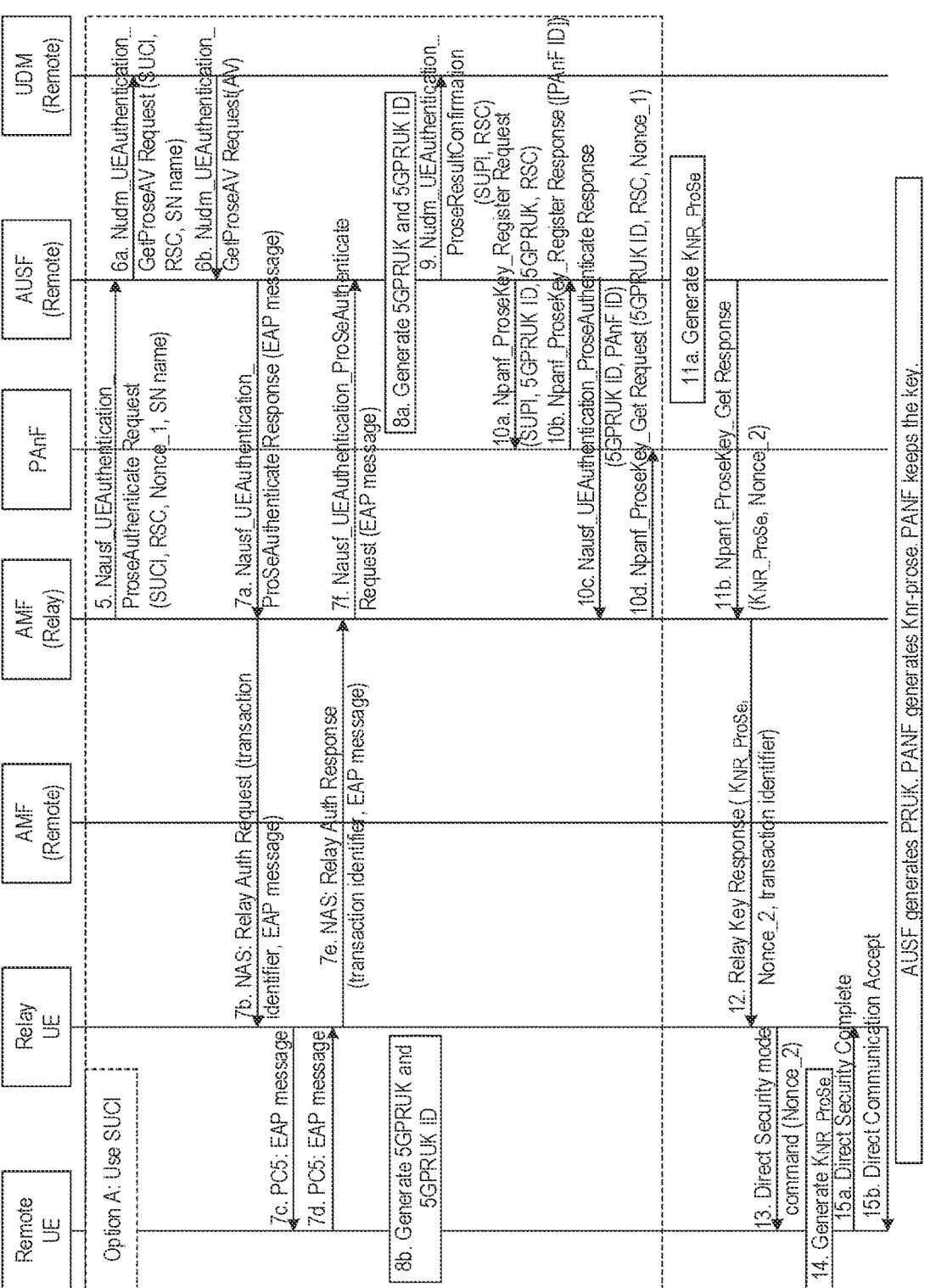

FIGS. 12A-12B show an example flowchart of a security procedure where AMF finds PAnF, and PAnF generates $K_{NR\_Prose}$. FIG. 12B is a continuation of the process in FIG. 12A.

0. The Remote UE and relay UE can be registered with the network. The UE-to-Network relay can be authenticated and authorized by the network to support as a relay UE. Remote UE can be authenticated and authorized by the network to act as a Remote UE.

1. The remote UE can initiate discovery procedure using any of Model A or Model B method.

2. After the discovery of the UE-to-Network relay, the Remote UE can send a Direct Communication Request to the relay UE for establishing secure PC5 unicast link. The Remote UE can include its security capabilities and security policy in the DCR message. The message can also include 5GPRUK ID if available, Relay Service Code, Nonce_1. If UE has no available 5G PRUK ID or the 5G PRUK ID has been reject before, the UE can use SUCI instead of 5G PRUK ID.

3. Upon receiving the DCR message, the Relay UE can send the relay key request to the relay AMF, including the parameters received in the DCR message.

4. The Relay AMF can verify whether the relay UE is authorized to act as U2N relay. The Relay AMF decides to whether to authenticate the Remote UE. If so, AMF use Option 1 or Option 2. Otherwise go to step 5a.

Option 1

4a. If the Relay AMF decide to authenticate the Remote UE based on its (the Relay AMF's) local policy, then the Relay AMF sends Reject message include the cause and the transaction identifier.

4b. The Relay UE forward the Reject message to the Remote UE.

4c. The Remote UE sends a new DCR message, the message can include the Remote UE's SUCI, Relay service code and Nonce_1. The Nonce_1 can be the same or different with the Nonce_1 in step 2.

4d. The Relay UE can send the relay key request to the relay AMF, including the parameters received in the DCR message. Then go to Step 5.

Option 2

4e. If the Relay AMF decide to authenticate the Remote UE based on its (the Relay AMF's) local policy, then the Relay AMF sends Identity Request message include the transaction identifier.

4f. The Relay UE forward the Identity Request message to the Remote UE.

4g. The Remote UE sends its SUCI in the Identity Response message

4h. The Relay UE forward the Identity Response message to the Relay AMF. Then go to Step 5.

5a. The relay AMF select PAnF based on 5GPRUK ID and sends a Npanf_ProseKey_Get Request to PAnF. The request message include 5GPRUK ID, RSC, Nonce_1.

If AMF can use 5G PRUK ID to find a PAnF instance ID which is stored in the AMF, then the AMF select the PAnF.

If RID is included in the 5G PRUK ID, the PAnF selection should consider the RID. The 5GPRUK ID may be generated as follows:

5GPRUK ID is in NAI format as specified in clause 2.2 of IETF RFC 7542, e.g. username@realm. The username part can include the RID and the P-TID (Prose Temporary UE Identifier), and the realm part can include Home Network Identifier.

The P-TID is derived from $K_{AUSF}$ or Kausf_p.

5b. If the PAnF can find the 5G PRUK, then go to Step 11a. If the PAnF can not find the 5G PRUK, then sends a Reject Response to the AMF.

5c. AMF use Option 1 or Option 2.

5. As shown in FIG. 12B, which is a continuation of the process in FIG. 12A, the relay AMF sends a Nausf_UEAuthentication_ProseAuthenticate Request to AUSF. The request message include 5GPRUK ID, RSC, Nonce1, SN name.

6a~6b. The AUSF can retrieve the Authentication Vectors from the UDM via Nudm_UEAuthentication_GetProseAv Request message and trigger authentication of the remote UE.

7a. If EAP-AKA' is selected by UDM, the AUSF of the 5G ProSe Remote UE can trigger authentication of the 5G ProSe Remote UE based on EAP-AKA'. The AUSF of the 5G ProSe Remote UE generates the EAP-Request/AKA'-Challenge message and send EAP-Request/AKA'-Challenge message to the AMF of the 5G ProSe UE-to-Network Relay in a Nausf_UEAuthentication_ProSeAuthenticate Response message.

7b. The AMF of the 5G ProSe UE-to-Network Relay can forward the Relay Authentication Request (including the EAP-Request/AKA'-Challenge) to the 5G ProSe UE-to-Network Relay over NAS message, including transaction identifier of the 5G ProSe Remote UE in the message. The NAS message is protected using the NAS security context created for the 5G ProSe UE-to-Network Relay.

7c. Based on the transaction identifier, the 5G ProSe UE-to-Network Relay can forwards the EAP-Request/AKA'-Challenge to the 5G ProSe Remote UE over PC5 messages.

The USIM in the 5G ProSe Remote UE verifies the freshness of the received values by checking whether AUTN can be accepted.

For EAP-AKA', the USIM computes a response RES. The USIM can return RES, CK, IK to the ME. The ME can derive CK' and IK'.

7d. The 5G ProSe Remote UE can return EAP-Response/AKA'-Challenge to the 5G ProSe UE-to-Network Relay over PC5 messages.

7e. The 5G ProSe UE-to-Network Relay forwards the EAP-Response/AKA'-Challenge together with the transaction identifier of the 5G ProSe Remote UE to the AMF of the 5G ProSe UE-to-Network Relay in a NAS message Relay Authentication Response.

7f. The AMF of the 5G ProSe UE-to-Network Relay forwards EAP-Response/AKA'-Challenge to the AUSF of the 5G ProSe Remote UE via Nausf_UEAuthentication_ProSeAuthenticate Request.

The AUSF of the 5G ProSe Remote UE performs the UE authentication by verifying the received information.

For EAP-AKA', the AUSF of the 5G ProSe Remote UE and the 5G ProSe Remote UE may exchange EAP-Request/AKA'-Notification and EAP-Response/AKA'-Notification messages via the AMF of the 5G ProSe UE-to-Network Relay. After the exchanges, the AUSF of the 5G ProSe Remote UE derives $K_{AUSF}$ without calculating the KSEAF.

The AUSF of the 5G ProSe Remote UE and the 5G ProSe Remote UE can derive a new $K_{AUSF\_P}$ (different from $K_{AUSF}$). NAS SMC procedure is not performed between 5G ProSe Remote UE and AMF of the 5G ProSe UE-to-Network Relay.

8. On successful authentication, the AUSF of the 5G ProSe Remote UE and the 5G ProSe Remote UE can generate 5GPRUK and 5GPRUK ID using the newly derived $K_{AUSF\_P}$.

9. AUSF sends a Nudm_UEAuthentication_ProseResult-Confirmation to the UDM.

10a. The AUSF select a PAnF and sends a Npanf_ProseKey_Register Request to the PAnF. This message include 5GPRUK ID, 5GPRUK, RSC.

10b. The PAnF sends a Npanf_ProseKey_Register Response to AUSF. The Response may include the PAnF instance ID.

10c. The AUSF sends a Nausf_UEAuthentication_Prose-Authenticate Response to AMF. The message include 5G PRUK ID. The message may also include PAnF ID.

10d. The AMF select the PAnF based on the 5G PRUK ID. If AMF received PAnF ID from AUSF, the AMF select the PAnF. The AMF sends a Npanf_ProseKey_Get Request to PAnF, the message include 5GPRUK ID, RSC, Nonce_1.

11a. The PAnF can generate the $K_{NR\_ProSe}$_key.

11b. The PAnF sends a Npanf_ProseKey_Get Response to the AMF.

12. The 5G ProSe UE-to-Network Relay can send the received Nonce_2 to the 5G ProSe Remote UE in Direct Security mode command message, which is protected using Krelay-policies between the 5G ProSe Remote UE and the 5G ProSe UE-to-Network Relay.

13-15b. The 5G ProSe Remote UE can use the 5GPRUK ID to locate the $K_{AUSF}$_P/5GPRUK to be used for the PC5 link security. The 5G ProSe Remote UE can generate the $K_{NR\_ProSe}$ key to be used for Remote access via the 5G ProSe UE-to-Network Relay. The 5G ProSe Remote UE can derive PC5 session key Krelay-sess and confidentiality and integrity keys from $K_{NR\_ProSe}$. The 5G ProSe Remote UE can send the Direct Security Mode Complete message containing its PC5 user plane security policies to the 5G ProSe UE-to-Network relay, which is protected by Krelay-int or/and Krelay-enc derived from Krelay-sess according to the negotiated PC5 signalling policies between the 5G ProSe Remote UE and the 5G ProSe UE-to-Network Relay. After the successful verification of the Direct Security Mode complete message, the 5G ProSe UE-to-Network Relay responds a Direct Communication Accept message to the 5G ProSe Remote UE to finish the PC5 connection establishment procedures.

FIG. 22 shows an example flowchart for receiving by a network device a message that indicates whether another network device identifies a relay key using an identifier. Operation 2202 includes transmitting, by a second network device to a third network device, a request message that includes an identifier associated with a first communication device. Operation 2204 includes receiving, by the second network device and in response to the request message, a response message from the third network device, wherein the response message indicates whether the third network device identifies a relay key using the identifier.

In some embodiments, the third network device is determined by the second network device based on the identifier. In some embodiments, prior to the transmitting, the method further comprises: transmitting, by the second network device, a second request to the third network device, wherein the third request includes the identifier; and receiving, from a first network device, another identifier that identifies the third network device, wherein the first network device includes an authentication server function (AUSF) device. In some embodiments, the identifier includes a 5G ProSe Relay User Key (PRUK) identifier (ID) that includes a routing identifier or a routing indicator (RID), and wherein the relay key includes 5G PRUK. In some embodiments, the 5G PRUK ID includes a first part that includes the RID and a prose temporary user equipment identifier (P-TID), and a second part that includes a home network identifier, and the first part precedes the second part.

In some embodiments, a second communication device is authorized to act as a relay between the first communication device and a communication network that includes any one or more of the second network device, and the third network device. In some embodiments, the second network device includes a remote access and mobility management function (AMF) device, and the third network device includes a prose anchor function (PAnF).

IV.(c) Case 3.3 AUSF Find PAnF. PAnF Generate $K_{NR\_Prose}$

Figure 13A:
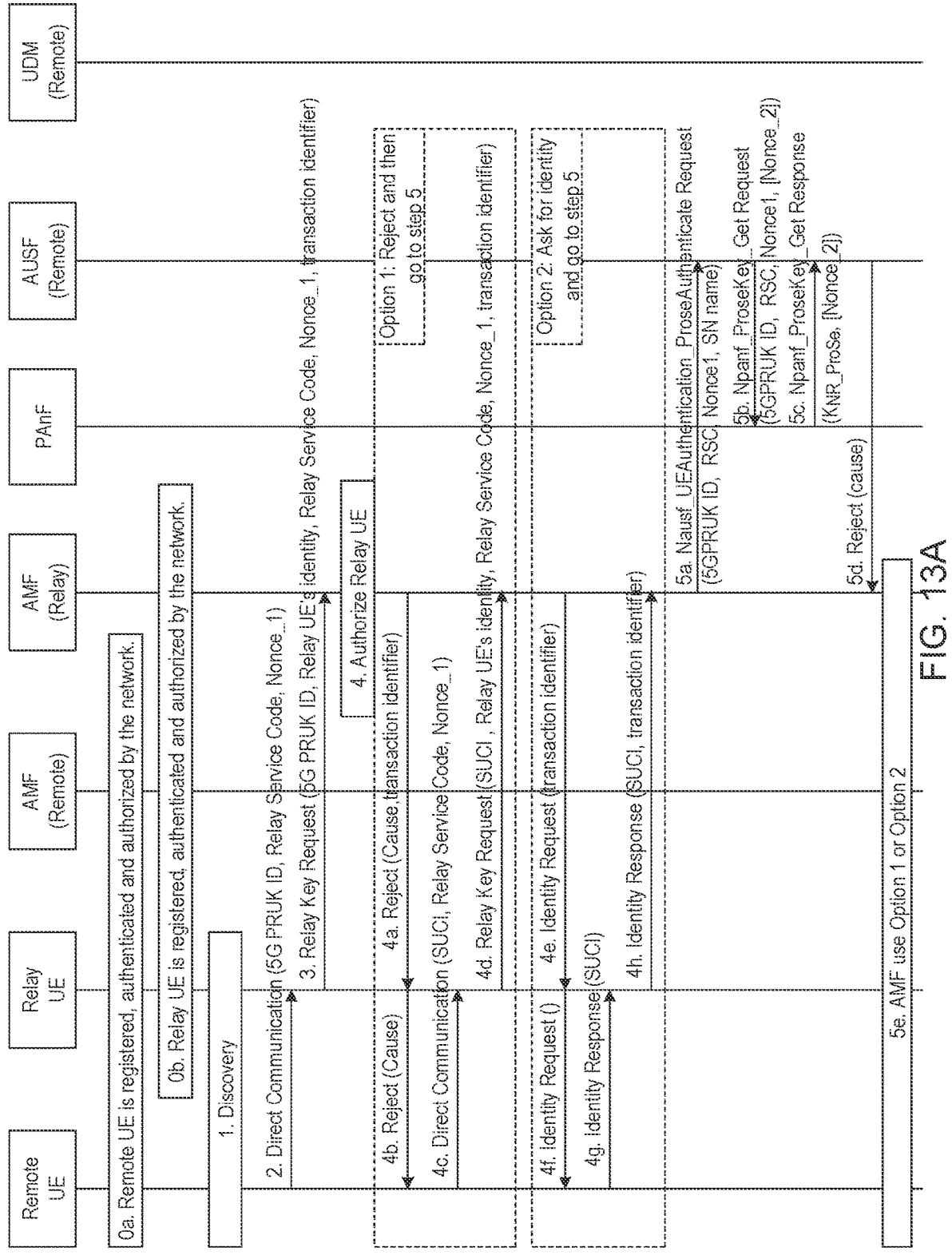
FIGS. 13A-13B show an example flowchart of a security procedure where the Remote UE uses either SUCI or 5G PRUK ID and AUSF finds PAnF, and PAnF generate $K_{NR\_Prose}$.
Figure 13B:
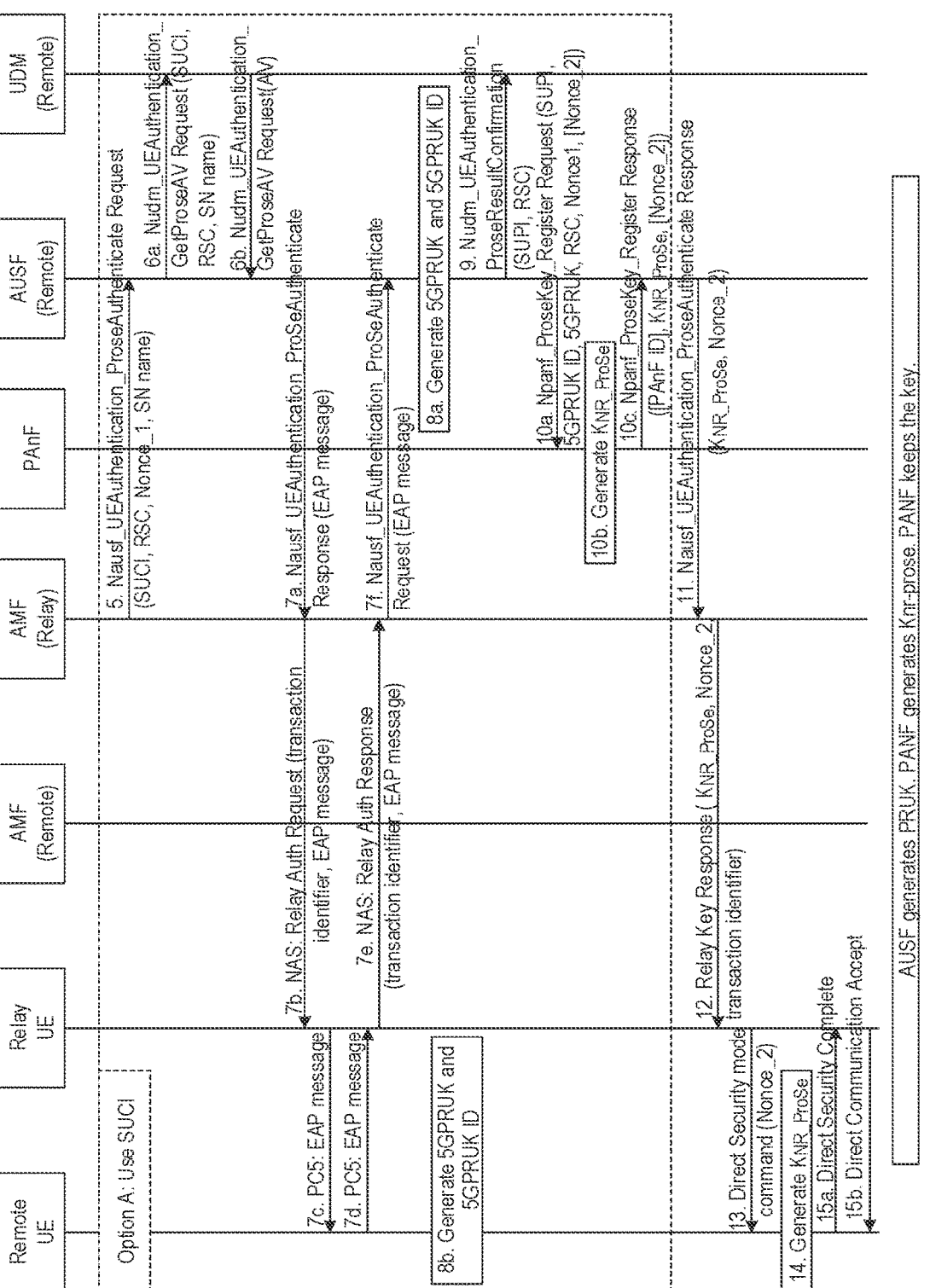

FIGS. 13A-13B show an example flowchart of a security procedure where AUSF finds PAnF, and PAnF generate $K_{NR\_Prose}$. FIG. 13B is a continuation of the process in FIG. 13A.

0. The Remote UE and relay UE can be registered with the network. The UE-to-Network relay can be authenticated and authorized by the network to support as a relay UE. Remote UE can be authenticated and authorized by the network to act as a Remote UE.

1. The remote UE can initiate discovery procedure using any of Model A or Model B method.

2. After the discovery of the UE-to-Network relay, the Remote UE can send a Direct Communication Request to the relay UE for establishing secure PC5 unicast link. The Remote UE can include its security capabilities and security policy in the DCR message. The message can also include 5GPRUK ID if available, Relay Service Code, Nonce_1. If UE has no available 5G PRUK ID or the 5G PRUK ID has been reject before, the UE can use SUCI instead of 5G PRUK ID.

3. Upon receiving the DCR message, the Relay UE can send the relay key request to the relay AMF, including the parameters received in the DCR message.

4. The Relay AMF can verify whether the relay UE is authorized to act as U2N relay. The Relay AMF decides to whether to authenticate the Remote UE. If so, AMF use Option 1 or Option 2. Otherwise go to step 5a.

Option 1

4a. If the Relay AMF decide to authenticate the Remote UE based on its (the Relay AMF's) local policy, then the Relay AMF sends Reject message include the cause and the transaction identifier.

4b. The Relay UE forward the Reject message to the Remote UE.

4c. The Remote UE sends a new DCR message, the message can include the Remote UE's SUCI, Relay service code and Nonce_1. The Nonce_1 can be the same or different with the Nonce_1 in step 2.

4d. The Relay UE can send the relay key request to the relay AMF, including the parameters received in the DCR message. Then go to Step 5.

Option 2

4e. If the Relay AMF decide to authenticate the Remote UE based on its (the Relay AMF's) local policy, then the Relay AMF sends Identity Request message include the transaction identifier.

4f. The Relay UE forward the Identity Request message to the Remote UE.

4g. The Remote UE sends its SUCI in the Identity Response message

4h. The Relay UE forward the Identity Response message to the Relay AMF. Then go to Step 5.

5a. The relay AMF sends a Nausf_UEAuthentication_ProseAuthenticate Request to AUSF. The request message include 5GPRUK ID, RSC, Nonce1, SN name.

5b. The AUSF can select PAnF based on 5GPRUK ID and sends a Npanf_ProseKey_Get Request to PAnF. The request message include 5GPRUK ID, RSC, Nonce_1. The request may also include the Nonce_2.

If AUSF can use 5G PRUK ID to find a PAnF instance ID which is stored in the AUSF, then the AUSF select the PAnF.

If RID is included in the 5G PRUK ID, the PAnF selection should consider the RID.

The 5GPRUK ID may be generated as follows:

5GPRUK ID is in NAI format as specified in clause 2.2 of IETF RFC 7542, e.g. username@realm. The username part can include the RID and the P-TID (Prose Temporary UE Identifier), and the realm part can include Home Network Identifier.

The P-TID is derived from $K_{AUSF}$ or Kausf_p.

5c. If the PAnF can find the 5G PRUK, then sends a Npanf_ProseKey_Get Response with $K_{NR\_Prose}$ to the AUSF. If the PAnF received Nonce_2 from AUSF, the PAnF use the Nonce_2 to generate $K_{NR\_Prose}$. Otherwise, the PAnF generate the Nonce_2 itself and include the Nonce_2 in the response.

5d. If the PAnF can not find the 5G PRUK, then sends a Reject Response to the AUSF. Then AUSF forward the Reject response to Relay AMF.

5e. AMF use Option 1 or Option 2.

5. As shown in FIG. 13B, which is a continuation of the process in FIG. 13A, the relay AMF sends a Nausf_UEAu-thentication_ProseAuthenticate Request to AUSF. The request message include 5GPRUK ID, RSC, Nonce1, SN name.

6a~6b. The AUSF can retrieve the Authentication Vectors from the UDM via Nudm_UEAuthentication_GetProseAv Request message and trigger authentication of the remote UE.

7a. If EAP-AKA' is selected by UDM, the AUSF of the 5G ProSe Remote UE can trigger authentication of the 5G ProSe Remote UE based on EAP-AKA'. The AUSF of the 5G ProSe Remote UE generates the EAP-Request/AKA'-Challenge message defined in clause 6.1.3.1 of TS 33.501 and send EAP-Request/AKA'-Challenge message to the AMF of the 5G ProSe UE-to-Network Relay in a Nausf_U-EAuthentication_ProseAuthenticate Response message.

7b. The AMF of the 5G ProSe UE-to-Network Relay can forward the Relay Authentication Request (including the EAP-Request/AKA'-Challenge) to the 5G ProSe UE-to-Network Relay over NAS message, including transaction identifier of the 5G ProSe Remote UE in the message. The NAS message is protected using the NAS security context created for the 5G ProSe UE-to-Network Relay.

7c. Based on the transaction identifier, the 5G ProSe UE-to-Network Relay can forwards the EAP-Request/AKA'-Challenge to the 5G ProSe Remote UE over PC5 messages.

The USIM in the 5G ProSe Remote UE verifies the freshness of the received values by checking whether AUTN can be accepted.

For EAP-AKA', the USIM computes a response RES. The USIM can return RES, CK, IK to the ME. The ME can derive CK' and IK'.

7d. The 5G ProSe Remote UE can return EAP-Response/AKA'-Challenge to the 5G ProSe UE-to-Network Relay over PC5 messages.

7e. The 5G ProSe UE-to-Network Relay forwards the EAP-Response/AKA'-Challenge together with the transac-tion identifier of the 5G ProSe Remote UE to the AMF of the 5G ProSe UE-to-Network Relay in a NAS message Relay Authentication Response.

7f. The AMF of the 5G ProSe UE-to-Network Relay forwards EAP-Response/AKA'-Challenge to the AUSF of the 5G ProSe Remote UE via Nausf_UEAuthentication_ProSeAuthenticate Request.

The AUSF of the 5G ProSe Remote UE performs the UE authentication by verifying the received information.

For EAP-AKA', the AUSF of the 5G ProSe Remote UE and the 5G ProSe Remote UE may exchange EAP-Request/AKA'-Notification and EAP-Response/AKA'-Notification messages via the AMF of the 5G ProSe UE-to-Network Relay. After the exchanges, the AUSF of the 5G ProSe Remote UE derives $K_{AUSF}$ without calculating the $K_{SEAF}$ The AUSF of the 5G ProSe Remote UE and the 5G ProSe Remote UE can derive a new $K_{AUSF\_P}$ (different from $K_{AUSF}$) NAS SMC procedure is not performed between 5G ProSe Remote UE and AMF of the 5G ProSe UE-to-Network Relay.

8.0n successful authentication, the AUSF of the 5G ProSe Remote UE and the 5G ProSe Remote UE can generate 5GPRUK and 5GPRUK ID using the newly derived $K_{AUSF\_P}$.

9. AUSF sends a Nudm_UEAuthentication_ProseResult-Confirmation to the UDM.

10a. The AUSF select a PAnF and sends a Npanf_ProseKey_Register Request to the PAnF. This message include 5GPRUK ID, 5GPRUK, RSC, Nonce_1. The Request may also include Nonce_2.

10b. The PAnF generate the $K_{NR\_Prose}$ Key.

10c. The PAnF sends a Npanf_ProseKey_Register Response with $K_{NR\_Prose}$ to AUSF. The Response may include the PAnF instance ID. The Response may also include Nonce_2.

11. The AUSF of the 5G ProSe Remote UE can send the $K_{NR\_ProSe}$, Nonce_2 in Nausf_UEAuthentication_ProseAu-thenticate Response message to the 5G ProSe UE-to-Net-work Relay via the AMF of the 5G ProSe UE-to-Network Relay. When receiving a $K_{NR\_ProSe}$ from the AUSF of the 5G ProSe Remote UE, the AMF of the 5G ProSe UE-to-Network Relay can not attempt to trigger NAS SMC pro-cedure with the 5G ProSe Remote UE. The 5G ProSe UE-to-Network Relay derives PC5 session key Krelay-sess and confidentiality and integrity keys from $K_{NR\_ProSe}$.

12. The 5G ProSe UE-to-Network Relay can send the received Nonce_2 to the 5G ProSe Remote UE in Direct Security mode command message, which is protected using Krelay-policies between the 5G ProSe Remote UE and the 5G ProSe UE-to-Network Relay.

13-15b. The 5G ProSe Remote UE can use the 5GPRUK ID to locate the $K_{AUSF}$_P/5GPRUK to be used for the PC5 link security. The 5G ProSe Remote UE can generate the $K_{NR\_ProSe}$_key to be used for Remote access via the 5G ProSe UE-to-Network Relay. The 5G ProSe Remote UE can derive PC5 session key Krelay-sess and confidentiality and integrity keys from $K_{NR\_ProSe}$. The 5G ProSe Remote UE can send the Direct Security Mode Complete message containing its PC5 user plane security policies to the 5G ProSe UE-to-Network relay, which is protected by Krelay-int or/and Krelay-enc derived from Krelay-sess according to the negotiated PC5 signalling policies between the 5G ProSe Remote UE and the 5G ProSe UE-to-Network Relay. After the successful verification of the Direct Security Mode complete message, the 5G ProSe UE-to-Network Relay responds a Direct Communication Accept message to the 5G ProSe Remote UE to finish the PC5 connection establish-ment procedures.

V. Case 4: The Remote UE Use SUCI and 5G PRUK ID. PAnF Involved to Store the 5G PRUK.

V.(a) Case 4.1 AUSF Find PAnF. AUSF Generate $K_{NR\_Prose}$

Figure 14A:
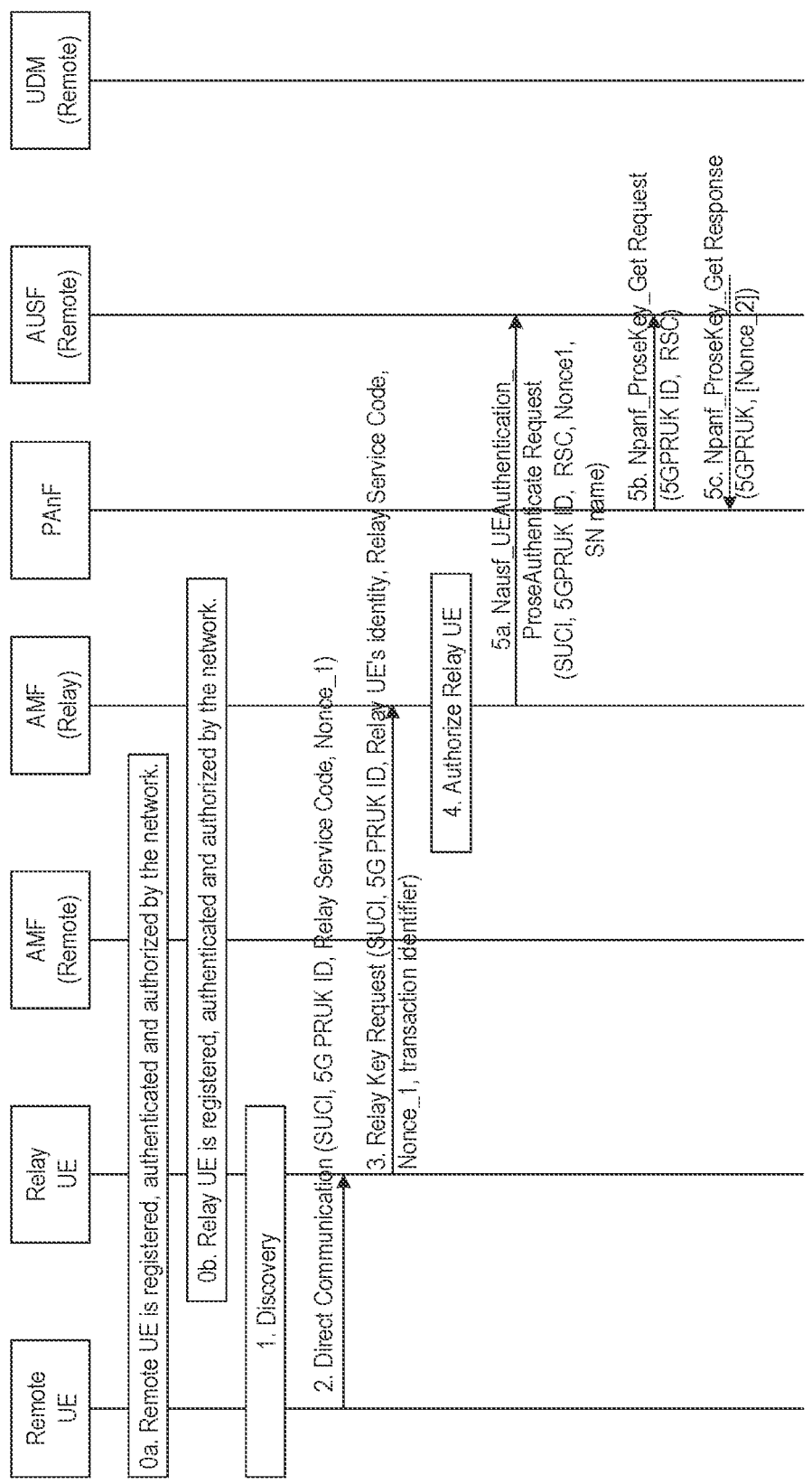
FIGS. 14A-14B show an example flowchart of a security procedure where the Remote UE uses both SUCI and 5G PRUK ID and AUSF finds PAnF, and AUSF generate $K_{NR\_Prose}$.
Figure 14B:
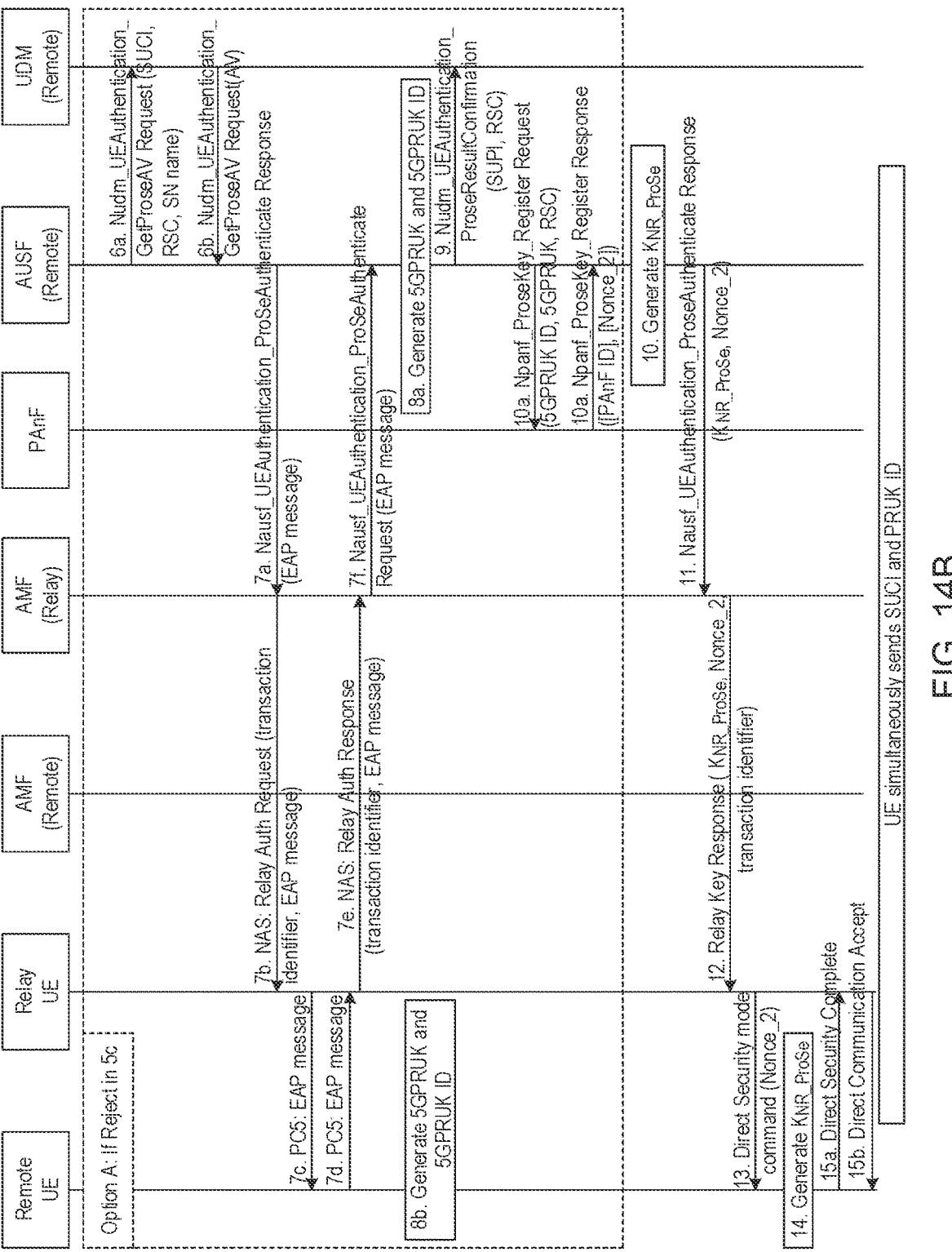

FIGS. 14A-14B show an example flowchart of a security procedure where AUSF finds PAnF, and AUSF generate $K_{NR\_Prose}$. FIG. 14B is a continuation of the process in FIG. 14A.

0. The Remote UE and relay UE can be registered with the network. The UE-to-Network relay can be authenticated and authorized by the network to support as a relay UE. Remote UE can be authenticated and authorized by the network to act as a Remote UE.

1. The remote UE can initiate discovery procedure using any of Model A or Model B method.

2. After the discovery of the UE-to-Network relay, the Remote UE can send a Direct Communication Request to the relay UE for establishing secure PC5 unicast link. The Remote UE can include its security capabilities and security policy in the DCR message. The message can also include SUCI and 5GPRUK ID if available, Relay Service Code, Nonce_1.

3. Upon receiving the DCR message, the Relay UE can send the relay key request to the relay AMF, including the parameters received in the DCR message.

4. The Relay AMF can verify whether the relay UE is authorized to act as U2N relay. The Relay AMF decides to whether to authenticate the Remote UE.

5a. The relay AMF sends a Nausf_UEAuthentication_ProseAuthenticate Request to AUSF. The request message include 5GPRUK ID, RSC, Nonce1, SN name.

5b. The AUSF can select PAnF based on 5GPRUK ID and sends a Npanf_ProseKey_Get Request to PAnF. The request message include 5GPRUK ID, RSC.

If AUSF can use 5G PRUK ID to find a PAnF instance ID which is stored in the AUSF, then the AUSF select the PAnF.

If RID is included in the 5G PRUK ID, the PAnF selection should consider the RID.

The 5GPRUK ID may be generated as follows:

5GPRUK ID is in NAI format as specified in clause 2.2 of IETF RFC 7542, e.g. username@realm. The username part can include the RID and the P-TID (Prose Temporary UE Identifier), and the realm part can include Home Network Identifier.

The P-TID is derived from $K_{AUSF}$ or Kausf_p.

5c. If the PAnF can find the 5G PRUK, then sends a Npanf_ProseKey_Get Response with 5G PRUK to the AUSF. The response may also include the Nonce_2. Then go to step 10.

If the PAnF can not find the 5G PRUK, then sends a Reject Response to the AUSF. Then go to step 6a.

6a~6b. As shown in FIG. 14B, which is a continuation of the process in FIG. 14A, the AUSF can retrieve the Authentication Vectors from the UDM via Nudm_UEAuthentication_GetProseAv Request message and trigger authentication of the remote UE.

7a. If EAP-AKA' is selected by UDM, the AUSF of the 5G ProSe Remote UE can trigger authentication of the 5G ProSe Remote UE based on EAP-AKA'. The AUSF of the 5G ProSe Remote UE generates the EAP-Request/AKA'-Challenge message and send EAP-Request/AKA'-Challenge message to the AMF of the 5G ProSe UE-to-Network Relay in a Nausf_UEAuthentication_ProSeAuthenticate Response message.

7b. The AMF of the 5G ProSe UE-to-Network Relay can forward the Relay Authentication Request (including the EAP-Request/AKA'-Challenge) to the 5G ProSe UE-to-Network Relay over NAS message, including transaction identifier of the 5G ProSe Remote UE in the message. The NAS message is protected using the NAS security context created for the 5G ProSe UE-to-Network Relay.

7c. Based on the transaction identifier, the 5G ProSe UE-to-Network Relay can forwards the EAP-Request/AKA'-Challenge to the 5G ProSe Remote UE over PC5 messages.

The USIM in the 5G ProSe Remote UE verifies the freshness of the received values by checking whether AUTN can be accepted.

For EAP-AKA', the USIM computes a response RES. The USIM can return RES, CK, IK to the ME. The ME can derive CK' and IK'.

7d. The 5G ProSe Remote UE can return EAP-Response/AKA'-Challenge to the 5G ProSe UE-to-Network Relay over PC5 messages.

7e. The 5G ProSe UE-to-Network Relay forwards the EAP-Response/AKA'-Challenge together with the transaction identifier of the 5G ProSe Remote UE to the AMF of the ProSe UE-to-Network Relay in a NAS message Relay Authentication Response.

7f. The AMF of the 5G ProSe UE-to-Network Relay forwards EAP-Response/AKA'-Challenge to the AUSF of the 5G ProSe Remote UE via Nausf_UEAuthentication_ProSeAuthenticate Request.

The AUSF of the 5G ProSe Remote UE performs the UE authentication by verifying the received information.

For EAP-AKA', the AUSF of the 5G ProSe Remote UE and the 5G ProSe Remote UE may exchange EAP-Request/AKA'-Notification and EAP-Response/AKA'-Notification messages via the AMF of the 5G ProSe UE-to-Network Relay. After the exchanges, the AUSF of the 5G ProSe Remote UE derives $K_{AUSF}$ without calculating the $K_{SEAF}$.

The AUSF of the 5G ProSe Remote UE and the 5G ProSe Remote UE can derive a new $K_{AUSF\_P}$ (different from $K_{AUSF}$). NAS SMC procedure is not performed between 5G ProSe Remote UE and AMF of the 5G ProSe UE-to-Network Relay.

8. On successful authentication, the AUSF of the 5G ProSe Remote UE and the 5G ProSe Remote UE can generate 5GPRUK and 5GPRUK ID using the newly derived $K_{AUSF\_P}$.

9. AUSF sends a Nudm_UEAuthentication_ProseResult-Confirmation to the UDM.

10a. The AUSF select a PAnF and sends a Npanf_ProseKey_Register Request to the PAnF. This message include 5GPRUK ID, 5GPRUK, RSC.

10b. The PAnF sends a Npanf_ProseKey_Register Response to AUSF. The Response may include the PAnF instance ID. The Response may also include Nonce_2.

10. The AUSF of the 5G ProSe Remote UE can generate the $K_{NR\_ProSe}$ key.

11. The AUSF of the 5G ProSe Remote UE can send the $K_{NR\_ProSe}$, Nonce_2 in Nausf_UEAuthentication_ProSeAuthenticate Response message to the 5G ProSe UE-to-Network Relay via the AMF of the 5G ProSe UE-to-Network Relay. When receiving a $K_{NR\_ProSe}$ from the AUSF of the 5G ProSe Remote UE, the AMF of the 5G ProSe UE-to-Network Relay can not attempt to trigger NAS SMC procedure with the 5G ProSe Remote UE. The 5G ProSe UE-to-Network Relay derives PC5 session key Krelay-sess and confidentiality and integrity keys from $K_{NR\_ProSe}$.

12. The 5G ProSe UE-to-Network Relay can send the received Nonce_2 to the 5G ProSe Remote UE in Direct Security mode command message, which is protected using Krelay-int or/and Krelay-enc derived from Krelay-sess according to the negotiated PC5 signalling policies between the 5G ProSe Remote UE and the 5G ProSe UE-to-Network Relay.

13-15b. The 5G ProSe Remote UE can use the 5GPRUK ID to locate the $K_{AUSF}$_P/5GPRUK to be used for the PC5 link security. The 5G ProSe Remote UE can generate the $K_{NR\_ProSe}$ key to be used for Remote access via the 5G ProSe UE-to-Network Relay. The 5G ProSe Remote UE can derive PC5 session key Krelay-sess and confidentiality and integrity keys from $K_{NR\_ProSe}$ The 5G ProSe Remote UE can send the Direct Security Mode Complete message containing its PC5 user plane security policies to the 5G ProSe UE-to-Network relay, which is protected by Krelay-int or/and Krelay-enc derived from Krelay-sess according to the negotiated PC5 signalling policies between the 5G ProSe Remote UE and the 5G ProSe UE-to-Network Relay. After the successful verification of the Direct Security Mode complete message, the 5G ProSe UE-to-Network Relay responds a Direct Communication Accept message to the ProSe Remote UE to finish the PC5 connection establishment procedures.

V.(b) Case 4.2 AMF Find PAnF. PAnF Generate K R Prose

Figure 15A:
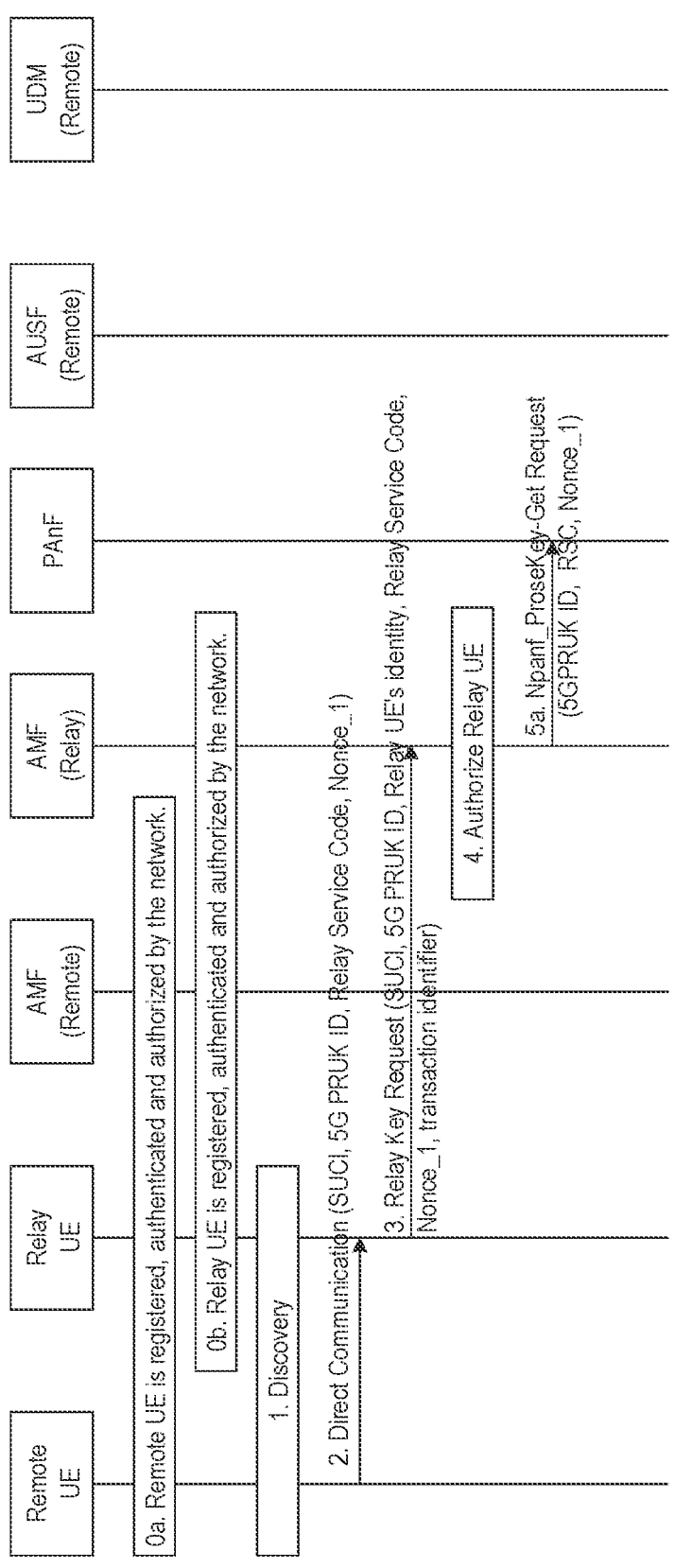
FIGS. 15A-15B show an example flowchart of a security procedure where the Remote UE uses both SUCI and 5G PRUK ID and AMF finds PAnF, and PAnF generate $K_{NR\_Prose}$.
Figure 15B:
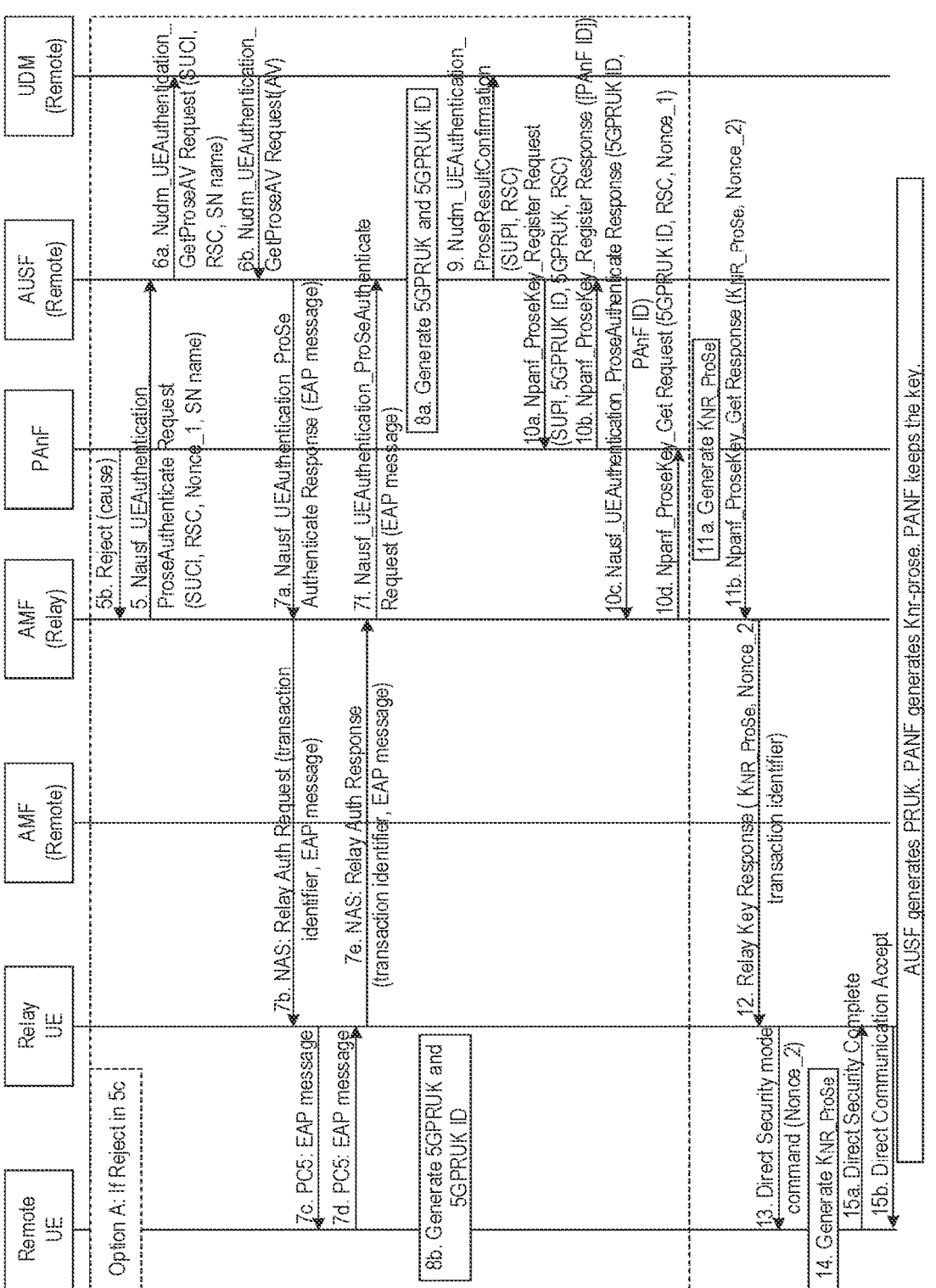

FIGS. 15A-15B show an example flowchart of a security procedure where AMF finds PAnF, and PAnF generate $K_{NR\_Prose}$. FIG. 15B is a continuation of the process in FIG. 15A.

0. The Remote UE and relay UE can be registered with the network. The UE-to-Network relay can be authenticated and authorized by the network to support as a relay UE. Remote UE can be authenticated and authorized by the network to act as a Remote UE.

1. The remote UE can initiate discovery procedure using any of Model A or Model B method.

2. After the discovery of the UE-to-Network relay, the Remote UE can send a Direct Communication Request to the relay UE for establishing secure PC5 unicast link. The Remote UE can include its security capabilities and security policy in the DCR message. The message can also include SUCI and 5GPRUK ID if available, Relay Service Code, Nonce_1.

3. Upon receiving the DCR message, the Relay UE can send the relay key request to the relay AMF, including the parameters received in the DCR message.

4. The Relay AMF can verify whether the relay UE is authorized to act as U2N relay. The Relay AMF decides to whether to authenticate the Remote UE.

5a. The relay AMF select PAnF based on 5GPRUK ID and sends a Npanf_ProseKey_Get Request to PAnF. The request message include 5GPRUK ID, RSC, Nonce1.

If the PAnF can find the 5G PRUK, then go to Step 11a

If AMF can use 5G PRUK ID to find a PAnF instance ID which is stored in the AMF, then the AMF select the PAnF.

If RID is included in the 5G PRUK ID, the PAnF selection should consider the RID.

The 5GPRUK ID may be generated as follows:

5GPRUK ID is in NAI format as specified in clause 2.2 of IETF RFC 7542, e.g. username@realm. The username part can include the RID and the P-TID (Prose Temporary UE Identifier), and the realm part can include Home Network Identifier.

The P-TID is derived from $K_{AUSF}$ or Kausf_p.

5b. As shown in FIG. 15B, which is a continuation of the process in FIG. 15A, if the PAnF can not find the 5G PRUK, then sends a Reject Response to the AMF.

5. The relay AMF sends a Nausf_UEAuthentication_ProseAuthenticate Request to AUSF. The request message include SUCI, RSC, Nonce1, SN name.

6a~6b. The AUSF can retrieve the Authentication Vectors from the UDM via Nudm_UEAuthentication_GetProseAv Request message and trigger authentication of the remote UE.

7a. If EAP-AKA' is selected by UDM, the AUSF of the 5G ProSe Remote UE can trigger authentication of the 5G ProSe Remote UE based on EAP-AKA'. The AUSF of the 5G ProSe Remote UE generates the EAP-Request/AKA'-Challenge message and send EAP-Request/AKA'-Challenge message to the AMF of the 5G ProSe UE-to-Network Relay in a Nausf_UEAuthentication_ProSeAuthenticate Response message.

7b. The AMF of the 5G ProSe UE-to-Network Relay can forward the Relay Authentication Request (including the EAP-Request/AKA'-Challenge) to the 5G ProSe UE-to-Network Relay over NAS message, including transaction identifier of the 5G ProSe Remote UE in the message. The NAS message is protected using the NAS security context created for the 5G ProSe UE-to-Network Relay.

7c. Based on the transaction identifier, the 5G ProSe UE-to-Network Relay can forwards the EAP-Request/AKA'-Challenge to the 5G ProSe Remote UE over PC5 messages.

The USIM in the 5G ProSe Remote UE verifies the freshness of the received values by checking whether AUTN can be accepted.

For EAP-AKA', the USIM computes a response RES. The USIM can return RES, CK, IK to the ME. The ME can derive CK' and IK'.

7d. The 5G ProSe Remote UE can return EAP-Response/AKA'-Challenge to the 5G ProSe UE-to-Network Relay over PC5 messages.

7e. The 5G ProSe UE-to-Network Relay forwards the EAP-Response/AKA'-Challenge together with the transaction identifier of the 5G ProSe Remote UE to the AMF of the ProSe UE-to-Network Relay in a NAS message Relay Authentication Response.

7f. The AMF of the 5G ProSe UE-to-Network Relay forwards EAP-Response/AKA'-Challenge to the AUSF of the 5G ProSe Remote UE via Nausf_UEAuthentication_ProSeAuthenticate Request.

The AUSF of the 5G ProSe Remote UE performs the UE authentication by verifying the received information.

For EAP-AKA', the AUSF of the 5G ProSe Remote UE and the 5G ProSe Remote UE may exchange EAP-Request/AKA'-Notification and EAP-Response/AKA'-Notification messages via the AMF of the 5G ProSe UE-to-Network Relay. After the exchanges, the AUSF of the 5G ProSe Remote UE derives $K_{AUSF}$ without calculating the KSEAF.

The AUSF of the 5G ProSe Remote UE and the 5G ProSe Remote UE can derive a new $K_{AUSF\_P}$ (different from $K_{AUSF}$). NAS SMC procedure is not performed between 5G ProSe Remote UE and AMF of the 5G ProSe UE-to-Network Relay.

8.0n successful authentication, the AUSF of the 5G ProSe Remote UE and the 5G ProSe Remote UE can generate 5GPRUK and 5GPRUK ID using the newly derived $K_{AUSF}$ P.

9. AUSF sends a Nudm_UEAuthentication_ProseResultConfirmation to the UDM.

10a. The AUSF select a PAnF and sends a Npanf_ProseKey_Register Request to the PAnF. This message include 5GPRUK ID, 5GPRUK, RSC.

10b. The PAnF sends a Npanf_ProseKey_Register Response to AUSF. The Response may include the PAnF instance ID.

10c. The AUSF sends a Nausf_UEAuthentication_Prose-Authenticate Response to AMF. The message include 5G PRUK ID. The message may also include PAnF ID.

10d. The AMF select the PAnF based on the 5G PRUK ID. If AMF received PAnF ID from AUSF, the AMF select the PAnF. The AMF sends a Npanf_ProseKey_Get Request to PAnF, the message include 5GPRUK ID, RSC, Nonce_1.

11a. The PAnF can generate the $K_{NR\_ProSe}$_key.

11b. The PAnF sends a Npanf_ProseKey_Get Response to the AMF.

12. The 5G ProSe UE-to-Network Relay can send the received Nonce_2 to the 5G ProSe Remote UE in Direct Security mode command message, which is protected using Krelay-int or/and Krelay-enc derived from Krelay-sess according to the negotiated PC5 signalling policies between the 5G ProSe Remote UE and the 5G ProSe UE-to-Network Relay.

Figure 16A:
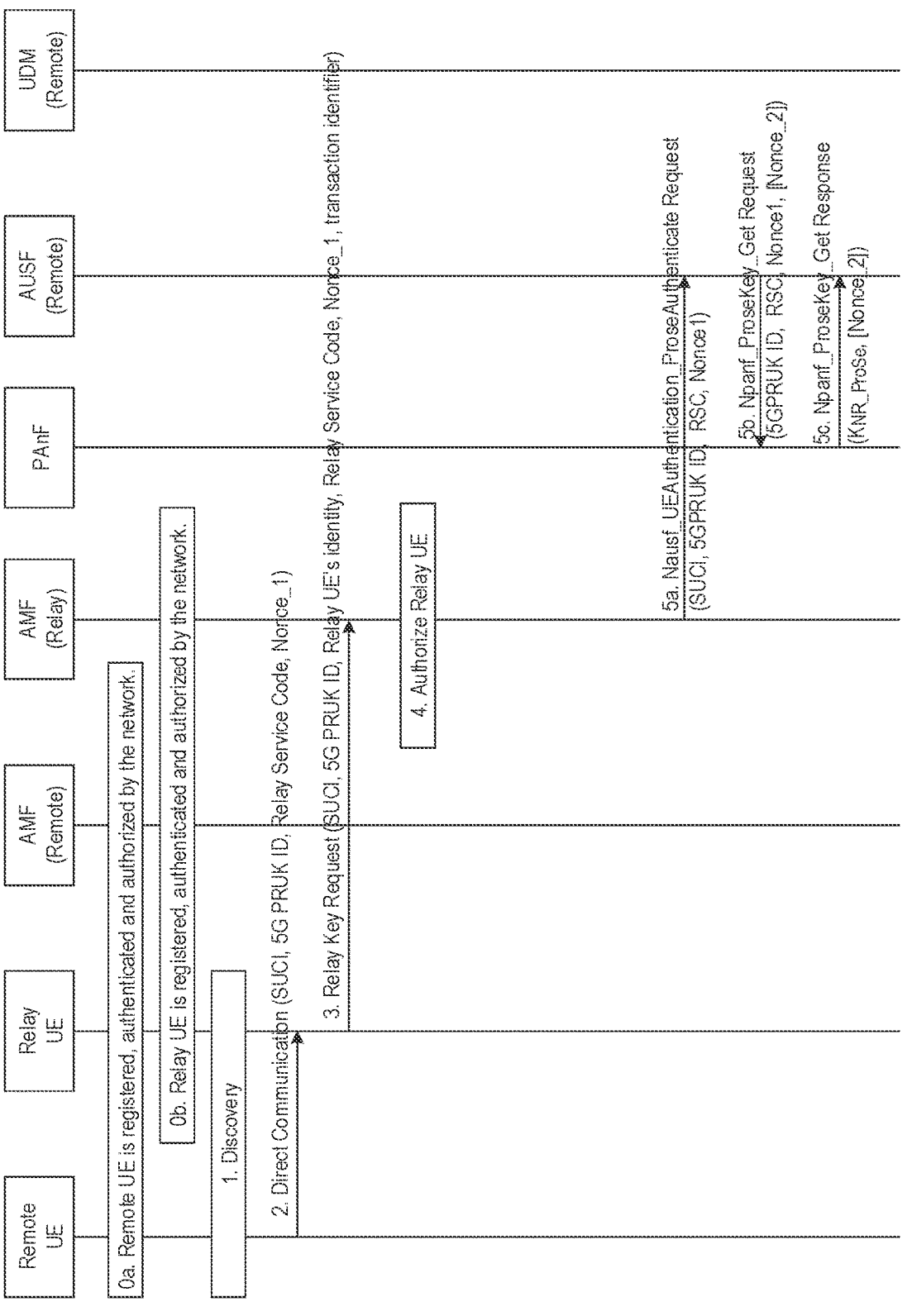
FIGS. 16A-16B show an example flowchart of a security procedure where the Remote UE uses both SUCI and 5G PRUK ID and AUSF finds PAnF, and PAnF generate $K_{NR\_Prose}$.
Figure 16B:
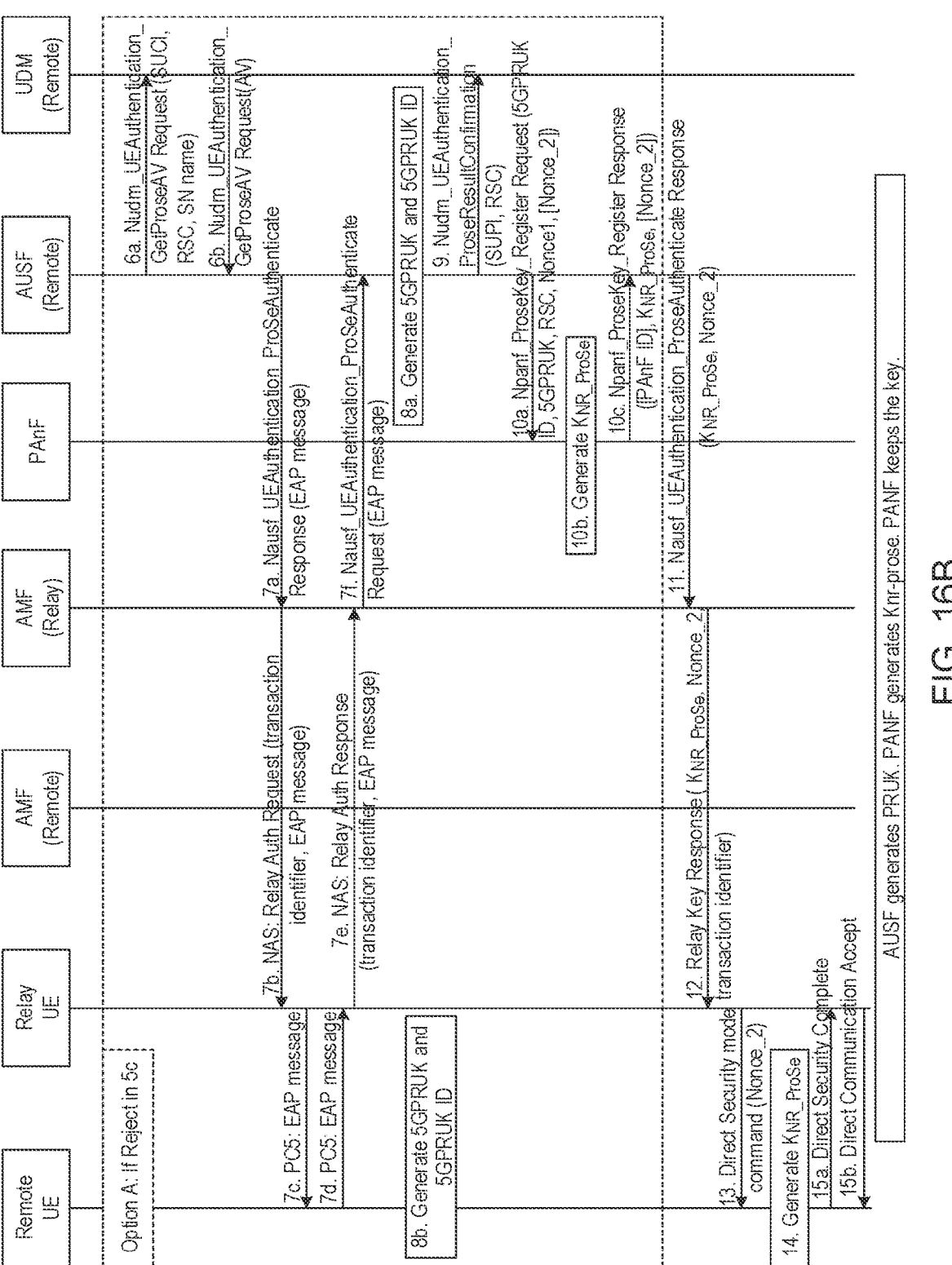

13-15b. The 5G ProSe Remote UE can use the 5GPRUK ID to locate the $K_{AUSF}$_P/5GPRUK to be used for the PC5 link security. The 5G ProSe Remote UE can generate the $K_{NR\_ProSe}$ key to be used for Remote access via the 5G ProSe UE-to-Network Relay. The 5G ProSe Remote UE can derive PC5 session key Krelay-sess and confidentiality and integrity keys from $K_{NR\_ProSe}$. The 5G ProSe Remote UE can send the Direct Security Mode Complete message containing its PC5 user plane security policies to the 5G ProSe UE-to-Network relay, which is protected by Krelay-int or/and Krelay-enc derived from Krelay-sess according to the negotiated PC5 signalling policies between the 5G ProSe Remote UE and the 5G ProSe UE-to-Network Relay. After the successful verification of the Direct Security Mode complete message, the 5G ProSe UE-to-Network Relay responds a Direct Communication Accept message to the 5G ProSe Remote UE to finish the PC5 connection establishment procedures V.(c) Case 4.3 AUSF Find PAnF. PAnF Generate $K_{NR\_Prose}$ FIGS. 16A-16B show an example flowchart of a security procedure where AUSF finds PAnF, and PAnF generate $K_{NR\_Prose}$. FIG. 16B is a continuation of the process in FIG. 16A.

0. The Remote UE and relay UE can be registered with the network. The UE-to-Network relay can be authenticated and authorized by the network to support as a relay UE. Remote UE can be authenticated and authorized by the network to act as a Remote UE.

1. The remote UE can initiate discovery procedure using any of Model A or Model B method.

2. After the discovery of the UE-to-Network relay, the Remote UE can send a Direct Communication Request to the relay UE for establishing secure PC5 unicast link. The Remote UE can include its security capabilities and security policy in the DCR message. The message can also include SUCI and 5GPRUK ID if available, Relay Service Code, Nonce_1.

3. Upon receiving the DCR message, the Relay UE can send the relay key request to the relay AMF, including the parameters received in the DCR message.

4. The Relay AMF can verify whether the relay UE is authorized to act as U2N relay.

5a. The relay AMF sends a Nausf_UEAuthentication_ProseAuthenticate Request to AUSF. The request message include 5GPRUK ID, RSC, Nonce1, SN name.

5b. The AUSF can select PAnF based on 5GPRUK ID and sends a Npanf_ProseKey_Get Request to PAnF. The request message include 5GPRUK ID, RSC, Nonce_1. The request may also include the Nonce_2.

If AUSF can use 5G PRUK ID to find a PAnF instance ID which is stored in the AUSF, then the AUSF select the PAnF.

If RID is included in the 5G PRUK ID, the PAnF selection should consider the RID.

The 5GPRUK ID may be generated as follows:

5GPRUK ID is in NAI format as specified in clause 2.2 of IETF RFC 7542, e.g. username@realm. The username part can include the RID and the P-TID (Prose Temporary UE Identifier), and the realm part can include Home Network Identifier.

The P-TID is derived from KAUSF or Kausf_p.

5c. If the PAnF can find the 5G PRUK, then sends a Npanf_ProseKey_Get Response with $K_{NR\_Prose}$ to the AUSF. If the PAnF received Nonce_2 from AUSF, the PAnF use the Nonce_2 to generate $K_{NR\_Prose}$. Otherwise, the PAnF generate the Nonce_2 itself and include the Nonce_2 in the response. Then go to step 11.

If the PAnF can not find the 5G PRUK, then sends a Reject Response to the AUSF. Then go to step 6a.

6a~6b. As shown in FIG. 16B, which is a continuation of the process in FIG. 16A, the AUSF can retrieve the Authentication Vectors from the UDM via Nudm_UEAuthentication_GetProseAv Request message and trigger authentication of the remote UE.

7a. If EAP-AKA' is selected by UDM, the AUSF of the 5G ProSe Remote UE can trigger authentication of the 5G ProSe Remote UE based on EAP-AKA'. The AUSF of the 5G ProSe Remote UE generates the EAP-Request/AKA'-Challenge message and send EAP-Request/AKA'-Challenge message to the AMF of the 5G ProSe UE-to-Network Relay in a Nausf_UEAuthentication_ProSeAuthenticate Response message.

7b. The AMF of the 5G ProSe UE-to-Network Relay can forward the Relay Authentication Request (including the EAP-Request/AKA'-Challenge) to the 5G ProSe UE-to-Network Relay over NAS message, including transaction identifier of the 5G ProSe Remote UE in the message. The NAS message is protected using the NAS security context created for the 5G ProSe UE-to-Network Relay.

7c. Based on the transaction identifier, the 5G ProSe UE-to-Network Relay can forwards the EAP-Request/AKA'-Challenge to the 5G ProSe Remote UE over PC5 messages.

The USIM in the 5G ProSe Remote UE verifies the freshness of the received values by checking whether AUTN can be accepted.

For EAP-AKA', the USIM computes a response RES. The USIM can return RES, CK, IK to the ME. The ME can derive CK' and IK'.

7d. The 5G ProSe Remote UE can return EAP-Response/AKA'-Challenge to the 5G ProSe UE-to-Network Relay over PC5 messages.

7e. The 5G ProSe UE-to-Network Relay forwards the EAP-Response/AKA'-Challenge together with the transaction identifier of the 5G ProSe Remote UE to the AMF of the 5G ProSe UE-to-Network Relay in a NAS message Relay Authentication Response.

7f. The AMF of the 5G ProSe UE-to-Network Relay forwards EAP-Response/AKA'-Challenge to the AUSF of the 5G ProSe Remote UE via Nausf_UEAuthentication_ProSeAuthenticate Request.

The AUSF of the 5G ProSe Remote UE performs the UE authentication by verifying the received information as described in TS33.501.

For EAP-AKA', the AUSF of the 5G ProSe Remote UE and the 5G ProSe Remote UE may exchange EAP-Request/AKA'-Notification and EAP-Response/AKA'-Notification messages via the AMF of the 5G ProSe UE-to-Network Relay. After the exchanges, the AUSF of the 5G ProSe Remote UE derives $K_{AUSF}$ without calculating the $K_{SEAF}$.

The AUSF of the 5G ProSe Remote UE and the 5G ProSe Remote UE can derive a new $K_{AUSF\_P}$ (different from $K_{AUSF}$) NAS SMC procedure is not performed between 5G ProSe Remote UE and AMF of the 5G ProSe UE-to-Network Relay.

8.0n successful authentication, the AUSF of the 5G ProSe Remote UE and the 5G ProSe Remote UE can generate 5GPRUK and 5GPRUK ID using the newly derived $K_{AUSF\_P}$.

9. AUSF sends a Nudm_UEAuthentication_ProseResult-Confirmation to the UDM.

10a. The AUSF select a PAnF and sends a Npanf_ ProseKey_Register Request to the PAnF. This message include 5GPRUK ID, 5GPRUK, RSC, Nonce_1. The Request may also include Nonce_2.

10b. The PAnF generate the $K_{NR\_Prose}$ Key.

10c. The PAnF sends a Npanf_ProseKey_Register Response with $K_{NR\_Prose}$ to AUSF. The Response may include the PAnF instance ID. The Response may also include Nonce_2.

11. The AUSF of the 5G ProSe Remote UE can send the $K_{NR\_ProSe}$, Nonce_2 in Nausf_UEAuthentication_ProseAuthenticate Response message to the 5G ProSe UE-to-Network Relay via the AMF of the 5G ProSe UE-to-Network Relay. When receiving a $K_{NR\_ProSe}$ from the AUSF of the 5G ProSe Remote UE, the AMF of the 5G ProSe UE-to-Network Relay can not attempt to trigger NAS SMC procedure with the 5G ProSe Remote UE. The 5G ProSe UE-to-Network Relay derives PC5 session key Krelay-sess and confidentiality and integrity keys from $K_{NR\_ProSe}$.

12. The 5G ProSe UE-to-Network Relay can send the received Nonce_2 to the 5G ProSe Remote UE in Direct Security mode command message, which is protected using Krelay-policies between the 5G ProSe Remote UE and the 5G ProSe UE-to-Network Relay.

13-15b. The 5G ProSe Remote UE can use the 5GPRUK ID to locate the $K_{AUSF}$_P/5GPRUK to be used for the PC5 link security. The 5G ProSe Remote UE can generate the $K_{NR\_ProSe}$ key to be used for Remote access via the 5G ProSe UE-to-Network Relay. The 5G ProSe Remote UE can derive PC5 session key Krelay-sess and confidentiality and integrity keys from $K_{NR\_ProSe}$. The 5G ProSe Remote UE can send the Direct Security Mode Complete message containing its PC5 user plane security policies to the 5G ProSe UE-to-Network relay, which is protected by Krelay-int or/and Krelay-enc derived from Krelay-sess according to the negotiated PC5 signalling policies between the 5G ProSe Remote UE and the 5G ProSe UE-to-Network Relay. After the successful verification of the Direct Security Mode complete message, the 5G ProSe UE-to-Network Relay responds a Direct Communication Accept message to the 5G ProSe Remote UE to finish the PC5 connection establishment procedures.

The 6a-7f all above is about Prose authentication based on EAP-AKA' authentication. However, it may be replaced by 5G-AKA based Prose authentication.

Figure 17:
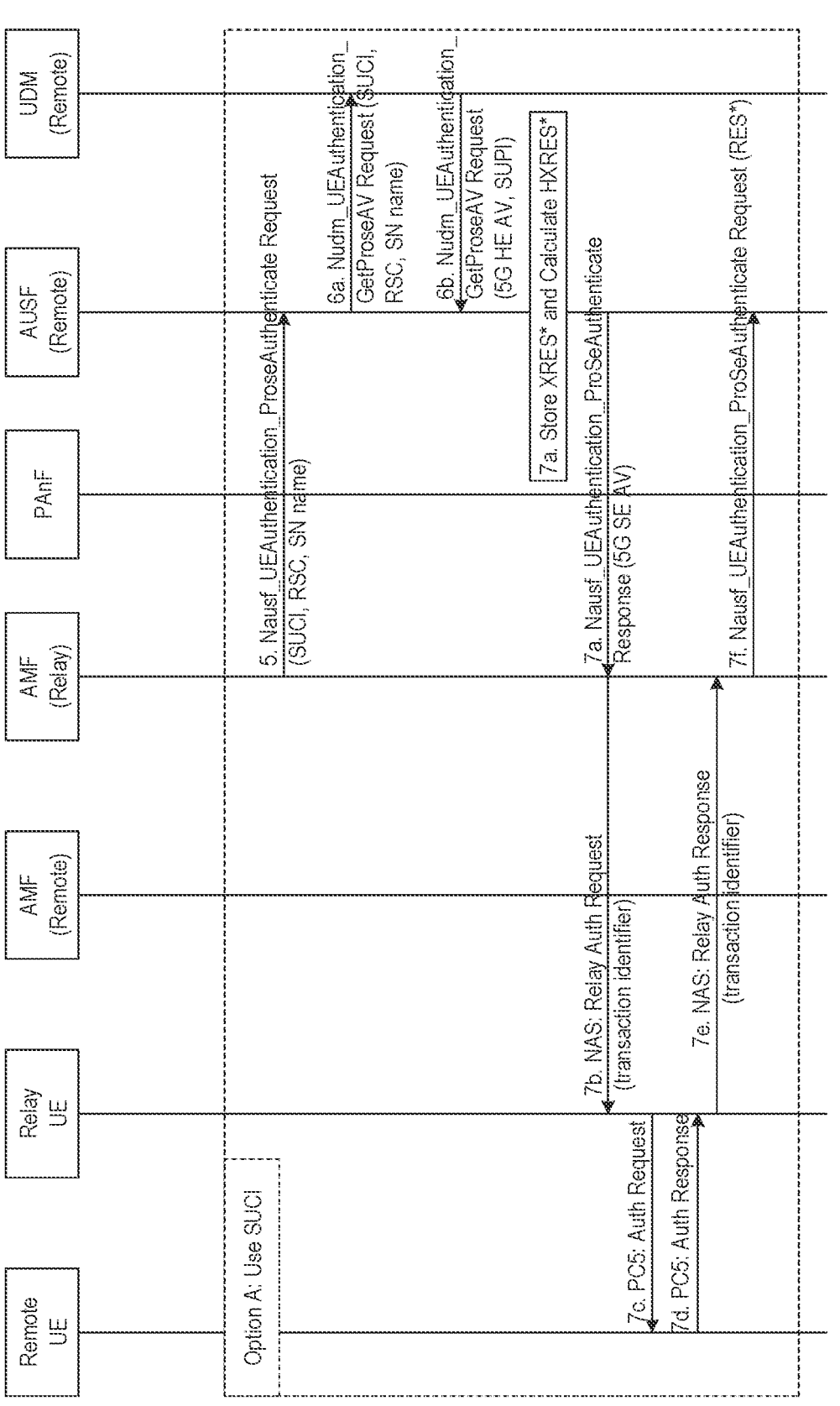
FIG. 17 shows an example flowchart for an authentication technique.

FIG. 17 shows an example flowchart for an authentication technique.

6a~6b. The AUSF can retrieve the Authentication Vectors from the UDM via Nudm_UEAuthentication_GetProseAv Request message and trigger authentication of the remote UE.

7a. If 5G-AKA is selected by UDM, the AUSF of the 5G ProSe Remote UE can trigger authentication of the 5G ProSe Remote UE based on 5G-AKA.

7b. The AMF of the 5G ProSe UE-to-Network Relay can forward the Relay Authentication Request to the 5G ProSe UE-to-Network Relay over NAS message, including transaction identifier of the 5G ProSe Remote UE in the message. The NAS message is protected using the NAS security context created for the 5G ProSe UE-to-Network Relay.

7c. Based on the transaction identifier, the 5G ProSe UE-to-Network Relay can forwards the Authentication Request to the 5G ProSe Remote UE over PC5 messages.

7d. The 5G ProSe Remote UE can return Authentication Response to the 5G ProSe UE-to-Network Relay over PC5 messages.

7e. The 5G ProSe UE-to-Network Relay forwards the Authentication Response together with the transaction identifier of the 5G ProSe Remote UE to the AMF of the 5G ProSe UE-to-Network Relay in a NAS message Relay Authentication Response.

7f. The AMF of the 5G ProSe UE-to-Network Relay forwards Authentication Response to the AUSF of the 5G ProSe Remote UE via Nausf_UEAuthentication_ProSeAuthenticate Request.

The AUSF of the 5G ProSe Remote UE performs the UE authentication by verifying the received information.

This patent document describes several techniques that may be used a security or authentication. Some example techniques described in this patent document include:

The AMF can reject the request or ask for Remote UE's SUCI.

If the Remote UE use SUCI or 5G PRUK ID. When 5G PRUK ID is used, based on local policy or the 5G PRUK ID may not be used to find a 5G PRUK, AMF can reject the request or ask for Remote UE's SUCI.

NF selection, RID and/or NF instance ID is used.

AMF may need to find a network function (NF) which store the 5G PRUK. NF can be AUSF (if no PAnF) or PAnF.

If AUSF perform the NF selection, which means AMF find AUSF then AUSF need to find the network function (NF) which store the 5G PRUK, PAnF or UDM if PAnF is not used or co-located with UDM.

AMF/AUSF can use 5G PRUK ID to find a NF instance ID which is stored in local database If RID is included in the 5G PRUK ID, the AUSF selection should consider the RID.

The 5GPRUK ID may be generated as follows:

5GPRUK ID is in NAI format as specified in clause 2.2 of IETF RFC 7542, e.g. username@realm. The username part (or the first part) can include the RID and the P-TID (Prose Temporary UE Identifier), and the realm part (or the second part) can include Home Network Identifier.

The P-TID is derived from KAUSF or Kausf_p.

If both SUCI and 5G PRUK ID is used, use 5G PRUK ID first. If 5G PRUK ID can not be used to find a 5G PRUK, then NF use SUCI to trigger prose authentication.

Different NF (AUSF, UDM, PAnF) may have the functionality to generate 5G PRUK and/or $K_{NR\_Prose}$ and Nonce_2, which result in different flows.

Figure 18:
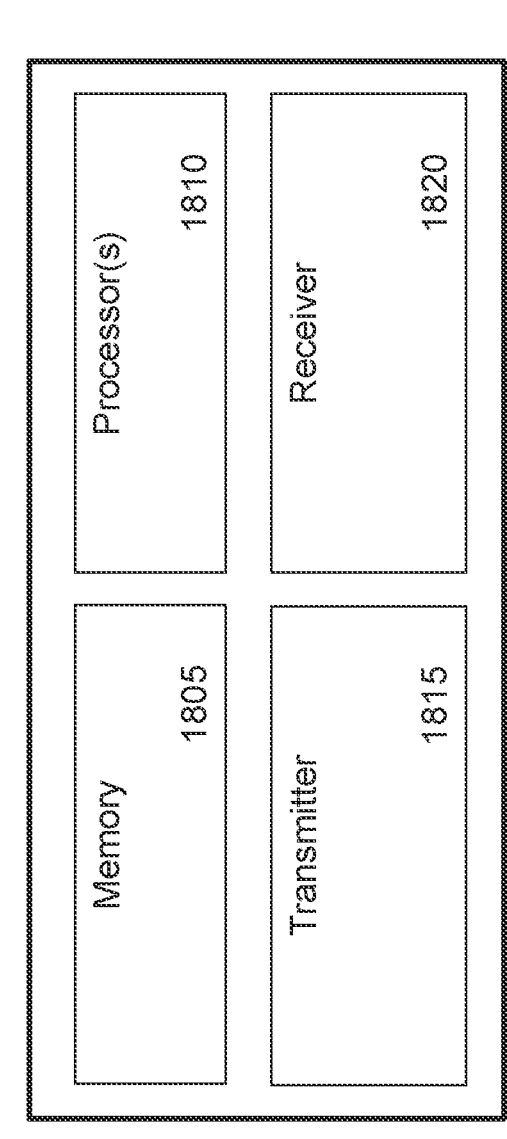
FIG. 18 shows an exemplary block diagram of a hardware platform that may be a part of a network device or a communication device.

FIG. 18 shows an exemplary block diagram of a hardware platform 1800 that may be a part of a network device (e.g., base station) or a communication device (e.g., a user equipment (UE)). The hardware platform 500 includes at least one processor 1810 and a memory 1805 having instructions stored thereupon. The instructions upon execution by the processor 1810 configure the hardware platform 1800 to perform the operations described in FIGS. 1 to 18 and 19 to 23 and in the various embodiments described in this patent document. The transmitter 1815 transmits or sends information or data to another device. For example, a network device transmitter can send a message to a user equipment. The receiver 1820 receives information or data transmitted or sent by another device. For example, a user equipment can receive a message from a network device.

Figure 19:
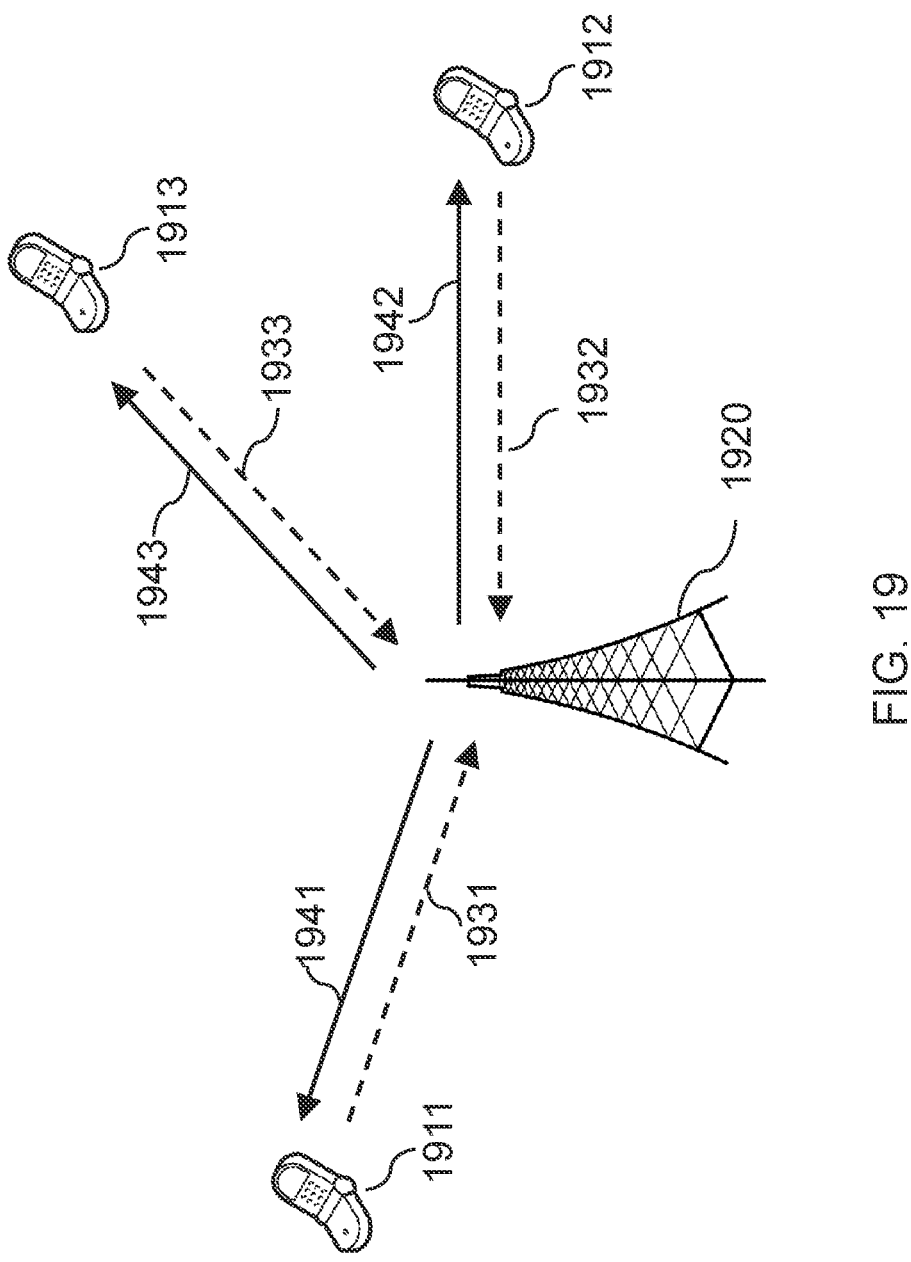
FIG. 19 shows an example of wireless communication including a base station (BS) and user equipment (UE) based on some implementations of the disclosed technology.

The implementations as discussed above will apply to a wireless communication. FIG. 19 shows an example of a wireless communication system (e.g., a 5G or NR cellular network) that includes a base station 1920 and one or more user equipment (UE) 1911, 1912 and 1913. In some embodiments, the UEs access the BS (e.g., the network) using a communication link to the network (sometimes called uplink direction, as depicted by dashed arrows 1931, 1932, 1933), which then enables subsequent communication (e.g., shown in the direction from the network to the UEs, sometimes called downlink direction, shown by arrows 1941, 1942, 1943) from the BS to the UEs. In some embodiments, the BS send information to the UEs (sometimes called downlink direction, as depicted by arrows 1941, 1942, 1943), which then enables subsequent communication (e.g., shown in the direction from the UEs to the BS, sometimes called uplink direction, shown by dashed arrows 1931, 1932, 1933) from the UEs to the BS. The UE may be, for example, a smartphone, a tablet, a mobile computer, a machine to machine (M2M) device, an Internet of Things (IoT) device, and so on.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
receiving, by a first network device from a second network device, a first request message that includes an identifier associated with a first communication device, the identifier including a 5G ProSe Relay User Key (PRUK) identifier (ID) that includes a routing identifier or a routing indicator (RID);
transmitting, by the first network device to a third network device, a second request message that includes the identifier; and
receiving, by the first network device from the third network device, a response message in response to the second request message, wherein the response message indicates whether the third network device identifies a relay key using the identifier;
wherein the relay key includes 5G PRUK, and
wherein the 5G PRUK ID includes a first part that includes the RID and a prose temporary user equipment identifier (P-TID), and a second part that includes a home network identifier.

2. The method of claim 1, wherein the third network device is selected by the first network device based on the identifier.

3. The method of claim 1, wherein the second network device verifies whether a second communication device is authorized to provide a UE-to-network relay service to the first communication device.

4. The method of claim 1,
wherein the first network device includes an authentication server function (AUSF) device, wherein the second network device includes a remote access and mobility management function (AMF) device, and wherein the third network device includes a prose anchor function (PAnF).

5. An apparatus for wireless communication comprising at least one processor, configured to implement a method, the at least one processor configured to:

receive, by a first network device from a second network device, a first request message that includes an identifier associated with a first communication device, the identifier including a 5G ProSe Relay User Key (PRUK) identifier (ID) that includes a routing identifier or a routing indicator (RID);

transmit, by the first network device to a third network device, a second request message that includes the identifier; and receive, by the first network device from the third network device, a response message in response to the second request message, wherein the response message indicates whether the third network device identifies a relay key using the identifier;

wherein the relay key includes 5G PRUK, and wherein the 5G PRUK ID includes a first part that includes the RID and a prose temporary user equipment identifier (P-TID), and a second part that includes a home network identifier.

6. The apparatus of claim 5, wherein the third network device is selected by the first network device based on the identifier.

7. The apparatus of claim 5, wherein the at least one processor of the second network device is configured to verify whether a second communication device is authorized to provide a UE-to-network relay service to the first communication device.

8. The apparatus of claim 5, wherein the first network device includes an authentication server function (AUSF) device, wherein the second network device includes a remote access and mobility management function (AMF) device, and wherein the third network device includes a prose anchor function (PAnF).

9. A non-transitory computer readable program storage medium having code stored thereon, the code, when executed by at least one processor, causing the at least one processor to implement a method, comprising:

receiving, by a first network device from a second network device, a first request message that includes an identifier associated with a first communication device, the identifier including a 5G ProSe Relay User Key (PRUK) identifier (ID) that includes a routing identifier or a routing indicator (RID);

transmitting, by the first network device to a third network device, a second request message that includes the identifier; and by the first network device from the third network device, a response message in response to the second request message, wherein the response message indicates whether the third network device identifies a relay key using the identifier;

wherein the relay key includes 5G PRUK, and wherein the 5G PRUK ID includes a first part that includes the RID and a prose temporary user equipment identifier (P-TID), and a second part that includes a home network identifier.

10. The non-transitory computer readable program storage medium of claim 9, wherein the third network device is selected by the first network device based on the identifier.

11. The non-transitory computer readable program storage medium of claim 9, wherein the second network device verifies whether a second communication device is authorized to provide a UE-to-network relay service to the first communication device.

12. The non-transitory computer readable program storage medium of claim 9, wherein the first network device includes an authentication server function (AUSF) device, wherein the second network device includes a remote access and mobility management function (AMF) device, and wherein the third network device includes a prose anchor function (PAnF).

* * * * *